United States Patent
Kalra et al.

(10) Patent No.: US 6,490,627 B1
(45) Date of Patent: *Dec. 3, 2002

(54) METHOD AND APPARATUS THAT PROVIDES A SCALABLE MEDIA DELIVERY SYSTEM

(75) Inventors: Devendra Kalra, Fremont; Karnamadakala Krishnamohan, San Jose; Venkatasubbarao Ramamoorthy, Pleasanton; Jeyendran Balakrishnan, Sunnyvale; Timothy J. Burr, San Jose; Kowsik Guruswamy, Mountain View, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/340,624

(22) Filed: Jun. 28, 1999

Related U.S. Application Data

(63) Continuation of application No. 08/768,114, filed on Dec. 17, 1996, now Pat. No. 5,953,506.

(51) Int. Cl.7 .............................. G06F 15/16; H04L 7/30
(52) U.S. Cl. .................... 709/231; 709/247; 348/390.1; 348/410.1; 348/421.1; 382/232
(58) Field of Search .................... 348/384.1, 387.1, 348/390.1, 396.1, 410.1, 420.1, 421.1; 382/232, 239, 240; 709/230, 231, 247

(56) References Cited

U.S. PATENT DOCUMENTS 5,953,506 A * 9/1999 Kalra et al. ................ 709/231

* cited by examiner

Primary Examiner—Dung C. Dinh
(74) Attorney, Agent, or Firm—Brian D. Hickman; Hickman Palermo Truong & Becker LLP

(57) ABSTRACT

The present invention provides an apparatus and method for encoding, storing, transmitting and decoding multimedia information in the form of scalable, streamed digital data. A base stream containing basic informational content and subsequent streams containing additive informational content are initially created from standard digital multimedia data by a transcoder. Client computers, each of which may have different configurations and capabilities are capable of accessing a stream server that contains the scalable streamed digital data. Each different client computer, therefore, may access different stream combinations according to a profile associated with each different client computer. Thus, the streams accessed from the server are tailored to match the profile of each client computer so that the best combination of streams can be provided to maximize the resolution of the 3D, audio and video components.

22 Claims, 39 Drawing Sheets

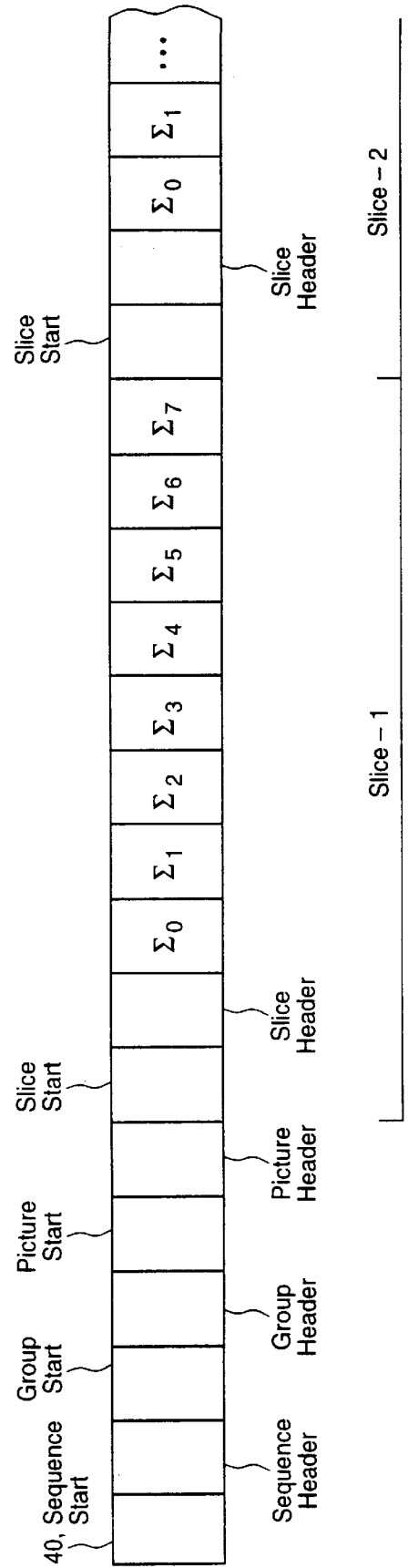

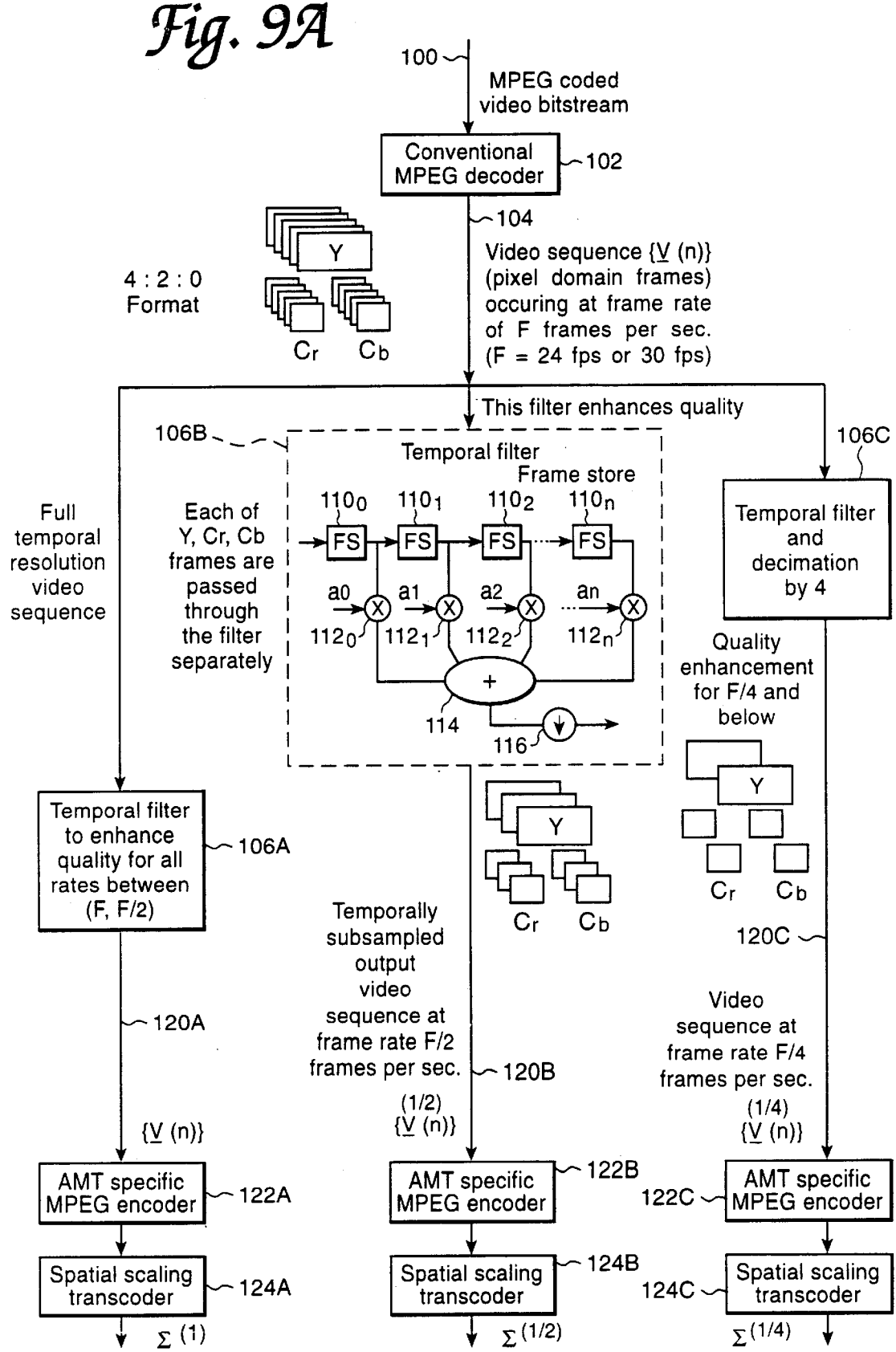

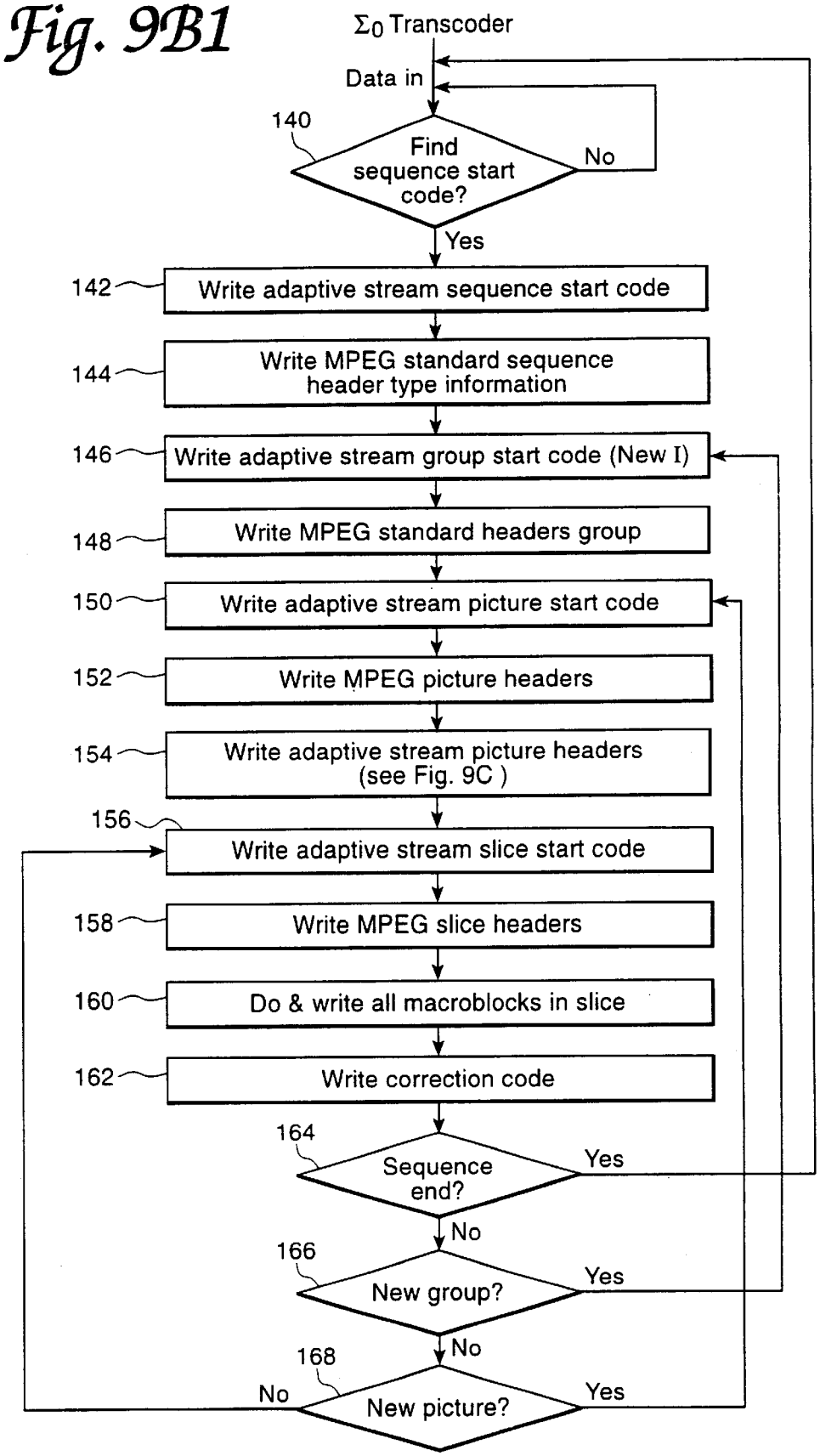

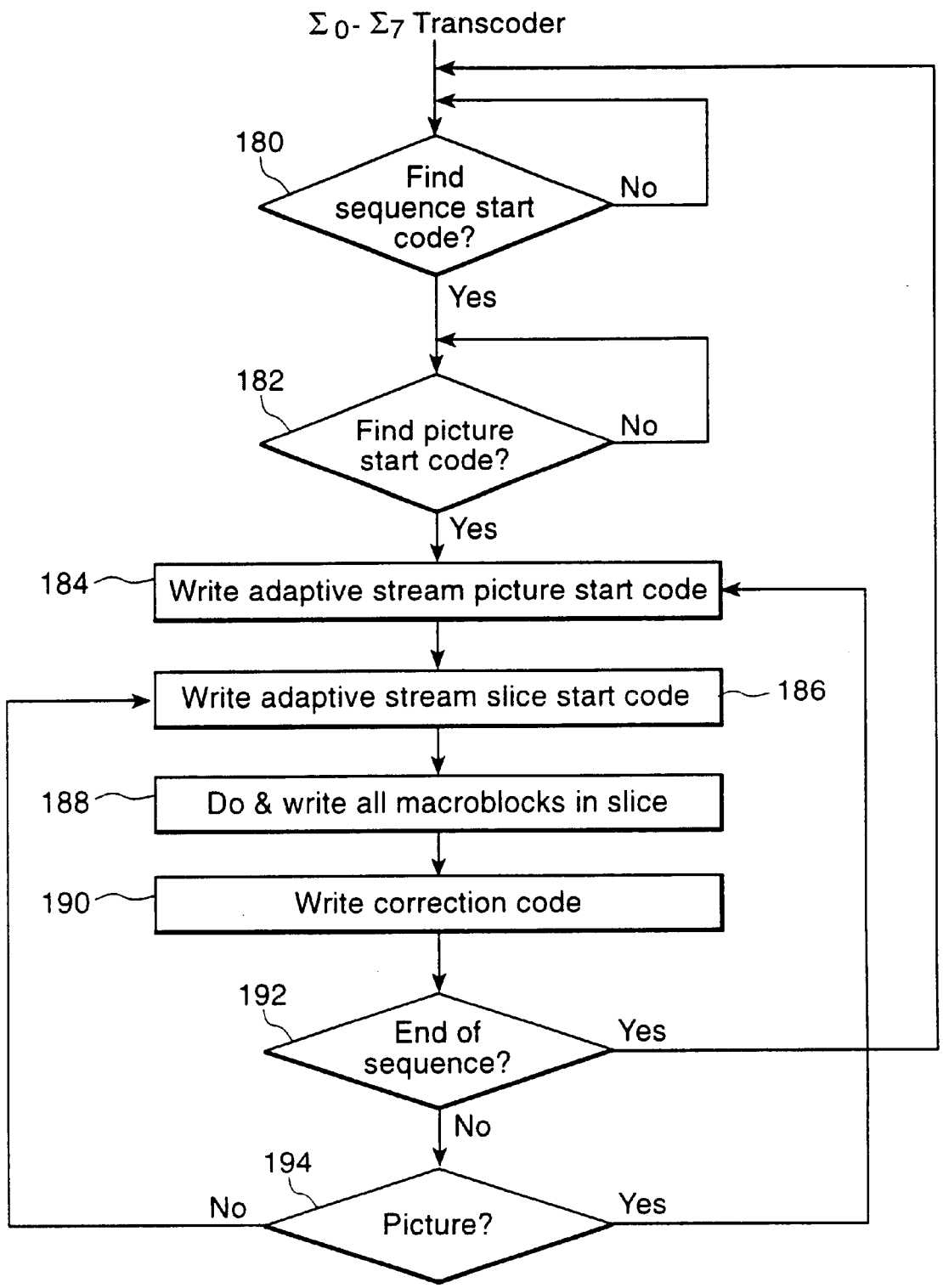

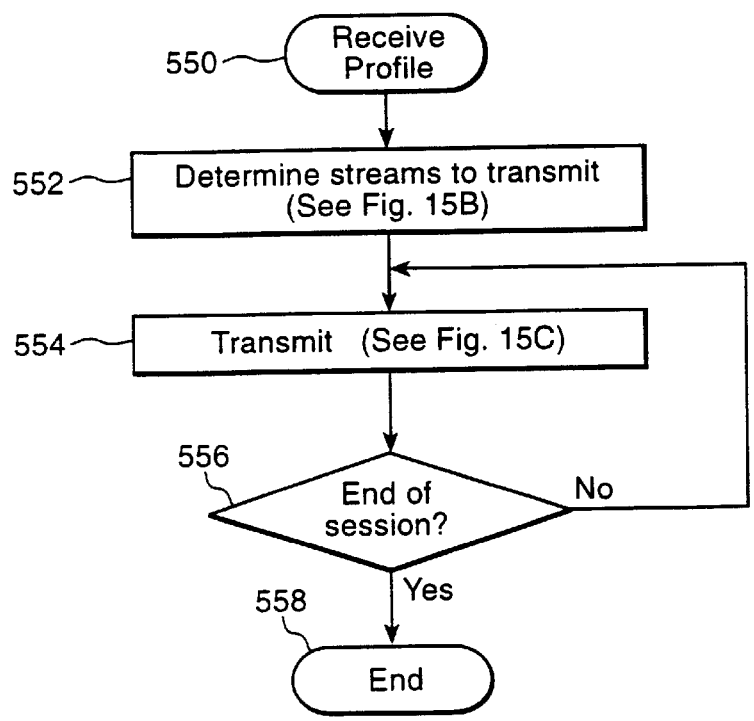
Fig. 15A
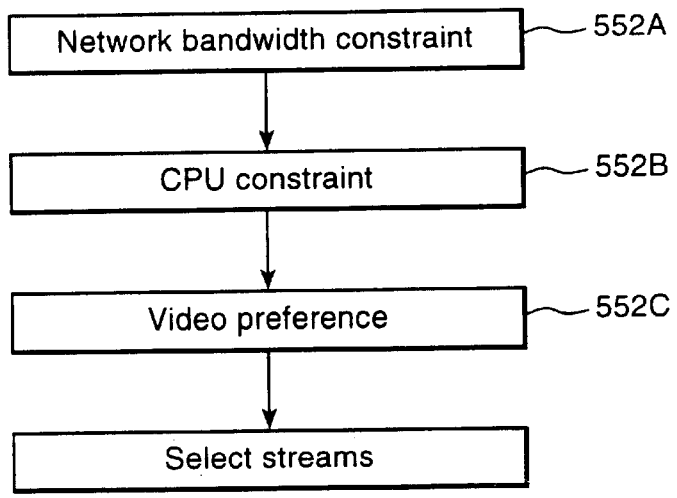
Fig. 15B1

Fig. 15B2A

| Frame rate | 1/8 | 2/8 | 3/8 | 4/8 | 5/8 | 6/8 | 7/8 | 8/8 |
|---|---|---|---|---|---|---|---|---|
| 30fps | 200 | 290 | 432 | 467 | 603 | 812 | 915 | 1200 |
| 24fps | 156 | 270 | 360 | 402 | 490 | 670 | 740 | 960 |
| 18fps | 120 | 210 | 300 | 380 | 410 | 480 | 595 | 720 |
| 15fps | 102 | 180 | 217 | 322 | 401 | 469 | 517 | 600 |
| 10fps | 70 | 117 | 145 | 183 | 200 | 291 | 386 | 400 |
| 5fps | 21 | 67 | 106 | 121 | 146 | 165 | 181 | 203 |

Fig. 15B2B

| Frame rate | 1/8 | 2/8 | 3/8 | 4/8 | 5/8 | 6/8 | 7/8 | 8/8 |
|---|---|---|---|---|---|---|---|---|
| 30fps | 200 | 290 | 432 | 467 | 603 | 812 | 915 | 1200 |
| 24fps | 156 | 270 | 360 | 402 | 490 | 670 | 740 | 960 |
| 18fps | 120 | 210 | 300 | 380 | 410 | 480 | 595 | 720 |
| 15fps | 102 | 180 | 217 | 322 | 401 | 469 | 517 | 600 |
| 10fps | 70 | 117 | 145 | 183 | 200 | 291 | 386 | 400 |
| 5fps | 21 | 67 | 106 | 121 | 146 | 165 | 181 | 203 |

Fig. 15B2C

| Frame rate | 1/8 | 2/8 | 3/8 | 4/8 | 5/8 | 6/8 | 7/8 | 8/8 |
|---|---|---|---|---|---|---|---|---|
| 30fps | 200 | 290 | 432 | 467 | 603 | 812 | 915 | 1200 |
| 24fps | 156 | 270 | 360 | 402 | 490 | 670 | 740 | 960 |
| 18fps | 120 | 210 | 300 | 380 | 410 | 480 | 595 | 720 |
| 15fps | 102 | 180 | 217 | 322 | 401 | 469 | 517 | 600 |
| 10fps | 70 | 117 | 145 | 183 | 200 | 291 | 386 | 400 |
| 5fps | 21 | 67 | 106 | 121 | 146 | 165 | 181 | 203 |

Fig. 15B2D

| Frame rate | 1/8 | 2/8 | 3/8 | 4/8 | 5/8 | 6/8 | 7/8 | 8/8 |
|---|---|---|---|---|---|---|---|---|
| 30fps | 200 | 290 | 432 | 467 | 603 | 812 | 915 | 1200 |
| 24fps | 156 | 270 | 360 | 402 | 490 | 670 | 740 | 960 |
| 18fps | 120 | 210 | 300 | 380 | 410 | 480 | 595 | 720 |
| 15fps | 102 | 180 | 217 | 322 | 401 | 469 | 517 | 600 |
| 10fps | 70 | 117 | 145 | 183 | 200 | 291 | 386 | 400 |
| 5fps | 21 | 67 | 106 | 121 | 146 | 165 | 181 | 203 |

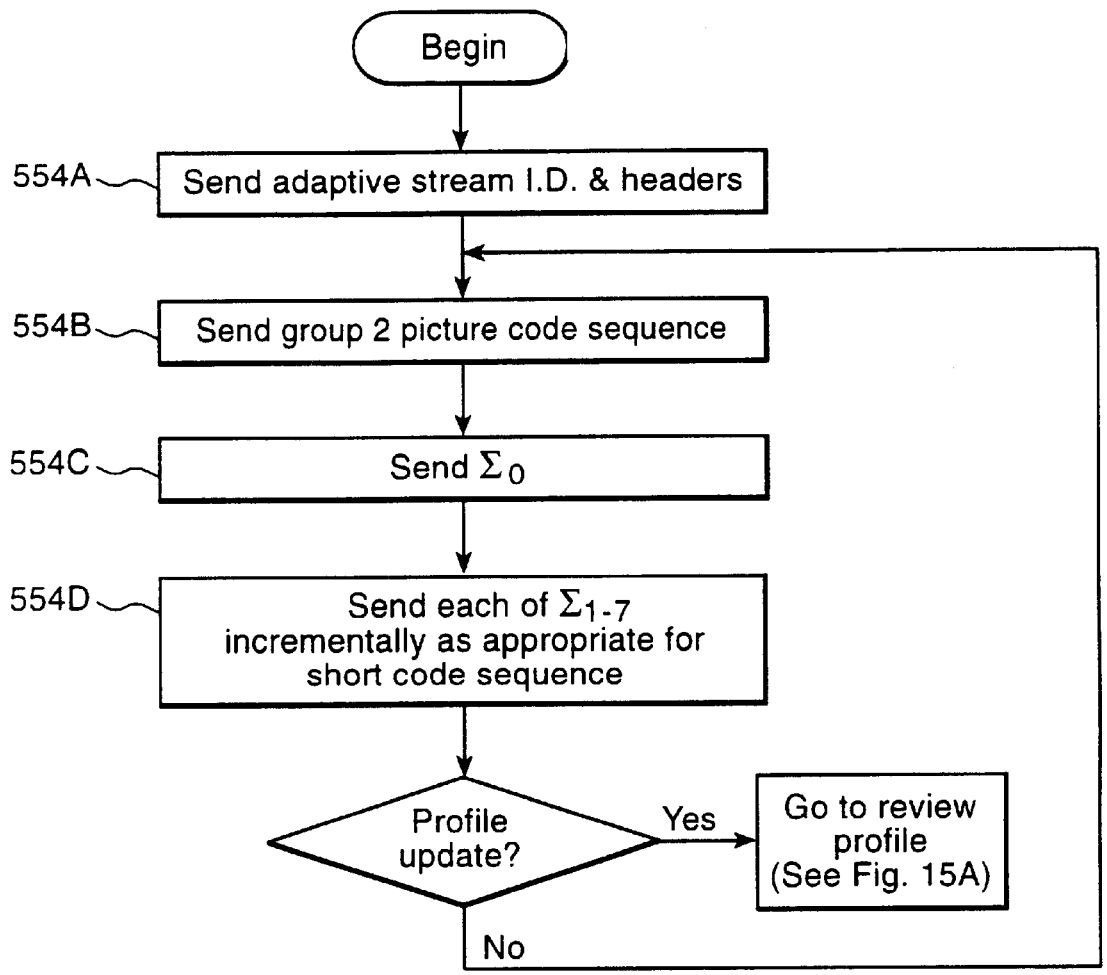

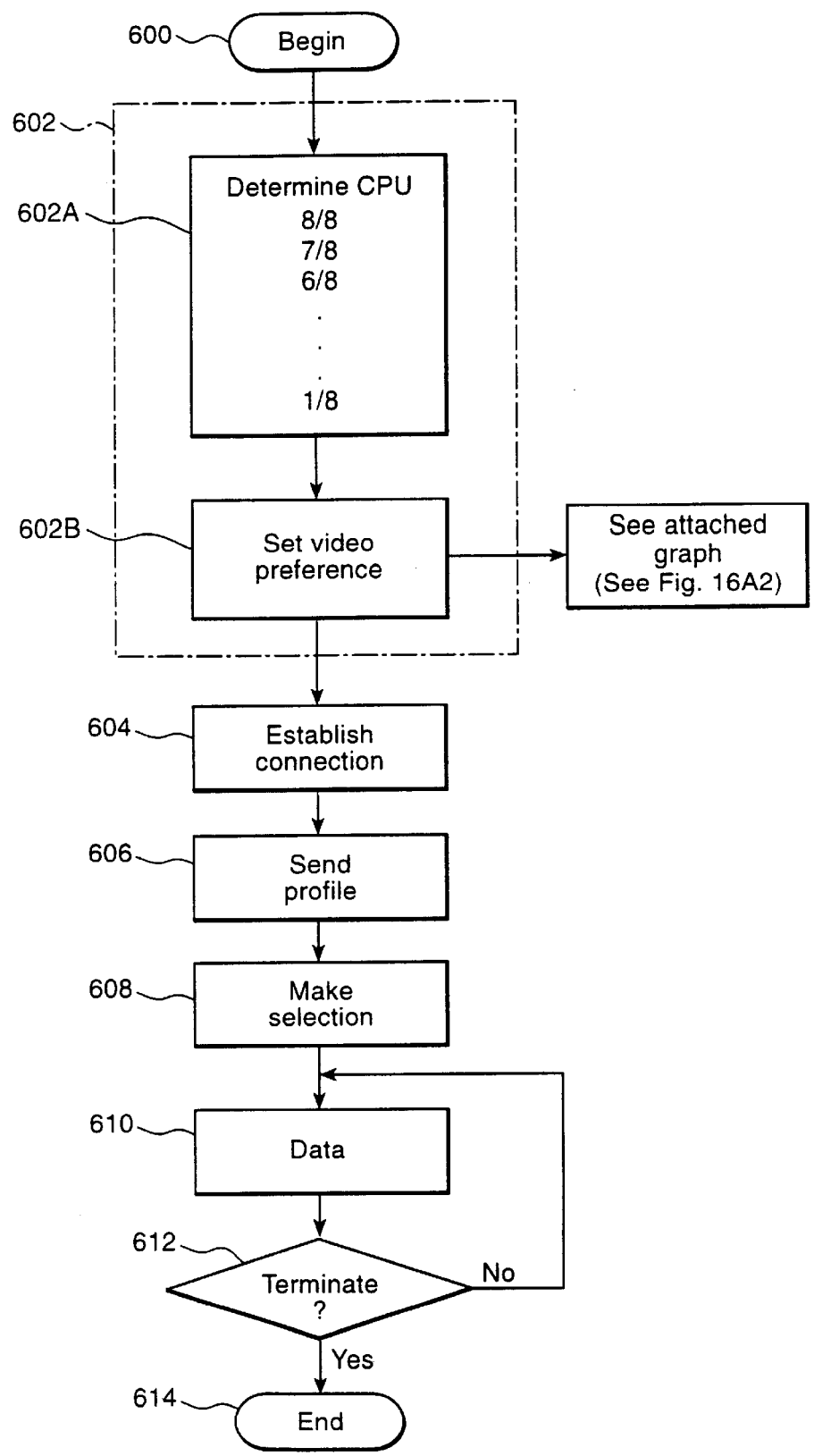
Fig. 16A1

Fig. 16A2
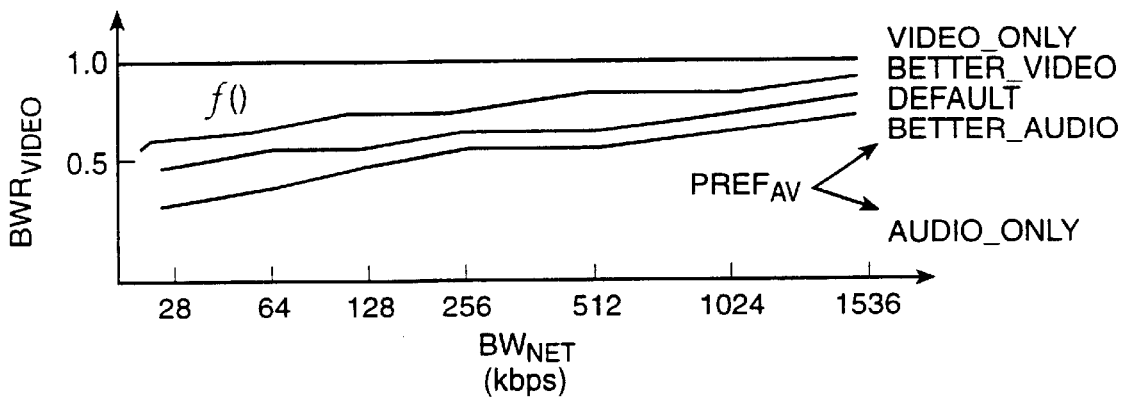
Fig. 16A3
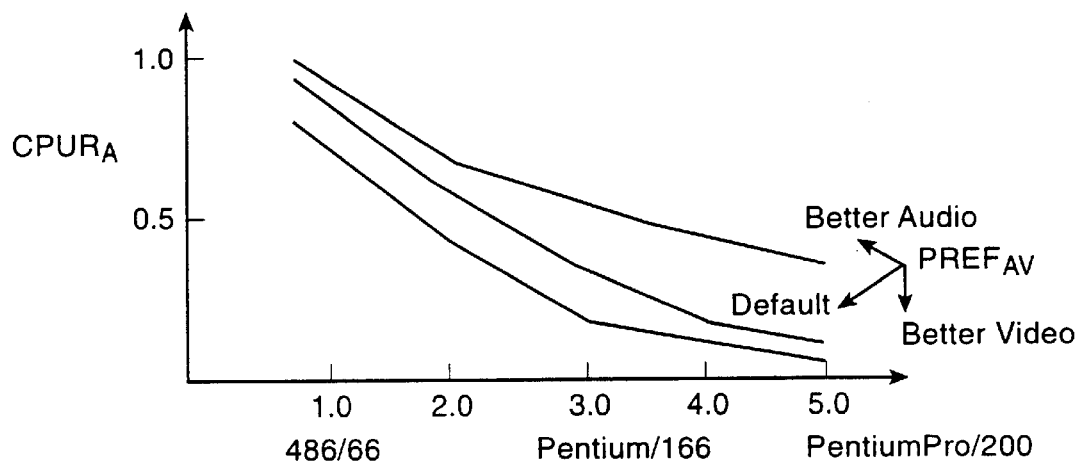
ADR: Audio decode time ratio (LCD platform relative to other platforms)

Fig. 18B1

```
Global_Data ::=  Database_Header Global_Data_Records
Database_Header ::= #SceneGraph(SG)_Leaf_Nodes #Materials #Textures
                    Max_Mesh_Verts
#SG_Leaf_Nodes ::= unsigned_short
#Materials ::= unsigned_short
#Textures ::= unsigned_short
Max_Mesh_Verts ::= unsigned_int   (specifies the # of verts in largest
                                   mesh in DB)
Global_Data_Records ::= World_Info  Navigation_Info Viewpoint
Light_Data ::= #Lights [Light]#
#Lights ::= byte, values: (0-128)
Light ::= VRML_Light
```

Fig. 18B2

```
SpatialPartitioning(SP)_Encoding ::= SP_Header  SP_Data
SP_Header ::= SP_Type [SP_Type_Specific_Hdr_Data]
SP_Type ::= byte, values: (0 = kd_tree, 1=octree, 2=bounding
           volumes ...)

SP_Type_Specific_Hdr_Data ::= Kd_Tree_Hdr_Data
Kd_Tree_Hdr_Data ::= Bounding_Box  #Cells
#Cells ::= unsigned int
SP_Data ::= Kd_Tree_Data
Kd_Tree_Data ::= [Cell_Data]#Cell
Cell_Data ::= Axis_To_Split  Children   (Group_Cell_No_Children_Spec |
              Group_With_Children_Spec | Leaf_Cell_Spec)
Axis_To_Split ::= 2 bits, values: (00=Leaf_Cell, 01=X, 10=Y, 11=Z)
Children ::= 1 bit, values:
0 = no nodes associated with cell
1 = nodes associated with cell
Group_Cell_No_Children_Spec ::= Split_Value
Split_Value ::= 5 bits, value: [0..1]
Group_Cell_With_Children_Spec ::= #Children_Nodes Reserved_Bits(2)
Children ::= 3 bits Leaf_Cell_Specs ::= Utilize_Next_Byte_For_#Children
                    (#Children_Nodes-4bits | (Reserved(4)  #Children_Nodes-
8bits))
         Utilize_Next_Byte_For_#Children ::= 1 bit
              values : 0 = No. Just use the next 4 bits to specify the #
of children.
              1 = Yes. Utilize the next byte to specify up to 256
children.
```

Fig. 18C

| Node | Count 1 | Node | Count 2 |
|---|---|---|---|
| Group | 1 | Directional Light | 1 |
| Transform (includes Scale, Translation, Rotation) | 1 | Point Light | 1 |
| Translation | 1 | Spot Light | 1 |
| Shape | 1 | Viewpoint | 1 |
| Geometry (abstract node type) | 1 | Navigation Info | 1 |
| Box, Cone, Cylinder, Sphere | 1 | Background | 6 |
| Indexed Face Set (referring to base mesh only) | 1 | Sensor (abstract node type) | 7 |
| Coordinate | 1 | Time Sensor | 7 |
| Color | 3 | Touch Sensor | 7 |
| Normal | 4 | Visibility Sensor | 8 |
| Texture Coordinate | 2 | Proximity Sensor | 8 |
| Appearance | 2 | Plane Sensor, Cylinder Sensor, Sphere Sensor | 9 |
| Material | 5 | Audio Clip | 3 |
| Texture | 2 | Interpolators (abstract node type) | 7 |
| | | Position Interpolator | 7 |
| | | Orientation Interpolator | 8 |
| | | Collision | 10 |
| Light (abstract node type) | 1 | Switch | 7 |

| Object ID | Type | Data Pointer | Priority |
|---|---|---|---|
| 100 | Geometry | xABCD04 | ... |
| 110 | Texture | x3459BC | . |
| 130 | Material | xABC234 | |
| | | | |
| | | | |

METHOD AND APPARATUS THAT PROVIDES A SCALABLE MEDIA DELIVERY SYSTEM

This is a continuation application of Ser. No. 08/768,114 filed Dec. 17, 1996, now U.S. Pat. No. 5,953,506.

FIELD OF THE INVENTION

The present invention relates to apparatus and methods for providing a scalable media delivery system capable of encoding, transmitting and decoding multimedia information in the form of streamed digital data.

BACKGROUND OF THE RELATED ART

Many standardized formats exist for creating digital signals that allow for images and sounds to be recorded, stored, transmitted and played back. Such formats include the MPEG format for digital video, VRML format for 3-D graphics and MPEG and WAV formats for digital audio. Each of these formats is capable of storing sufficient information with respect to a particular image or sound that allows for extremely accurate reproduction of the image or sound.

Despite the fact that these formats allow for conceptually distortion free reproduction of images and sounds, limitations in the computational power of computer systems and network bandwidth limitations prevent reproductions that are as accurate as desired while meeting real time constraints. For more compact and distortion free reproduction, larger quantities of data and/or faster processing is typically required. Accordingly, the digital information that is typically encoded in a given format provides less than optimum resolution so as not to exceed the computational power for decoding available in an "average" computer system and the network bandwidth limitations. Unfortunately, however, computing systems having computational power and available bandwidth that is greater than "average" cannot use the extra computational power they contain and available bandwidth to reproduce images and sound with even greater performance and clarity, since the originally encoded signal contains no further information with which to obtain this greater resolution.

Conversely, if the digital information that is encoded in a given format that provides optimum resolution when being decoded by a high end computer system, other "average" computer systems are unable to decode all of this additional digital information in real time and, therefore, will be unable to reproduce any sound or image at all.

Accordingly, there is a need to for a method and apparatus that allows for the high-end computer systems to decode as much digital information as possible so that they can reproduce images or sounds with optimum resolution for high performance computer systems at the available bandwidth and also provide for "average" or low-end computer systems that receive lesser amounts of information corresponding to their performance capabilities, as well as taking into consideration bandwidth limitations. Thus, for all of these systems, there is the need to receive digital information that is matched to the computational power available.

Further, there is the need for servers to be able, in real time, to determine the amount of digital information to transmit and then transmit this digital information while minimizing the computational power required to perform such operation.

SUMMARY OF THE INVENTION

It is, therefore, an object of the present invention to provide a method and apparatus for reproducing sounds and/or images with a resolution that is optimized to the capabilities of the client computer that is decoding previously encoded sounds and/or images.

It is also an object of the present invention to provide a method and apparatus for encoding digital data representing sounds and/or images as base streams and additive streams of digital data.

It is another object of the present invention to provide a method and apparatus for transmitting base streams and a desired number of additive streams of digital data from a stream server to a client computer based on a profile obtained from the client computer.

It is a further object of the present invention to provide a method and apparatus for decoding base streams and additive streams of digital data to allow for accurate reproduction of sounds and images.

It is a further object of the present invention to provide a method and apparatus that allows for variation in resolution of different media forms so that the quality of a media form such as sound can be increased at the expense of the quality of another media form, such as picture image, according to the desires of the user.

It is a further object of the present invention to provide a method and apparatus that allows minimal processing by the server to achieve the objects recited above.

In order to obtain the objects recited above, among others, the present invention provides an apparatus and method for encoding, storing, transmitting and decoding multimedia information in the form of scalable, streamed digital data. A base stream containing basic informational content and subsequent streams containing additive informational content are initially created from standard digital multimedia data by a transcoder. Client computers, each of which may have different configurations and capabilities are capable of accessing a stream server that contains the scalable streamed digital data. Each different client computer, therefore, may access different stream combinations according to a profile associated with each different client computer. Thus, the streams accessed from the server are tailored to match the profile of each client computer so that the best combination of streams can be provided to maximize the resolution of the 3D, audio and video components. Since different stream combinations can be accessed, this advantageously allows for the various combinations of content and resolution that are tailored to match that of the specific client computer. If desired, however, the profile can be further adapted to increase the resolution of certain characteristics, such as sound, at the expense of other characteristics, such as video.

BRIEF DESCRIPTION OF THE DRAWINGS

FIGS. 7A–D illustrate various adaptive layered streams according to a preferred embodiment of the present invention;

FIGS. 9A, 9B1A–9B1B, 9B2 and 9C provide a flow chart that illustrates a method of creating a base adaptive layered stream from a stream of MPEG data according to the present invention;

FIG. 14 illustrates a more detailed block diagram of components of the adaptive stream server according to the preferred embodiment of the present invention illustrated in FIG. 3;

FIGS. 15A and 15B1 illustrates block diagrams of a sequence of steps usede at the client computer according to the present invention;

FIGS. 15B2A–D illustrates data used in examples describing the process of determining which adaptive stream to transmit.

FIG. 15C illustrates a transmit sequence at the server according to the present invention;

FIGS. 16A–16C illustrate sequences of operations at the client computer according to the present invention;

DETAILED DESCRIPTION OF THE PREFERRED EMBODIMENT

Figure 1:
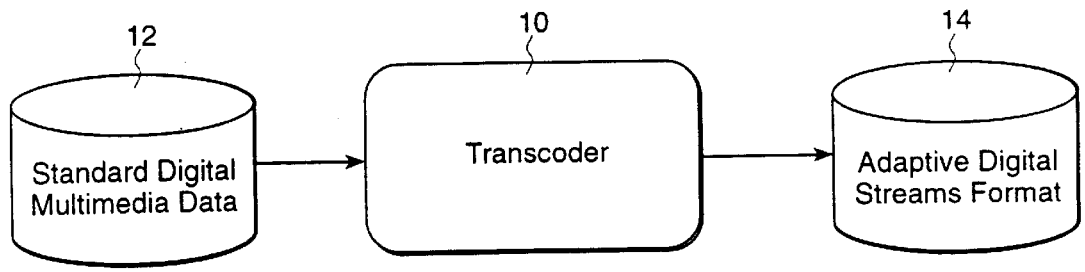
FIG. 1 is a block diagram of a transcoder according to the present invention for converting standard digital multimedia data into digital streams using a transcoder according to the present invention.

FIG. 1 illustrates a transcoder 10 according to the present invention that converts standard digital multimedia data 12 into what will be called adaptive (or scalable) digital streams, such as adaptive digital stream 14, which are created so that subsets of the digital data that allow for distortion free reproduction of images and sounds at different resolutions, depending on factors discussed further hereinafter. Operation of transcoder 10 will be explained hereinafter, but is initially mentioned to clarify that the present invention can operate upon standard digital multimedia data that is stored in one of a variety of formats, MPEG, YUV, and BMP formats for digital video, VRML format for 3-D graphics and MPEG, WAV and AIFF formats for digital audio, as well as be implemented from a multimedia signals that are not digitized.

Figure 2A:
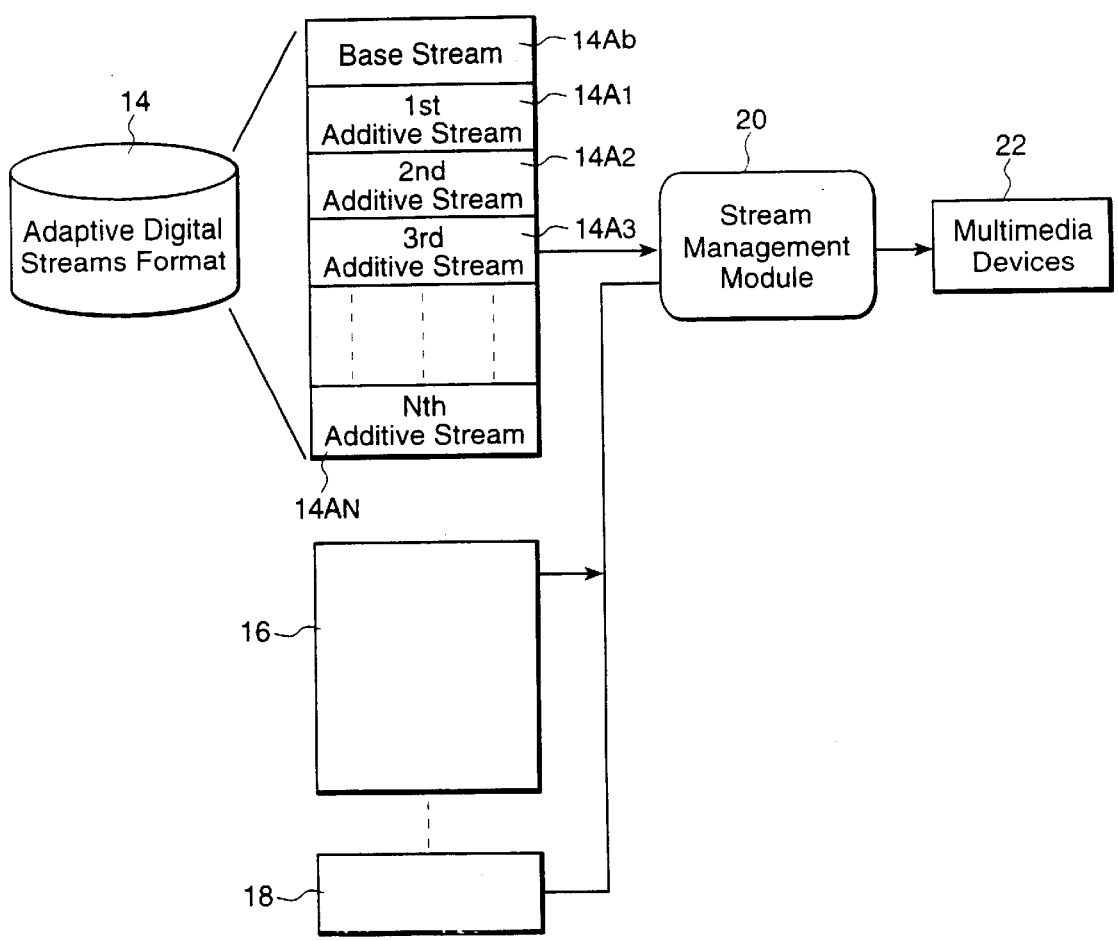
FIG. 2A is a block diagram illustrating a stream management module according to the present invention that selects base and additive streams for use by a multimedia device.

FIG. 2A illustrates that the adaptive digital streams 14 according to the present invention can be identified as having various components, specifically that of a base stream $14A_b$, a first additive stream $14A_1$, a second additive stream $14A_2$, a third additive stream $14A_3$ to an nth additive stream $14A_n$. Adaptive streams 16 and 18 are illustrated in FIG. 2A as streams of data containing information independent from the adaptive stream 14 previously mentioned, but which the present invention can use, as described hereinafter, to obtain various combinations of images and sounds having a desired resolution. The stream management module 20 illustrated in FIG. 2A according to the present invention will obtain a desired resolution profile from a multimedia device 22 and, based upon that desired resolution profile, select the appropriate base and additive streams from the available adaptive digital data streams associated therewith. Stream management module 20 then transmits these selected streams to the multimedia device, where they are decoded and then displayed for the user to experience.

It has been found that the present invention can be most easily implemented if a virtual channel for each different type of multimedia is generated. Thus, if only audio and video is being transmitted, two virtual channels, having bandwidth split between them, are needed. However, if audio, video and 3D are all being transmitted, three virtual channels, having bandwidth split between them, are needed. Such virtual channels allows for independent operation of encoders and adaptive stream processors as described hereinafter with respect to the adaptive servers, as well as independent operation of decoders on the client computer. Synchronization can take place through the use of a master clock or be based upon using an audio signal as a master clock.

Figure 2B:
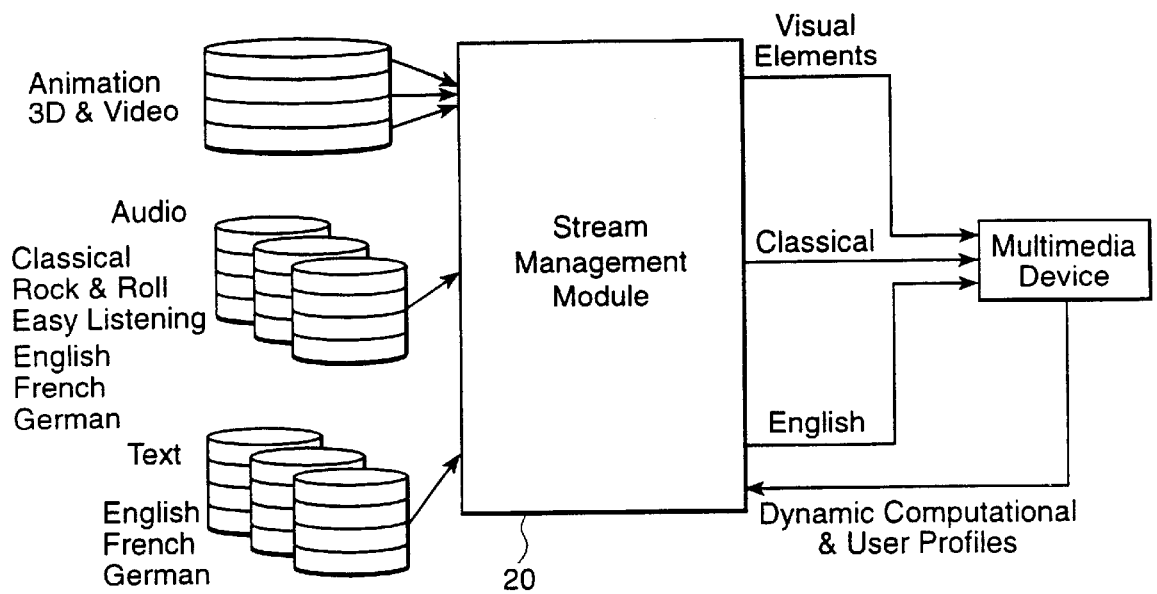
FIG. 2B an example of digital streams being used with a multimedia device through a network having many client devices according to the present invention.

FIG. 2B illustrates a specific example of various types of adaptive digital streams that a stream management module 20 can operate upon. In this example, animation 3-D and video streams provide visual elements that the stream management module can select that can then be displayed for visual sensory perception by a multimedia device. Similarly, textual adaptive digital streams can also be received by the stream management module 20 so that text can also appear and be visually perceived based upon the language that the user desires to obtain. Furthermore, audio is also transmitted by the stream management module based upon profile characteristics selected by the user, such as whether mono or stereo sound that is oversampled or not is desired.

Figure 3:
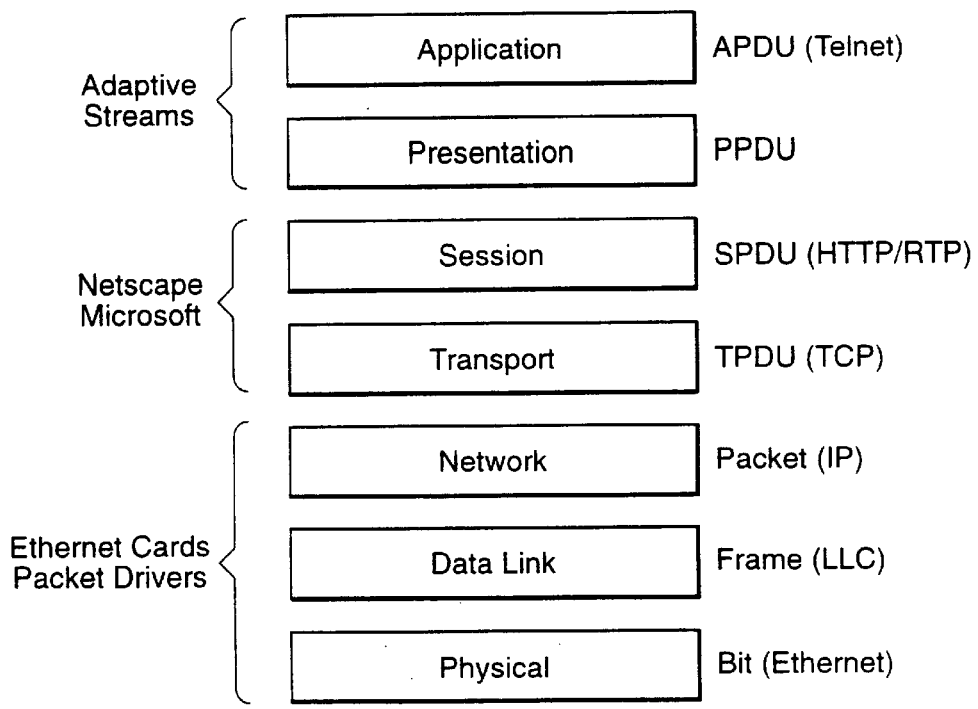
FIG. 3 illustrates the use of digital streams according to the present invention in application and/or presentation layers for media based on the OSI reference transport model.

FIG. 3 illustrates the OSI reference module and layers contained therein which have been set to standardize digital data transmissions. It is noted that the adaptive streams according to the present invention will typically reside within the application and presentation layers of the OSI reference model.

Figure 4:
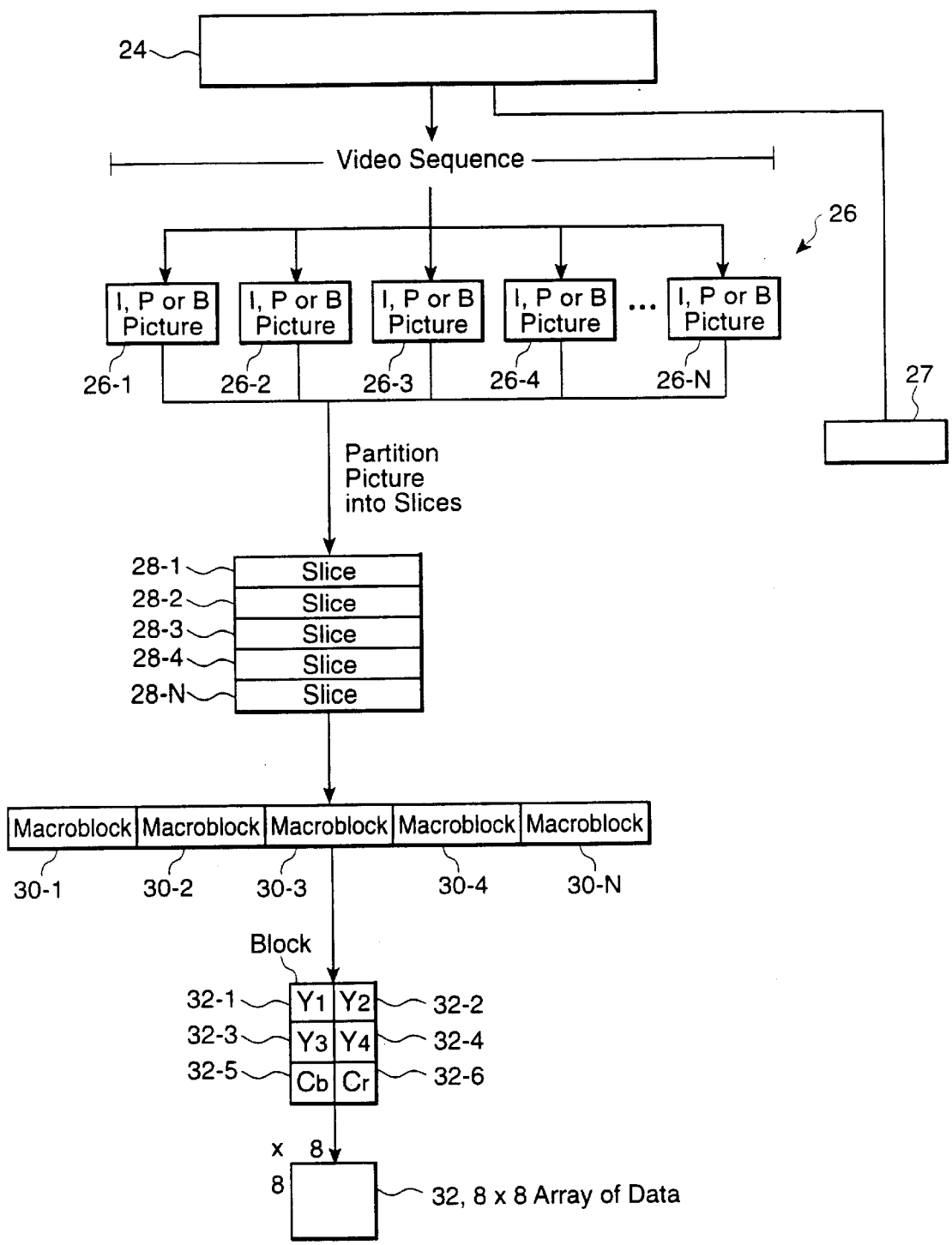
FIG. 4 illustrates properties of conventional digital audio/video format.

FIG. 4 illustrates properties of conventional digital audio/video formats. As illustrated in FIG. 4, an audio/video stream 24 is conventionally decoded into video sequence 26 illustrated by a sequence of pictures 26-1, 26-2, 26-3, 264 . . . 26-n, and an audio sequence 27.

With respect to the video sequence, each of the "pictures" in the video sequence can be formatted in a variety of different ways, depending upon which video format is used. If the format is an MPEG format, which will be used hereinafter to illustrate a presently preferred embodiment of the present invention, each of the "pictures" could be one of an intra coded picture ("I picture"), predicted coded picture ("P-picture) and bidirectional picture ("B picture"). For any of the I, P or B pictures, such a picture will be partitioned into a plurality of slices, that are illustrated as slices 28-1, 28-2, 28-3, 28-4 . . . 28-n. Each slice 28 can then be further subdivided into a plurality of macroblocks 30 illustrated as macroblocks 30-1, 30-2, 30-3, 30-4 . . . 30-n. Each of these macroblocks can be further divided into blocks 32, illustrated as blocks 32-1, 32-2, 32-3 . . . 32-6. In a typical MPEG format, each of these six blocks 32 will correspond to one of either luminance or chromonance values that are necessary in order to render a video image. Each of these blocks 32 are made of an 8×8 array of data in an MPEG format that is well known.

With respect to the audio sequence 27, different adaptive audio streams are created, with mono being a base channel, and stereo and quadraphonic channels being additive. Further, sounds can be oversampled to even further subdivide such audio streams.

Figure 5:
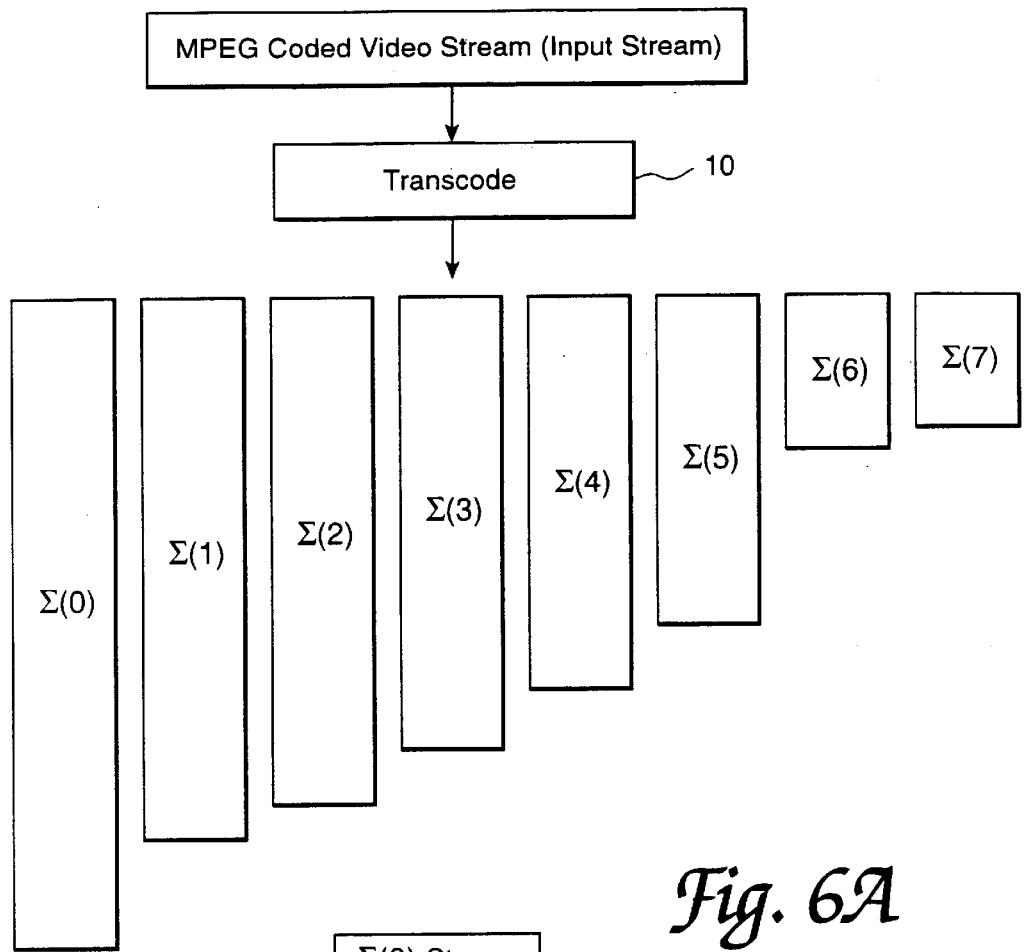
FIG. 5 illustrates a block diagram of an MPEG coded video stream being transcoded into an adaptive layered stream according to the present invention.

FIG. 5 illustrates a block diagram of a presently preferred embodiment of the present invention in which an MPEG coded video stream is input to transcoder 10. Transcoder 10 operates upon the MPEG-coded video stream in a manner that will be described hereinafter to generate a base adaptive digital stream $\Sigma 0$ and additive adaptive digital streams $\Sigma 1$ through $\Sigma 7$.

Figure 6A:
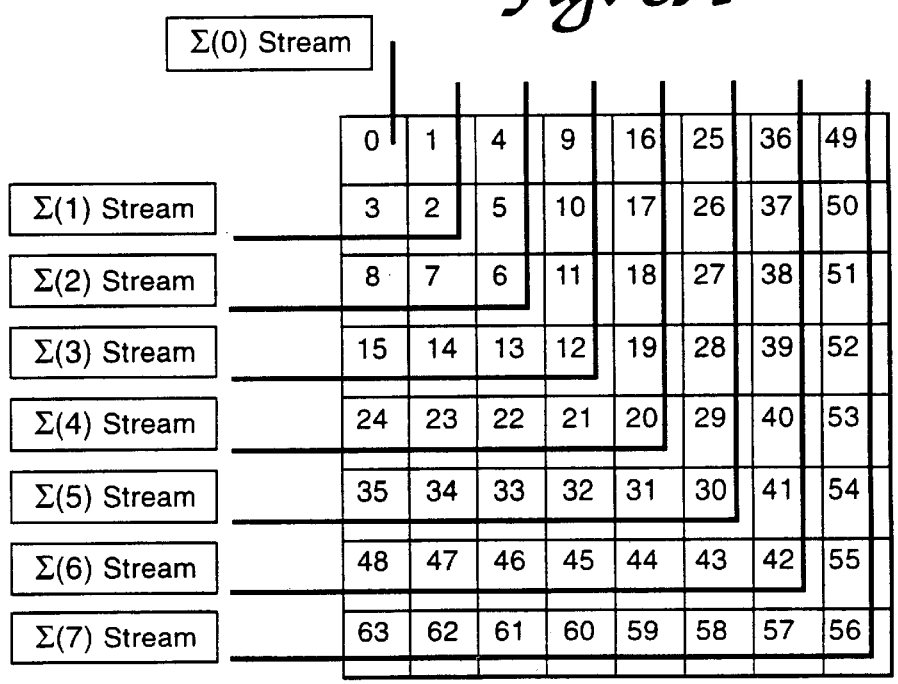
FIGS. 6A–C illustrates embodiments of adaptive layered streams derived from a block of MPEG data.

The present invention derives the different adaptive streams, based upon the 8×8 array size of DCT coefficients that are present in the MPEG binary coded stream format, as well as the presently preferred corresponding stream definition. This definition evolved through a compromise between the need for a sufficient number of streams to allow each additive stream to produce increasingly greater resolution, without the number of streams becoming so large as to be impracticable. Accordingly, the eight adaptive streams illustrated in FIG. 6A are the presently preferred stream format when an MPEG video stream is being operated upon. As is well known, DCT coefficients that appear in the upper left hand corner of the 8×8 matrix illustrated in FIG. 6A are most likely to be non-zero and also most likely to contain a substantial amount of actual information content. Each of the 64 DCT coefficient positions in the array illustrated in FIG. 6A are used in one of the eight different adaptive streams according to the present invention. FIG. 6A identifies the specific DCT coefficients that correspond to each of the specific different streams.

Figure 6B:
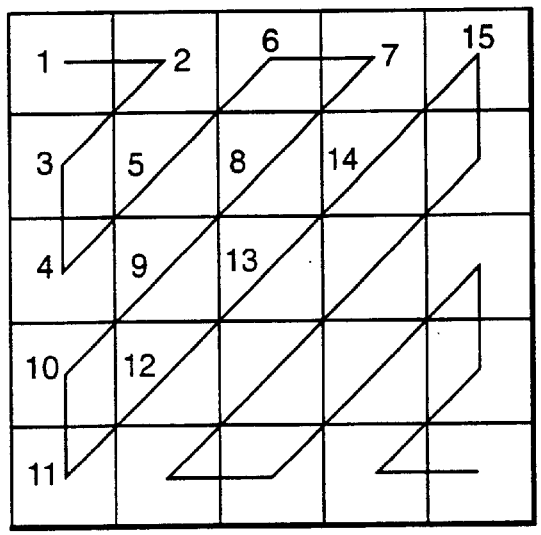
Figure 6C:
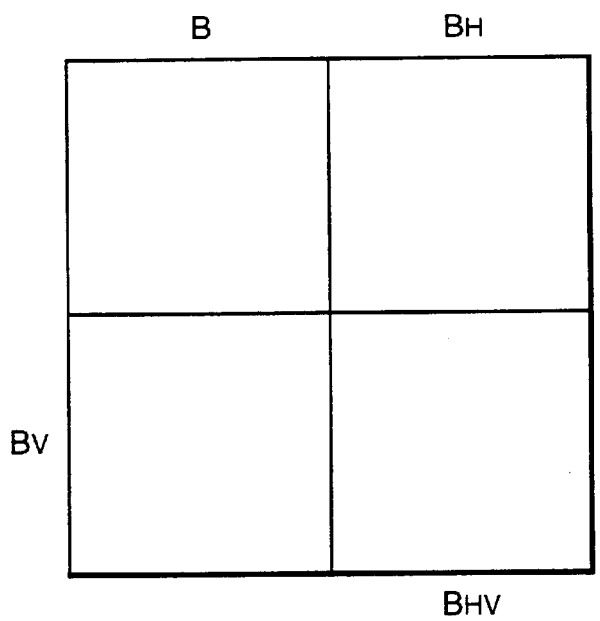

Other adaptive stream definitions could be used, either with an MPEG format or with a format having other characteristics and still be within the intended scope of the present invention. For example, FIG. 6B illustrates the known "zig-zag" partitioning of DCT coefficients that is typically used along with quantization and run-length encoding so that data compression can take place when using the MPEG format. The adaptive streams can be obtained from such a zig-zag pattern by, for instance, defining stream I as coefficients $C_1$–$C_N$, stream 2 as coefficients $C_{N+1}$–$C_m$ and stream 3 as coefficients $C_{m+1}$–$C_p$, where $C_p$ is the total number of coefficients. Applied to MPEG, this number of coefficients is 64, although this could vary as well. Thus, the number of streams can be made variable, as well as the way in which the streams are obtained. FIG. 6C shows yet another example in which four streams are obtained, in this example, the 8×8 DCT coefficient matrix is divided into four 4×4 quadrants, and each of these 4×4 quadrants are used to define a single adaptive screen. If run-length encoding is desired, the zig-zag format can be used within each of these quadrants to obtain the desired data compression.

FIG. 7 illustrates in greater detail the base adaptive stream $\Sigma 0$ and the additive adaptive streams $\Sigma 1$ through $\Sigma 7$ according to the present preferred embodiment of the present invention. Each of the base and additive adaptive streams contain a related sequence start code 40 and related picture start codes 42. These codes are separately identifiable, as each refers, by its code, to one of adaptive streams $\Sigma 0$–$\Sigma 7$. Associated with each picture start code is picture header information including a next picture pointer 44, a drop frame code 46, a temporal reference 48, and a sequence end code 50. Such codes are used within the presently preferred embodiment of the present invention so that any desired subset of the additive adaptive streams can be transmitted from a server to an end user and subsequently be decoded to reconstruct the video sequence at a resolution that corresponds to the number of additive adaptive streams that have been transmitted.

Figure 7A:
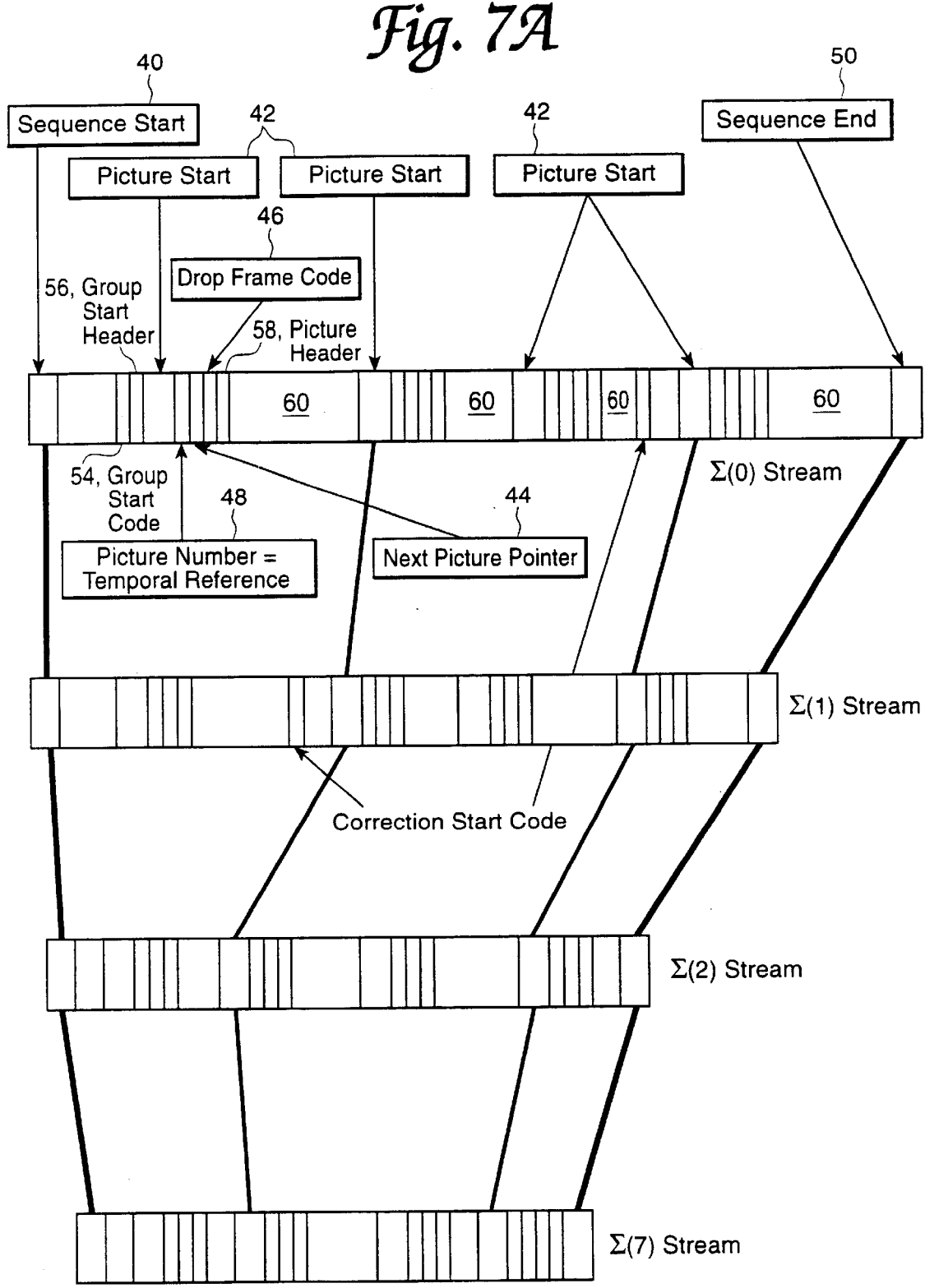

FIG. 7A also illustrates that within the $\Sigma 0$ base stream that there exists sequence header information 52, group start codes 54, group start header information 56, and picture header information 58, which information is not present in the additive adaptive streams $\Sigma 1$–$\Sigma 7$. Furthermore, each of the base and additive adaptive streams of $\Sigma 0$–$\Sigma 7$ contain slice information that corresponds to the actual data contained within the respective stream associated with the picture image.

Figure 7C:
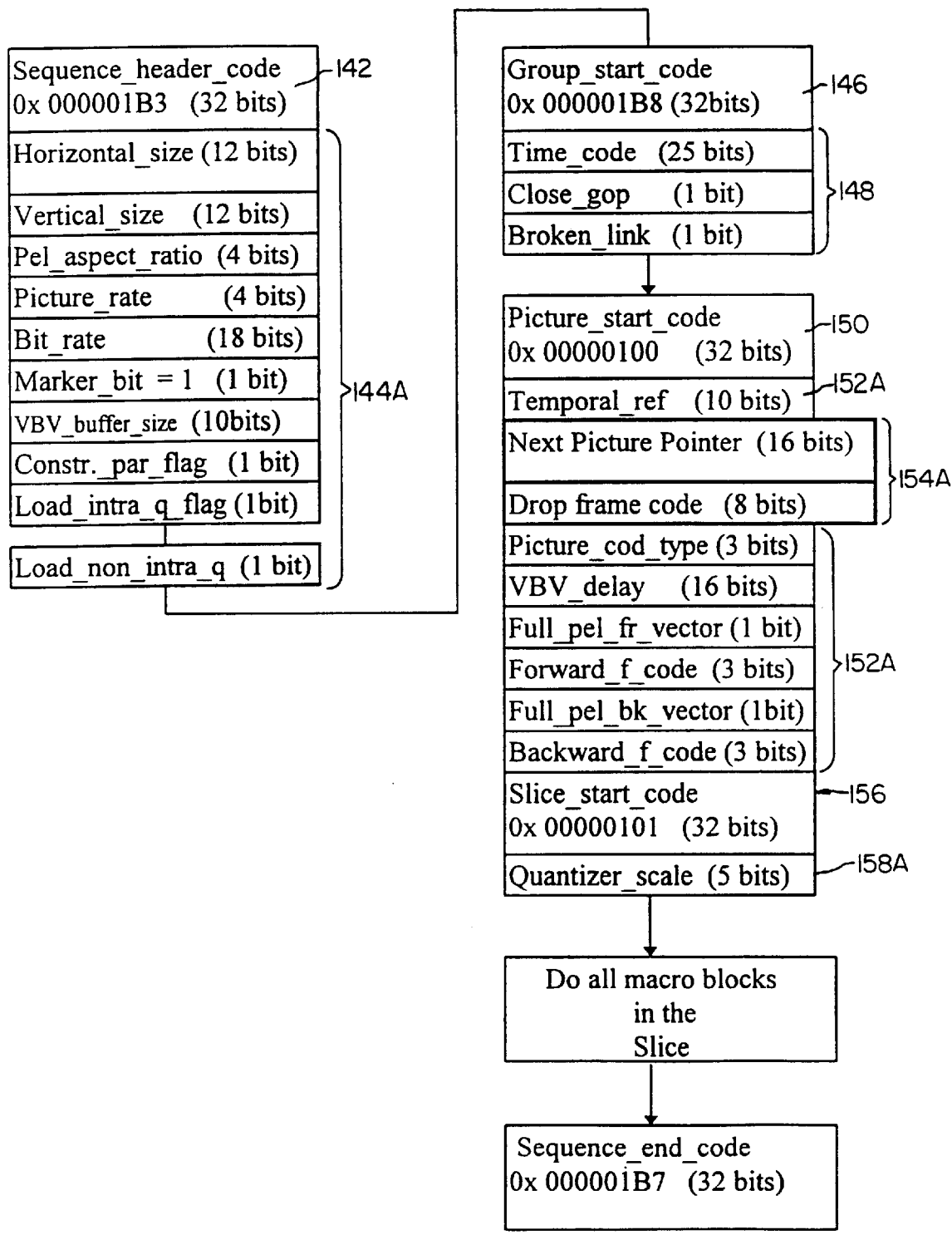
Figure 7D:
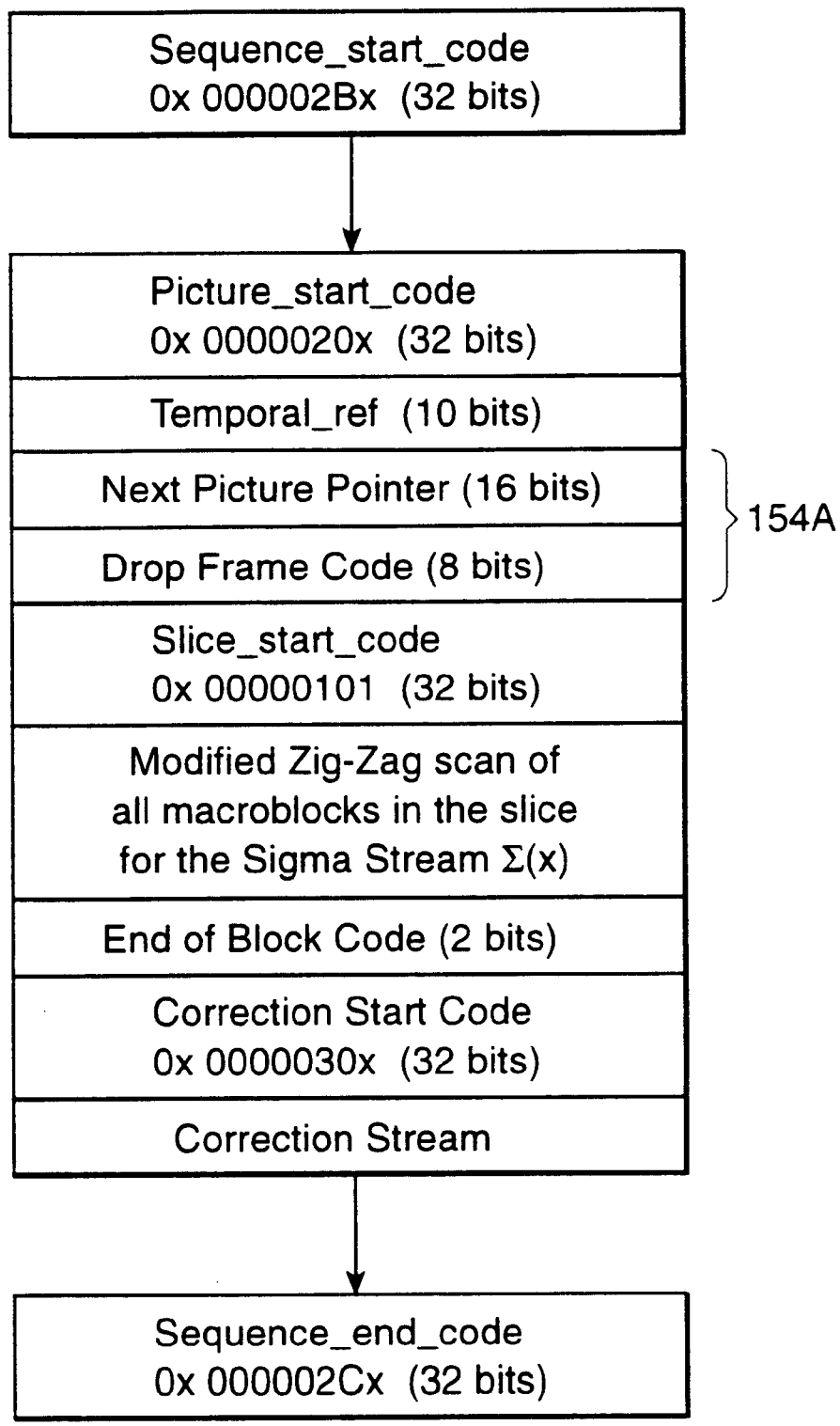

While FIG. 7A illustrates the base $\Sigma 0$ adaptive stream and additive $\Sigma 1$–$\Sigma 7$ adaptive streams separately, FIG. 7B illustrates the data format, as it is stored in the memory of the adaptive server. Specifically, when being stored, the sequence start code 40, sequence header information 52, group start code 54 and group start header information 56 initiate the data sequence. Thereafter, the picture start code 42 and picture header information 58 for the first picture, as well as the slice information for the first slice of that picture, is stored on the server. Thereafter, slice information corresponding to the same $\Sigma 0$ base adaptive stream slice and then corresponding slice information for each of the $\Sigma 1$–$\Sigma 7$ additive adaptive streams are stored. After the information for that slice is stored, information relating to the second slice and then subsequent n slices of that picture are stored, with each slice containing the information of the $\Sigma 0$ base adaptive stream as well as the $\Sigma 1$–$\Sigma 7$ additive adaptive streams, until data for an entire picture is stored. FIGS. 7C and 7D illustrate in further detail the specific information that is associated with each of the adaptive streams, with FIG. 7C illustrating the information associated with each $\Sigma 0$ base adaptive stream, while FIG. 7D illustrates the information associated with each of the $\Sigma 1$–$\Sigma 7$ additive adaptive streams. Much of the information that is identified as being used within these streams is MPEG-like information and further description is therefore not deemed necessary. However, information that has been added so that the adaptive streams according to the present invention have been previously pointed out and will also be further described in detail hereinafter.

After it is determined which of the various adaptive streams to transmit, the transmitted adaptive streams will reconstruct an MPEG video stream having resolution that varies in dependence upon how many of the additive adaptive streams are transmitted. Thus, each of the adaptive streams are encoded in a manner that allows reconstruction of the digital video signal stream by decoding after being transmitted, as will be described in further detail hereinafter. It should also be noted that each of the adaptive streams $\Sigma 0$ through $\Sigma 7$ illustrated in FIGS. 7A and 7B will contain I, P and B pictures when created from an MPEG format.

Figure 8A:
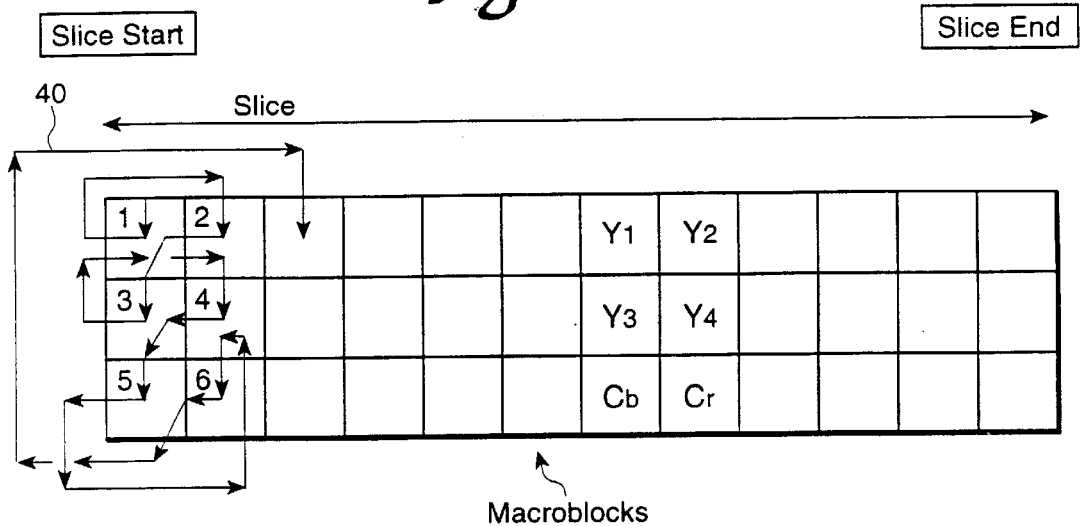
FIGS. 8A and 8B illustrate the contents of a slice of MPEG data and illustrate the preferred embodiments method of obtaining adaptive layered streams for each macroblock of MPEG data.

FIG. 8A illustrates a slice of five macroblocks of MPEG data, with each of these macroblocks containing six blocks corresponding to luminance and chromonance information, as is known. Furthermore, FIG. 8A illustrates via arrow 40 the sequence in which the DCT coefficients within each block are obtained when obtaining base and additive adaptive streams. Specifically, within the first macroblock, the luminance and chromonance blocks labeled with numbers 1–6 that correspond to the sequence in which data corresponding to these blocks is obtained. Furthermore, by the direction of the arrow 40, and with reference to FIG. 6A, it can be appreciated how each of the base and additive adaptive streams are generated. For instance, if the base $\Sigma 0$ stream is being generated, the single zero location DCT coefficient will be generated for each of blocks 1, 2, 3, 4, 5 and 6. However, if the $\Sigma 1$ stream is being generated, the DCT coefficients corresponding to locations 1, 2 and 3 in FIG. 6A will be obtained, in that order, for each of the blocks 1 through 6. Further, each of the additive streams are encoded in run length format with variable lengths. The base stream, however, is preferably not run length encoded.

Having described the format of the base and additive adaptive streams according to the present invention, FIGS. 9A, 9B1A–9B1B, 9B2, and 9C will now be referred to when describing the operation of transcoder 10 illustrated in FIG. 5, which at the present time is implemented as a sequence of computer instructions corresponding to the program description that follows, but, can also be embodied as a purely hardware device, or a combination of hardware and software components, that can be used to create each of the base and additive adaptive streams $\Sigma 0$–$\Sigma 7$ according to the present invention.

As illustrated in FIG. 9A, an MPEG coded video bit stream 100 is input into a conventional MPEG decoder 102 so that a video sequence 104 results. This video sequence 104 is split and will typically have pixel domain frames that occur at a frame rate of 30 frames per second. These frames, after being split, are each separately input into one of temporal filters 106A, 106B and 106C. Each of these temporal filters are provided to enhance the quality of the video signal based upon different frame rates that the video image will ultimately be transmitted at to the client computer. In the presently preferred embodiment, the three temporal filters 106A, 106B and 106C are provided so that three different bands that correspond to three different frame rate ranges are obtained. Specifically, after being filtered by temporal filter 106A, the output of this filter is a video sequence that occurs at 30 frames per second, whereas the video sequence output of temporal filter 106B is at 15 frames per second, and the video sequence that is output of temporal filter 106C is 7.5 frames per second. Of course, a greater or lesser number of bands could be provided if desired.

With respect to each of the temporal filters 106, the filter illustrated in FIG. 9A as filter 106B is representative and is illustrated in greater detail as a filter that is capable of storing "n" number of sequential luminance and chromonance frames. Specifically, frame storage devices $110_0, 110_1, 110_2 \ldots 110_n$, for sequential frames. Each of these frames are multiplied with one corresponding weight $a_0, a_1, a_2 \ldots a_n$, by multipliers $112_0, 112_1, 112_2 \ldots 112_n$. The output of these weighted frames is then added together in an adder 114 and, thereafter, subsampled and output by a decimator 116 so that the output video sequence occurs at the appropriate rate. For instance, the video stream output of the temporal filter 106B will be 15 frames per second as previously discussed.

The weights $a_0, a_1, a_2 \ldots a_n$ that can be used according to the presently preferred embodiment of the present invention are illustrated below in Table 1:

TABLE I

| Decimation Factor | Filter Tap Coefficients | Preferred Embodiment |
|---|---|---|
| 4 | 0.179, 0.641, 0.179 | Band 3 |
| 4 | 0.04375, 0.2515, 0.4005, 0.2515, 0.06375 | Band 3 or 1 |
| 2 | 0.142, 0.717, 0.142 | Band 2 |
| 2 | 0, 0.232, 0.535, 0.232, 0 | Band 2 |
| 4 | $1\ 4(x_n + x_{n-1} + x_{n-2} + x_{n-3})$(Haar Type) | Band 3 |
| 2 | $1\ 2(x_n + x_{n-1})$ (Haar) | Band 2 |

It is noted that in the presently preferred embodiment, the filter tap coefficients for the temporal filter 106A are identified in Table 1 as "Band 1" tap coefficients, that the tap coefficients for temporal filter 106B are identified as "Band 2" tap coefficients in Table 1, and the tap coefficients for temporal filter 106C are identified in Table 1 as "Band 3" tap coefficients. By use of these temporal filters, there is provided the least amount of blurring and motion slow down at the highest frame rates, as well as the greatest smoothing at the lowest frame rates and for frame rates between the highest and the lowest rates.

Referring again to FIG. 9A, the output from temporal filter 106A is a video sequence 120A that occurs at 30 frames per second, which is input into a convention MPEG encoder 122A. The video sequence 120B output from temporal filter 106B is input to a conventional MPEG encoder 122B at a frame rate of 15 frames per second, whereas the video sequence 120C output from temporal filter 106C is input to a conventional MPEG encoder 122C at a frame rate of 7.5 frames per second. The output from each of the MPEG encoders 122A–122C are then input to respective spatial scaling transcoders 124A, 124B and 124C, respectively. Operation of the spatial scaling transcoders 124 will now be described.

It should first be noted that the operation of each of the spatial scaling transcoders 124A, 124B and 124C is identical. In fact, the same transcoder could be used in transcoding the MPEG video stream to obtain an adaptive stream according to the presently preferred embodiment of the present invention, since the transcoding process takes place at a time that is prior to the time that the generated adaptive streams will be transmitted to a client computer. However, the input to the spatial scaling transcoders 124A, 124B and 124C will be different, since the frame rate that is being input is different, as discussed previously. The spatial scaling transcoding for the $\Sigma 0$ base stream will be described separately from the transcoding of the $\Sigma 1$–$\Sigma 7$ additive adaptive streams. It should be noted, however, that typically the base and additive adaptive streams will not be separately created, but will instead be created at the same time from a set of data that is partitioned, as has been previously described with reference to FIG. 6A, in an interleaved manner, so that at the end of the transcoding all of the base and additive streams result.

Figure 8B:
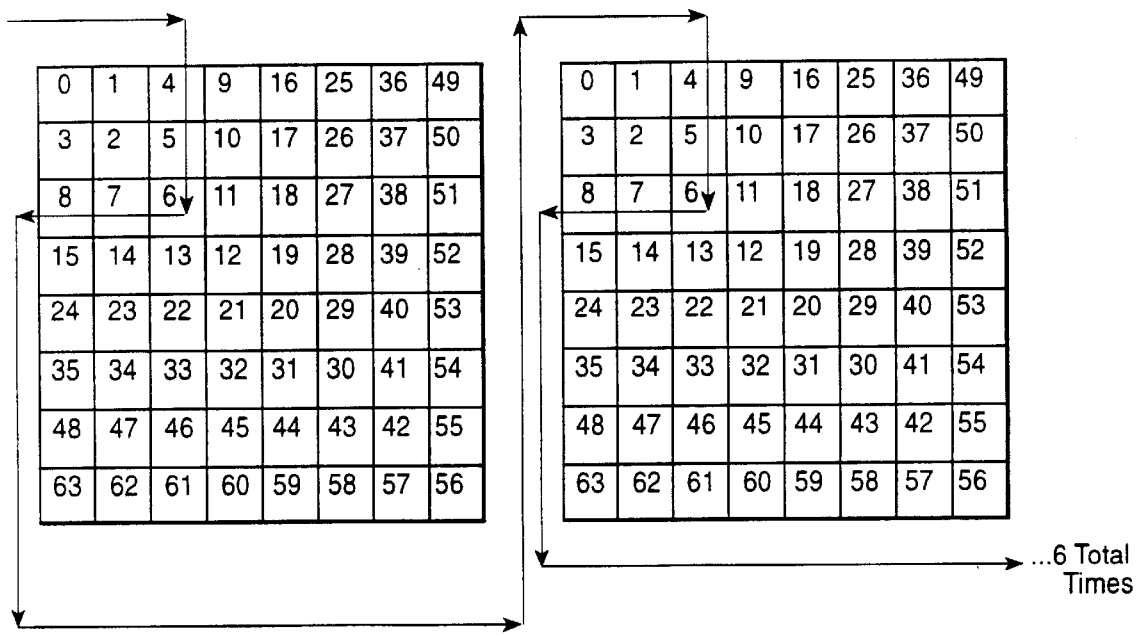
Figure 9C:
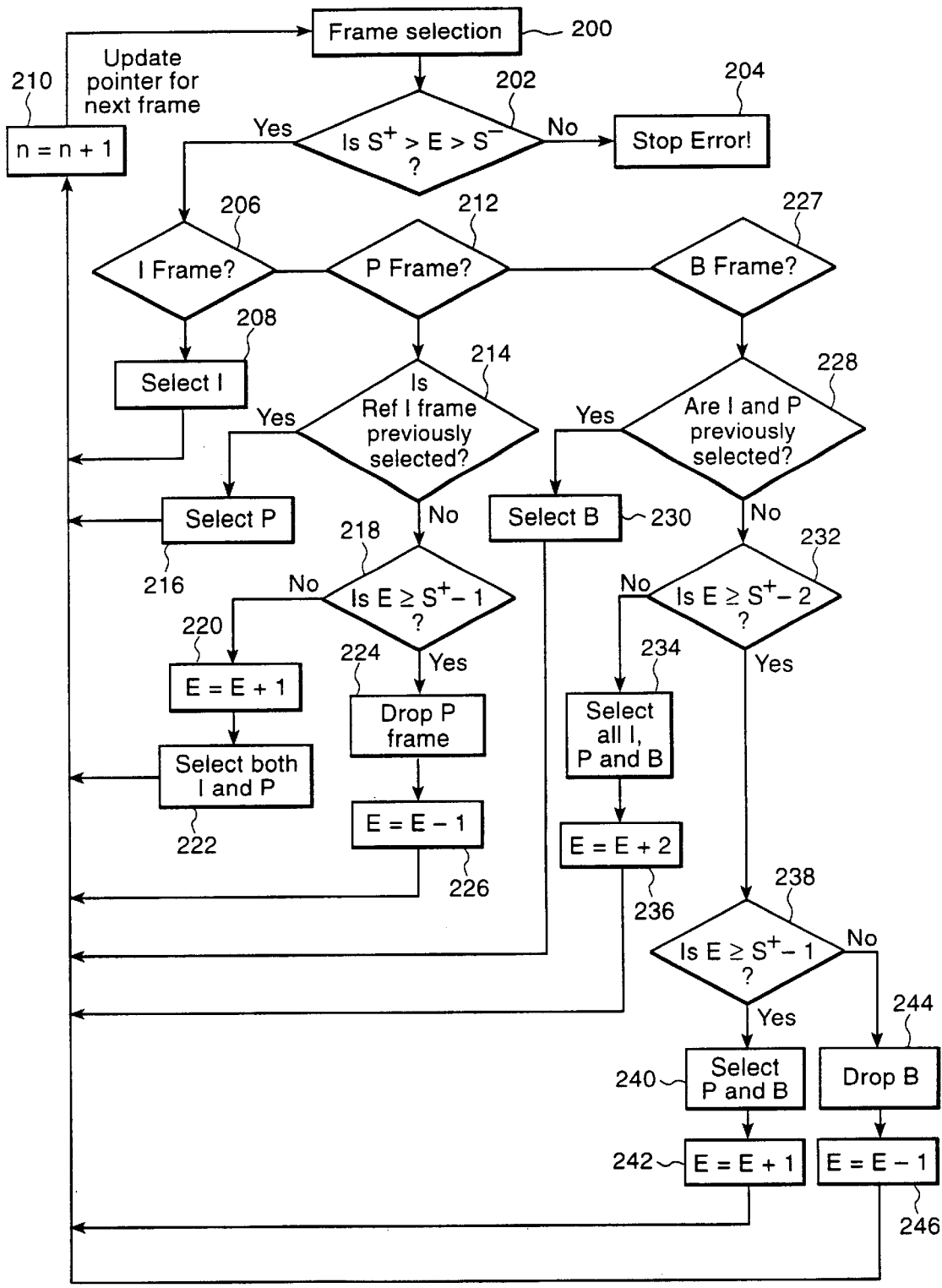

Referring to FIGS. 9B1A–9B1B, the MPEG encoded signal, such as signal 126A output from the MPEG encoding 122A, is searched to find a sequence start code in a step 140. Once a sequence start code corresponding to an MPEG start code sequence is located, an adaptive stream sequence start code is written in a step 142. Thereafter, in step 144, MPEG standard sequence header type information, such as illustrated by group 144A signals in FIG. 7C is written. Thereafter, in step 146, an adaptive stream group start code is identified, this group start code identifies not only that this is a signal that corresponds to a "new I picture," but also identifies that this signal is associated with a Σ0 base adaptive stream according to the present invention. Thereafter, in step 148, MPEG standard group header type information such as identified by information 148A in FIG. 7C is written. Step 150 follows and an adaptive stream picture start code is written once the MPEG picture start code is detected. Thereafter, in step 152, MPEG picture header type information is written, which corresponds to information 152A that is illustrated in FIG. 7C. Thereafter, in step 154, a memory allocation for adaptive stream picture header information is made. With reference to FIG. 7C, this information is identified as information 154A, more specifically the next picture pointer and drop frame code. Further explanation of how the next picture pointer and drop frame code are obtained and inserted into this allocated memory will be described hereinafter with reference to FIG. 9C. After step 154, step 156 occurs and an adaptive stream slice start code is written which is derived from an MPEG slice start code. Thereafter, in step 158, MPEG slice header type information is written, which is identified in FIG. 7C as information 158A. Operations are subsequently performed on each of the macroblocks in the slice to obtain the data that corresponds to the Σ0 base adaptive stream which information corresponds to known MPEG macroblock sequences or the ODCT coefficient identified in FIG. 6A as will be described with reference to FIGS. 11A—C hereinafter. Macroblock information is written in a sequence that corresponds as illustrated and has been previously described in FIG. 8. At the end of the slice, step 162 follows and a memory allocation for a write correction code is inserted. The creation of the write correction code will be described subsequently with reference to FIG. 10. Thereafter, in step 164, determination is made whether it is the end of a sequence. If it is the end of a sequence, the Σ0 base adaptive stream transcoding process is completed except for the insertion of the write correction code, the drop frame code and the next picture pointer, as will be described hereinafter. If it is not the end of the sequence, a determination in step 166 is made as to whether the following sequence initiates a new group (of I-intrapictures). If so, operation proceeds to step 146 of writing an adaptive stream group start code as previously explained and operation continues from there. If a new group code is not identified, a determination is made in step 168 whether there is a new picture by detecting a new picture start code. If there is a new picture start code, a new adaptive stream picture start code is written as previously explained in step 152, and the steps from there follow. If, however, a new picture start code is not detected, more slices in the existing picture must exist and so a new adaptive stream slice start code is generated, as previously described with reference to step 156, and the steps follow from there. As a result of this Σ0 transcoding process, as explained, Σ0 base adaptive streams are generated.

FIG. 9B2 illustrates the sequence of steps necessary to generate the Σ1–Σ7 additive adaptive streams. In the generation of these additive adaptive streams, for each of the streams, the sequence start code of the MPEG signal is detected in step 180. If it is determined that there is a sequence start code, in step 182 there is next searched for the MPEG picture start code, since the codes prior to that are not needed for generation of the Σ1–Σ7 additive adaptive streams. Thereafter, in step 184, an adaptive stream picture start code, which corresponds to that specific additive adaptive stream (one of Σ1–Σ7) is written. At that time, a temporal reference that identifies which picture in the group that this particular picture corresponds to is also written. Step 185 follows and a memory allocation for adaptive stream picture header information is made. With reference to FIG. 7C, this information is identified as information 154A, more specifically the next picture pointer and drop frame code. Further explanation of how the next picture pointer and drop frame code are obtained and inserted into this allocated memory will be described hereinafter with reference to FIG. 9C. Thereafter, in step 186 an adaptive stream slice start code is generated. Thereafter, in step 188 information corresponding to that adaptive stream for each of the blocks in the slice is sequentially written. Reference is made to FIG. 8B which illustrates the scanning pattern for the Σ2 additive adaptive stream. Information is written for each block in a macroblock (and each macroblock in a slice) that corresponds to this additive adaptive stream. Reference is again made to FIGS. 6A and 8A as well as FIG. 8B for an illustration of the difference additive adaptive streams as well as the sequence used to generate each respective stream. After step 188, step 190 follows and memory allocation for a write correction code is made. The creation of the write correction code will be described subsequently with reference to FIG. 10. Thereafter, in step 192, it is determined whether there is an end of the sequence. At the end of the sequence, thereafter follows insertion of the write correction code, the drop frame code and the next picture pointer, as will be described hereinafter. If not, step 194 follows, and a determination is made whether there is a new picture. If there is a new picture, step 184 follows, as previously described, and an adaptive stream picture start code for that specific additive adaptive stream (one of Σ1–Σ7) is made. If not, it is known that another slice for the picture was currently being operated upon remains and new slice start code that also corresponds to that specific additive adaptive stream is written in step 186 and the steps following that follow subsequently.

As noted, while information relating to each of the additive streams is stored on the server for each of the different frequency band (such as the frequency bands identified with respect to the description previously provided in FIG. 9A with reference to the temporal filters 106) frames must still be dropped if the actual frame rate is less than the maximum frame rate of that band. Thus, for instance, at a frame rate of 20 frames per second, the adaptive streams that had been generated by spatial scaling transcoder 124A will be used, but certain of those frames that were generated at 30 frames per second must be dropped so that a frame rate of 20 frames per second is obtained. FIG. 9C illustrates steps required to generate the frame drop code and the next picture pointer, which can be inserted into memory allocated for these codes. It should be noted that the frame drop code maintains information that determines whether to drop that particular frame for each adaptive stream for a variety of different frame rates. Table II below provides one example of the different frame rate sub-bands with each sub-band having a different bit indicating whether a particular frame is dropped at a particular frame rate.

TABLE IIA

| Frame Rate | 30 | 28 | 26 | 24 | 22 | 20 | 18 | 16 |
|---|---|---|---|---|---|---|---|---|
| Drop Code | "X" | | | | | | | |

TABLE IIB

| Frame Rate | 15 | 14 | 13 | 12 | 11 | 10 | 9 | 8 |
|---|---|---|---|---|---|---|---|---|
| Drop Code | 0 | | | | | | | |

TABLE IIC

| Frame Rate | 7.5 | 7 | 6.5 | 6 | 5.5 | 5 | 4.5 | 4 |
|---|---|---|---|---|---|---|---|---|
| Drop Code | 0 | | | | | | | |

In FIG. 9C, in the step 200, frame selection is made. Frames are selected at a rate that corresponds to the frame rate within each of the sub-bands that is used in determining of the drop frame code of Table II illustrated above. After a frame is initially selected in the frame selection in step 200, determination is made whether the error is within a present maximum deviation (noted in FIG. 9C as S+ and S−). The error is the deviation from the actual number of frames that have been selected versus the desired frame rate (in this instance 28 frames per second). If the error exceeds the maximum deviation, the system is stopped in step 204, an error is noted, and a recalculation of the weighting factors used to determine which I, B, and P frames to select is made. This calculation is performed, in the first instance, in the following manner.

The MPEG stream contains frames of type I, P and B. Let there be a total of N frames in the bitstream.

1. Choose a rational number K/L such that
   fout K
   fin~L, L≧K such that fout≦fin and fout corresponds to the desired frame ratio.

2. Choose a set of three whole numbers $M_I$, $M_P$ and $M_B$ so that $$M_I \cdot N_I + M_P \cdot N_P + M_B \cdot N_B = KN \ldots 1$$

where $N_I$=# of I frames in the stream
$N_P$=# of P frames in the stream
$N_B$=# of B frames in the stream
$N_I > 0$, $M_P > 0$ and $M_B > 0$;

$$M_I + M_P + M_B = K;$$

this means that equation 1 can be written as $$\left(\frac{M_I}{K}\right) N_I + \left(\frac{M_P}{K}\right) N_P + \left(\frac{M_B}{K}\right) N_B = N$$

which means that weights $$W_I = \frac{M_I}{K}; 1 \geq W_I > 0$$

$$W_P = \frac{M_P}{K}; 1 \geq W_P > 0$$

$$W_B = \frac{M_B}{K}; 1 \geq W_B > 0$$

satisfy $$W_I + W_P + W_B = 1$$

3. In the MPEG bitstream, since P frames depend on I frames and B frames depend on both I and P frames, frames appear in the order of, for example, IPBBPB-BIPBB . . . To obtain the desired frame rate, this frame sequence is replicated by repeating I by $M_I$, P by $M_P$ and B by $M_B$. This results in a sequence:

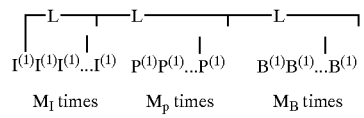

Whose total length is exactly KN where K is the supersampling factor.

4. Set excess counter, E=0; Maximum deviation=S⁺=S⁻= D, which is preferably 3 or 4, but can be smaller or larger.

5. Sample the supersequence with a period of L. That is

```
┌─L──┬──L──┬──L──┐
│    │     │     │
I⁽¹⁾I⁽¹⁾I⁽¹⁾...I⁽¹⁾  P⁽¹⁾P⁽¹⁾...P⁽¹⁾  B⁽¹⁾B⁽¹⁾...B⁽¹⁾
M_I times       M_p times        M_B times
```

Selected frames have period L (arrows point the selected frames).

It should be noted that the weights of $W_I$, equal to 0.6, $W_P$ equal to 0.3, and $W_B$ equal to 0.1 are weights which have been discovered to be most effective in properly determining which frames to drop.

After step 204, determination is made as to whether the frame currently being looked at is a in I-frame, a P-frame, or a B-frame. If an I frame is detected in step 206, frame 208 follows and the I frame is selected by coding a "0" in the drop frame code bit location that corresponds to the frames per second selection as currently made. For the example being given, if the frame selected is 28 frames per second, and an I frame is selected, a "0" will be placed in the bit position marked as a "X" in Table I beneath the 28 frames per second frame rate. Thereafter, step 210 follows and the next picture pointer is written to provide an address to point to the start next frame. It is noted that this pointer address will in actuality be an offset that indicate the number of bits between a present frame address and the next frame start address. This can be determined since, in the creation of the adaptive streams, memory space is allocated for the picture pointer as previously noted. Similarly, the drop frame code is inserted. Thus, in step 210, it is only required to search for the next picture start code to determine the number of bits to the next picture start code.

Referring back to FIG. 9C, after the pointer has been updated in step 210, the next frame is selected and a determination is made whether it is an I frame, a P frame or a B frame. If it is not another I frame, a determination is made in step 212 as to whether it is a P frame. If it is P frame, step 214 follows and a determination is made as to whether the I frame, which is referenced by this P frame, has been previously selected. If this referenced I frame has been previously selected, step 216 follows and this particular P frame is selected and the drop frame code bit corresponding to the particular frame rate (in this instance the "X" at 28 frames per second in Table II) is inserted for this particular P frame. Thereafter, for this P frame, step 210 follows and the next picture pointer is written for this P frame. If, however, in step 214 the referenced I frame has not been previously selected, step 218 follows and a determination is made as to whether the deviation error will still be acceptable if another frame is added in step 218. Thus, if this error is greater than or equal to $S^{+-}1$, then step 220 follows, the error is incremented by 1, a selection of both the previously unselected I and the previously unselected P frames are made. It should be noted that the previously unselected I frame will then, for this particular frame rate, have its drop frame code changed so that while it had previously had been a dropped frame, it is no longer a dropped frame and its drop frame code is changed to reflect this. Thereafter, step 210 follows again, and the pointer is updated so that the next picture pointer for this particular frame can be updated as previously described. However, in step 218, if it is determined that the error will be greater than the maximum allowed deviation if another frame is added, then step 224 follows and this particular P frame is dropped. Step 226 follows and the error value is decremented by 1 to reflect that this particular P frame has been dropped. Thereafter, step 210 follows and the next picture pointer for this particular frame, even though it is dropped, is written as has been previously described.

When the next frame is selected, if it is determined that is neither an I or a P frame, step 228 follows and a determination is made as to whether the I and P frames, upon which this B frame is based, have been previously selected. If both the I and P frames have been previously selected, step 230 follows and this particular B frame is selected and the drop frame code is written accordingly. Thereafter, step 210 follows so that the next picture pointer for this particular frame is written as has been previously described. If, however, in step 228 both of the I and P frames have not been previously selected, then step 232 follows and a determination is made as to whether the deviation will still be within the maximum allowable deviation if two frames are added. If it is still within those allowable limits, step 234 follows and the I and P frames, if neither have been selected, as well as the current B frame are selected, and the drop frame codes updated accordingly. Thereafter, in step 236, the error value is incremented by 2 to indicate that the previously unselected I and P frames have now been selected. Thereafter, step 210 follows as has been previously described.

If, however, in step 232 it was determined that the maximum allowable deviation would be exceeded, then a determination is made as to whether the previous I frame has been selected and whether the deviation, if only incremented by 1, would still be within the allowable limits in step 238. If the deviation would still be within the allowable limits and the I Frame has been selected, step 240 follows and the previously unselected P frame, as well as the current B frame, are then both selected and the drop frame codes updated appropriately. Thereafter, step 242 follows and the error value is incremented by 1 to note the selection of the previously unselected P frame and, thereafter, step 210 follows and the next picture pointer is updated as previously described for this particular P frame. If, however, in step 238 it is determined that the maximum deviation would still be exceeded by adding a single frame, then step 244 follows, and this particular B frame is dropped. Thereafter, in step 246 the error value is decremented by 1 to note that this particular frame has been dropped and then step 210 follows so that the next picture pointer is added to this particular frame. Thus, using this methodology, the drop frame code can be determined for each frame at each of the different frame rates of interest.

Reference will now be made to FIG. 9D to describe step 160, referred to previously, in more detail. After the MPEG slice headers have been detected and written into memory in step 158, as previously described, step 160 follows and, for each macroblock in the slice, a sequence of MPEG-like steps generally referred to as step 260, which will not be described in detail, sequentially follow. In essence step 260 determines whether the information in a new macroblock is the same as that in a previous macroblock as well as whether a specific type of motion is detected. If it is determined that this macroblock contains DCT coefficients, then, in step 262, the "O"DCT coefficient for each of the six blocks within the macroblock are successfully written into the base adaptive stream. Thus, the first four luminance values and then the subsequent two chromonance values, as illustrated in FIG. 8A are successively written into the base adaptive stream.

Figure 10:
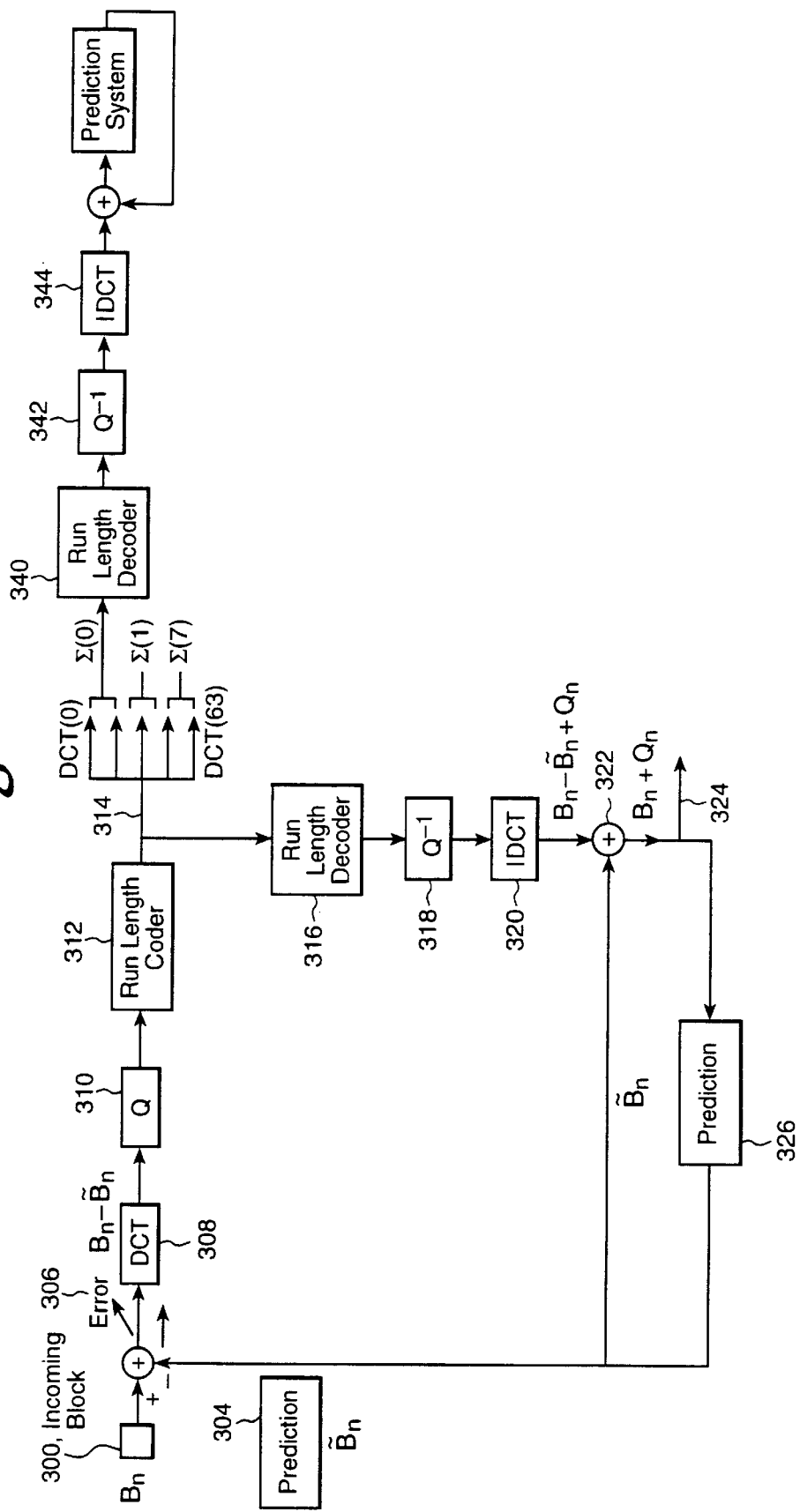
FIG. 10 provides a flow chart that illustrates a method of creating correction codes according to the present invention.
Figure 11A:
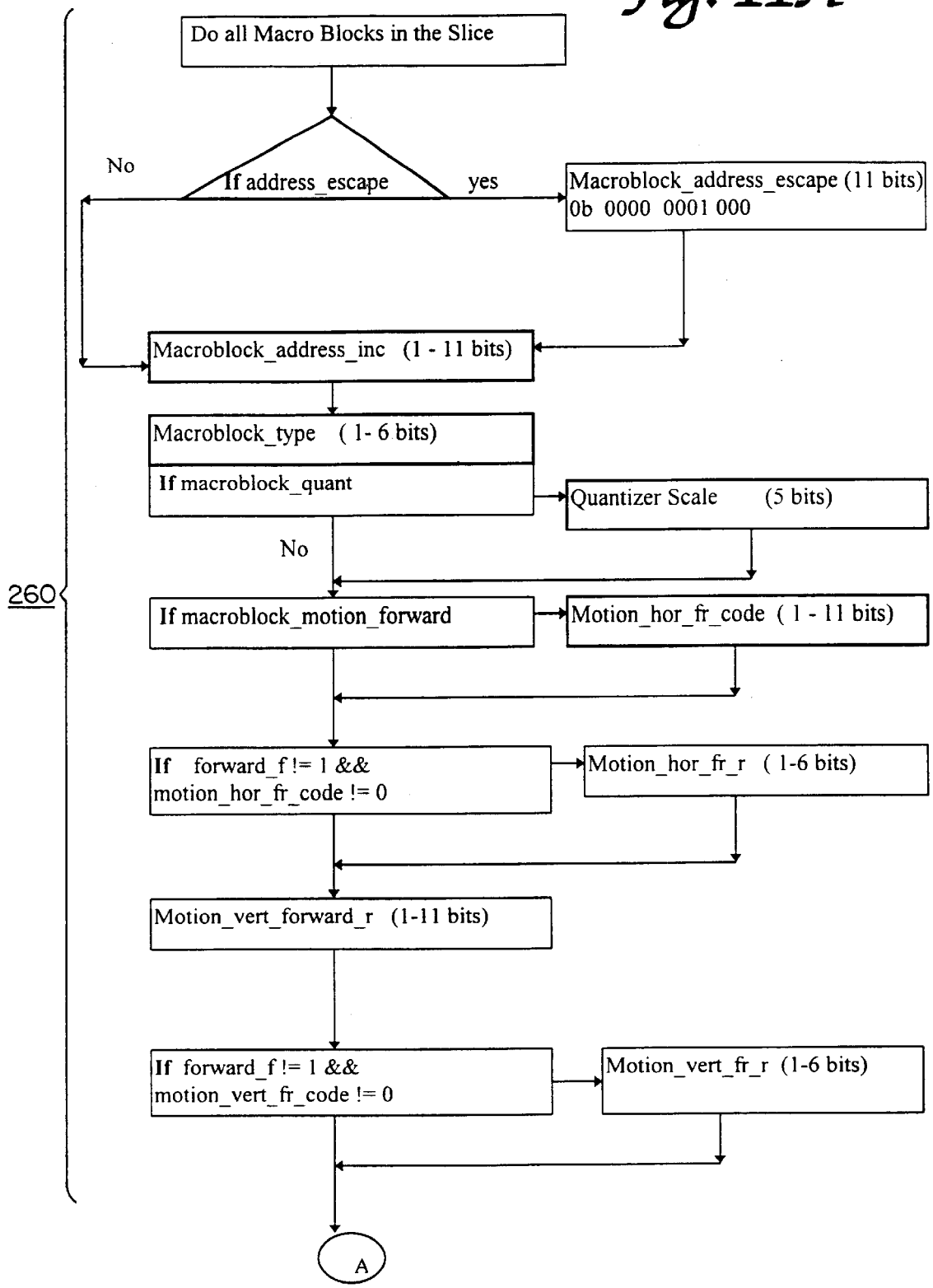
FIGS. 11A–11C further illustrates step 160 in FIG. 9B1B.
Figure 11B:
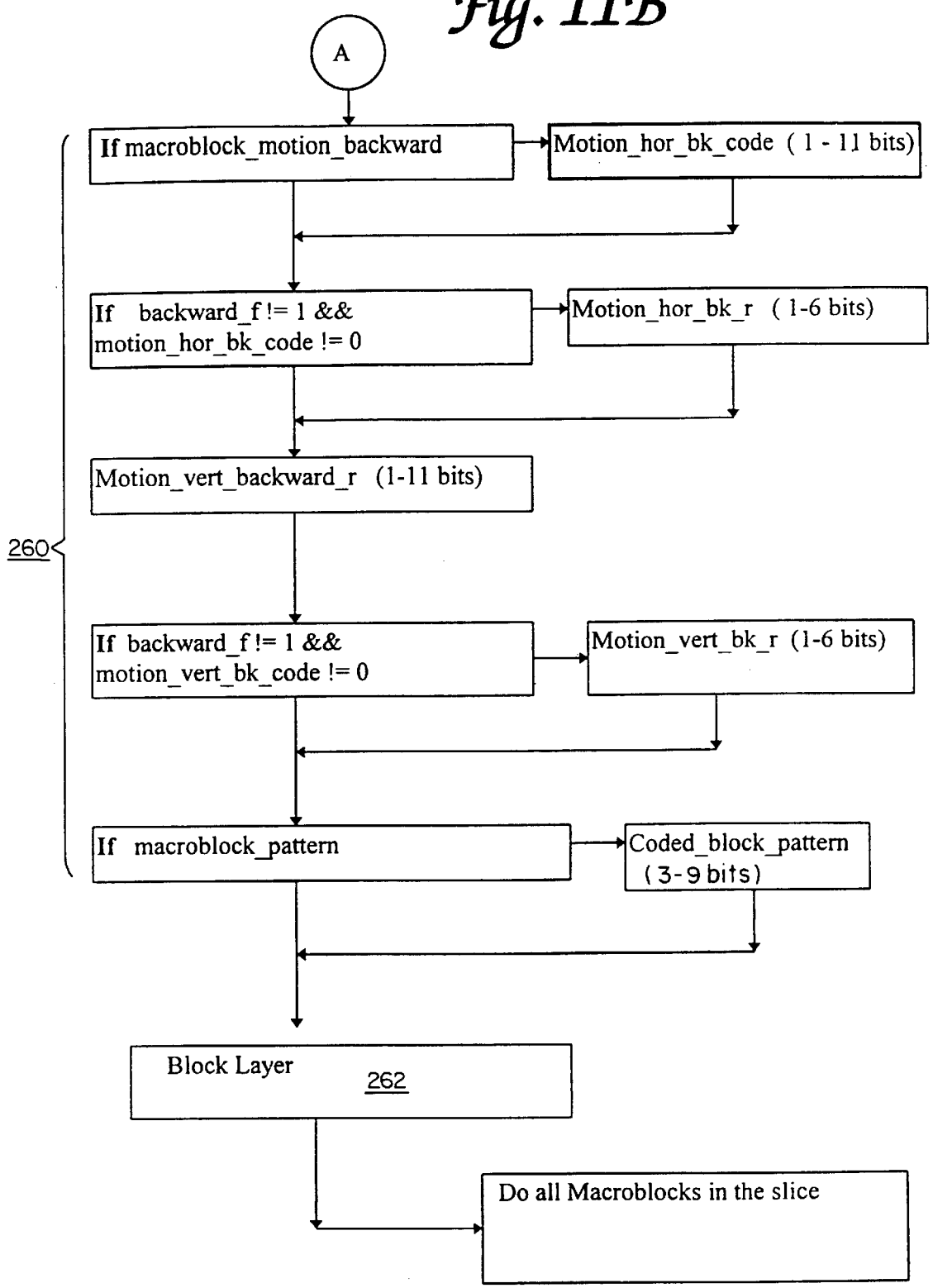
Figure 11C:
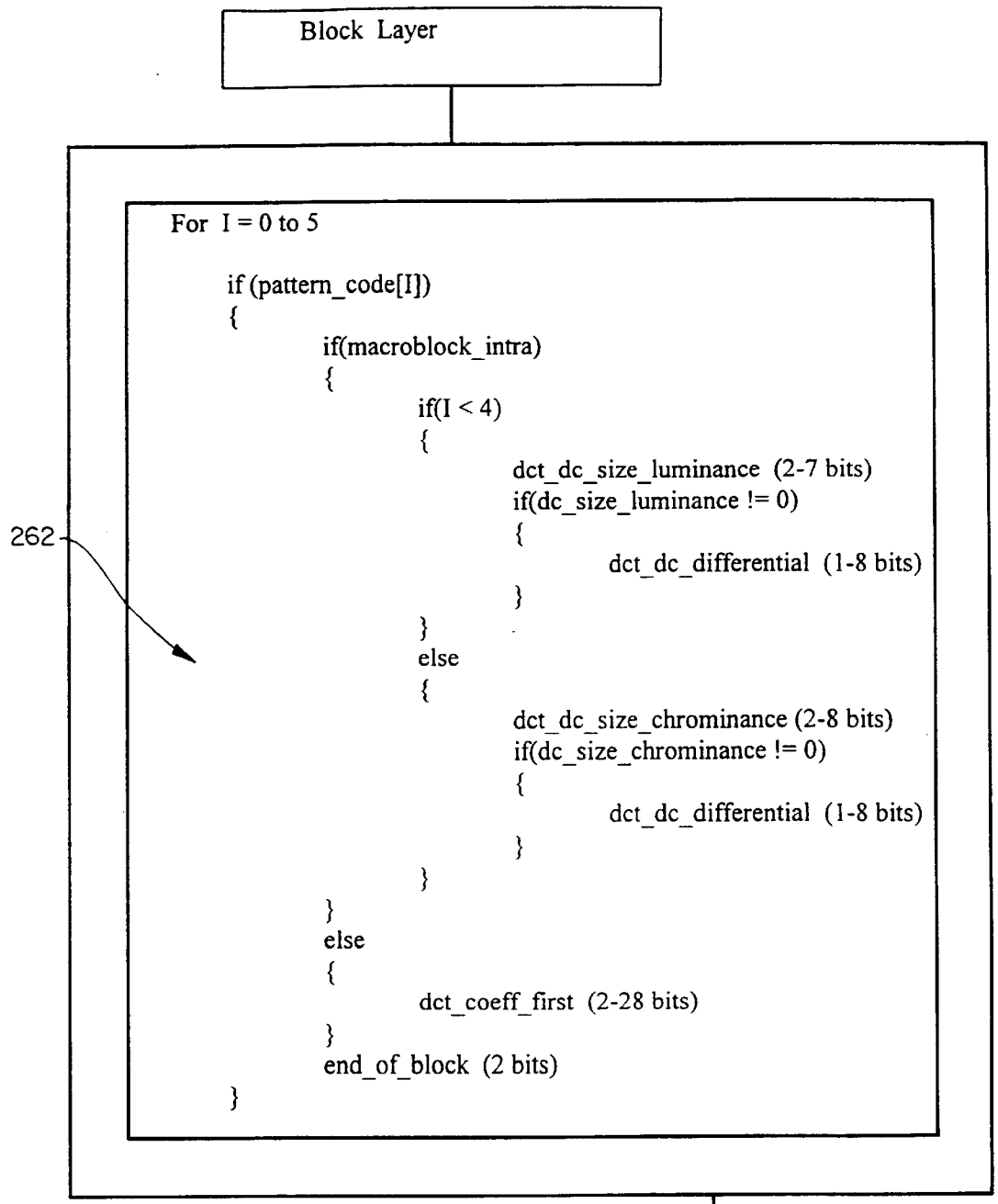

FIG. 10 illustrates the steps required in which the correction code can be inserted into the adaptive stream for each of the adaptive streams. It is know that for an incoming block 300 at a summer 302 the difference is taken between the actual values of the incoming block and the predicted value of that incoming block, the predicted values being depicted as predicted value 304. The difference between the actual and predicted values result in an error 306. This error is then transformed using the DCT transform in step 308 and then subsequently quantized in step 310. Thereafter, in step 312 it is run-length encoded so that there are 64 DCT coefficients that are output at a step 314. It is known to take this output and run-length decode it with run-length decoder in a step 316, do an inverse quantization in step 318 and an inverse DCT in step 320, which then provides the difference between the incoming and predicted block plus some error $Q_n$. By subtracting the predicted value 304 from this sum in a step 322, there is obtained a value of the actual incoming block value plus the noise component at output 324. It is known to take this output and input it into a prediction system 326 in order to make a prediction of a subsequent block.

According to the present invention, the DCT values that are output from the output at step 314 are grouped together in groups that correspond to the adaptive streams themselves. Thus, there will be eight groups of DCT coefficients that correspond to the original incoming block. For each of the adaptive stream DCT coefficients, therefore, a run-length decoding step 340, an inverse quantizing step 342, and an inverse DCT operation step 344 are performed so that the DCT matrix, for those coefficients that are transmitted in that adaptive stream set, can be determined. Since not all of the DCT coefficients have been transmitted, as more P and B frames are sequentially transmitted, the error can increase to a value that is greater than a threshold error value, such that it is clearly visible as an anomaly. Accordingly, the output of the inverse DCT operation in step 344 can be compared to the predicted output so that a determination can be made whether the difference between these two signals is greater than the threshold that had been set. If the threshold is greater, a comparison between the values that are output from the inverse DCT operation 344 and the corresponding MPEG DCT value can be made and a correction code written into the write correction code memory allocation if necessary. It should be noted, however, that while this correction system has been included within the present invention, it is not a necessary component and the present invention can typically be implemented without there being any correction code whatsoever.

Figure 12:
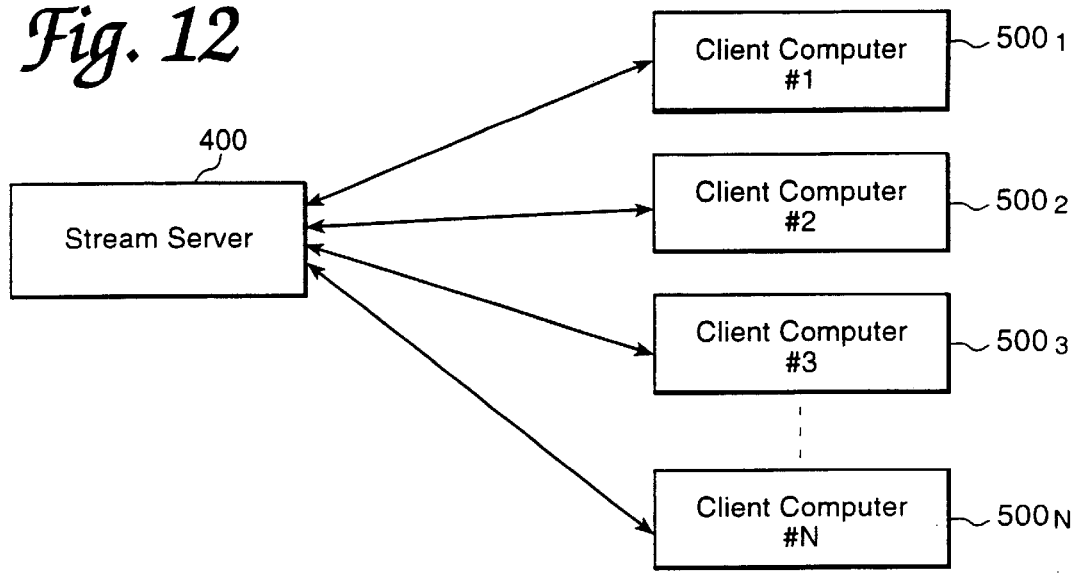
FIG. 12 illustrates an overview of an adaptive stream management apparatus including an adaptive stream server and an adaptive stream configured computer according to the preferred embodiment of the present invention.
Figure 13:
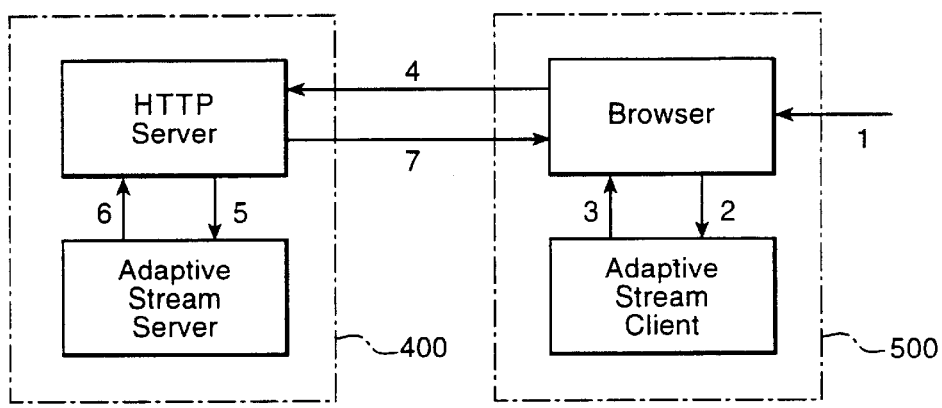
FIGS. 13–14 illustrate a sequence that can be used to establish communication between an adaptive stream server and an adaptive stream configured computer according to the preferred embodiment of the present invention.
Figure 14:
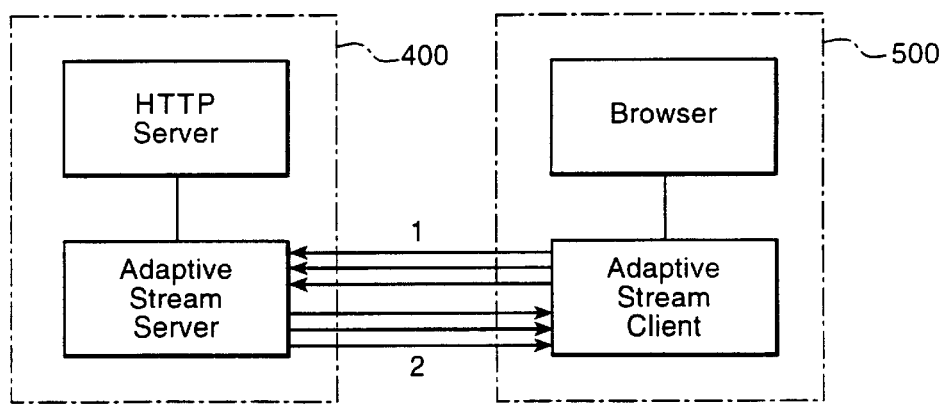

The previous explanation has illustrated how to form the base and additive adaptive streams according to the present invention. Explanation now having been provided for how to create and store adaptive streams on a server, explanation will now be provided for the method for determining which of the adaptive streams to send to a particular client computer from a server, so that this information can then be displayed on a display device associated with the client computer. In that regard, FIG. 12 is referred to and illustrates a stream server 400 and client computers $500_1$, $500_2$, $500_3$ . . . $500_n$. It should be noted that the present invention is currently implemented at the server and the client through a sequence of computer instructions corresponding to the program description that follows, but, can also be embodied as a purely hardware device, or a combination of hardware and software components, that can be used to create each of the base and additive adaptive streams $\Sigma 0-\Sigma 7$ according to the present invention. FIG. 13 illustrates communication between a single stream server 400 and a single client computer 500. In the initial sequence of operations, in an initial step 1, a user will make a request for a browser to use the adaptive stream server. The browser will cause, in a step 2, a request to the adaptive stream client-based program and generate a series of commands necessary to begin implementation of the adaptive stream program. Required information, explained in more detail hereinafter is delivered from the adaptive stream client program to the browser in a step 3, which information will, in a step 4, be transmitted to an http server associated with the adaptive stream server. This information will be transmitted to the adaptive stream server in a step 5. In response, the adaptive stream server, in a step 6, will notify the http server that the adaptive stream server will be able to communicate directly with the adaptive stream client using the protocols that are defined within this application. Thereafter, communication will take place directly between the adaptive stream server and the adaptive stream client computer as illustrated in FIG. 14. Alternatively, other communication paths can be established, such as an adaptive stream client communicating directly with an adaptive stream server.

So that the operation of the present invention is most easily understood, reference will first be made to the operation that allows for the client computer to determine the characteristics of the client system that are then used to generate a profile associated with the client computer. Specifically, this profile, in combination with an actual available network bandwidth, will be dynamically updated at periodic intervals, typically being a minute or less and preferably less than every 10 seconds, so that the most appropriate combination of adaptive streams, at the most appropriate frame rate, are transmitted by the stream server to the client computer.

Referring now to FIG. 16A1, once a user has determined that he desires to view a video sequence using adaptive streams, an adaptive streams program resident within the client computer, begins at a step 600 and, at a step 602 makes a determination of the user profile. This includes a step 602A in which a CPU constraint is determined.

This CPU constraint is determined by having the client CPU process test samples of adaptive streams. The first test sample contains only the base adaptive stream, whereas each of seven subsequent test samples contain an additional one of the additive adaptive streams. Thus, by determining the time that it takes the client computer to decode and play back each sample, a determination can be made as to an average amount of time it will take to decode different stream combinations. Alternatively, the CPU constraint can be determined by testing the capabilities of the client computer for media playback, which capabilities can be measured through the time it takes for certain primitive operations, such as IDCT decodee, variable length decode and color conversion operations, for example. An audio sample is also decoded and the time taken for this decoding noted.

After these determinations have been made, a step 602B follows in which the user sets his preference for the quality of video as compared to the quality of audio on his system. Since available bandwidth needs to be split between the available audio and video, the user can determine whether he wants to have video only, audio only, or some combination in between. The graph illustrated in FIG. 16A2 shows, for different available bandwidths, a normalized preference and available bandwidth with respect to this feature. FIG. 16A3 illustrates a function indicating, for various general CPU types (constraints) a the range of options available to a particular user based on CPU constraints. The portion of CPU resources allocated to video and audio is determined by a different set of curves as shown above. The relative audio decode time ratio ADR (LCD platform/higher-end platforms) is plotted on the X-axis. Representative platform CPU configurations are also shown. For each point on the X-axis, these curves give the preferred ratio of allocation of CPU resources to audio only ($CPUR_A$).

Thereafter, in step 604 a connection is established between the adaptive stream server 400 and the particular client computer 500. Thereafter, the profile is sent in a step 606 and, after the user makes a selection of the particular sequence that he desires to see/hear in step 608, step 610 follows and adaptive streams are transmitted in accordance with the user profile thereafter. If the user desires to terminate the session, the session can be terminated as indicated by step 612 in which the session will end at step 614, otherwise the session will continue until the sequence end takes place.

A modification of the adaptive stream structure that can be implemented, if desired, is to introduce a quality factor, which, for example, for a given DCT coefficient, will only use the most significant bits for transmission of lower quality coefficient information, but transmit all bits for transmission of the highest quality coefficient information. Of course, modifications which transmit various other segmentation of data could be implemented.

Overall operation of the adaptive stream server will now be described with respect to FIG. 15A. Once the adaptive stream server receives a profile from the user, in step 550, it uses that information, as well as other information described hereinafter, to make a determination of which streams to transmit in a step 552. Once this determination is made, streams are actually transmitted in a step 554, as long as the profile is not updated, as will be explained further hereinafter, or there is no indication that there is an end of session, as depicted in FIG.15A by step 556, transmission will continue. If an end of session is depicted, the end of the session will occur as indicated by step 568.

With respect to step 552 and the determination of which streams to transmit, attention is directed to the flowchart in FIG. 15B1 which indicates the steps that the server takes to determine which of the particular streams to transmit. First, in step 552A, a network bandwidth constraint is applied to determine which bandwidth is available for this particular session. Thereafter, the CPU constraint is also applied as received from the profile from the client computer in order to determine if that constraints which adaptive streams can be transmitted. Thereafter, in step 552C, the video preference is used to further limit which adaptive streams to send and thus make a determination of which adaptive stream to transmit. An example is provided in FIGS. 15B2A through 15B2D. Reference in FIG. 15B2A is made to an example that for a particular adaptive stream 1,5 Mbits per second must be accommodated by the various adaptive stream combinations at different frame rates. Thus, a spatial resolution of 1/8 corresponds to the sending of only the Σ0 base stream, whereas a spatial resolution of 2/8 corresponds to the combination of the base stream and the Σ1 additive stream. 8/8 therefore corresponds to the usage of all of the adaptive streams for the various frame rates.

Each of these constraints can be dynamically updated on a periodic basis, how the profile is used to select the appropriate stream combination, are now further described with respect to the following three steps and FIGS. 15B2A through 15B2D:

Step 1: Bandwidth Constraint

The profile from the client indicates that $BW_{NET}=500$ Kbps and $PREF_{AV}=0.75$.

Using the function f( ) illustrated in FIG. 16A1 that determines the ratio of bandwidths to be allocated to video and audio:
$BWR_{VIDEO}=f(BW_{NET},PREF_{AV})$, $BWR_{VIDEO}=0.8$.

This determines the bandwidths allocated to video:
(vbr−0.8)*500=400 kbps

Selecting all the adaptive streams that satisfy the bandwidth constraint for video, the set of adaptive streams highlighted in FIG. 15B2B can be used.

Step 2: CPU Constraint

The Step 2 CPU constraint uses the functions illustrated in FIG. 16A3 and thus it is required to:
a) Calculate ADR (audio decode ratio) $ADR=T_A/T_{A-LCD}$, where $T_{A-LCD}$ is the audio decode time per sample for the LCD (least common denominator) platform.
b) Determine $CPUR_A$ by using the above computed value of ADR and the curve specified by $PREF_{AV}$.

Thus, the proportion of CPU resources to be used for video alone is $$CPUR_V = 1 - CPUR_A$$

For example, if the profile indicates that the time to decode a video frame of spatial resolution 8/8 on a particular client (a Pentium-90 Mhz) is 100 ms. i.e. $T_s=100$ ms and $F_s=10$ fps. The time to decode an audio sample on this client ($T_A$) is 2.5 times faster than an LCD platform (i.e. ADR=2.5). From the above set of curves for $PREF_{AV}$=DEFAULT, the $CPUR_A=0.85$. Thus, for spatial resolution 8/8, the adaptive streams that satisfy the CPU constraint have:

$$frame\_rate \leq 0.85*F_s = 0.85*10 = 8.5 \text{ fps.}$$

This process is repeated for all the other spatial resolutions (1/8 to 7/8) that have streams selected after applying the Bandwidth Constraint of Step 1. The resulting set of adaptive streams that satisfy the CPU constraint have their normalized CPU constraint number highlighted as shown in FIG. 15B2C.

Step 3: Video Preference Constraint

The profile indicates the video preference set for best spatial resolution (8/8). This selects the single video adaptive stream indicated in FIG. 15B2D.

Once step 552 in FIG. 15A is completed and the stream combination is set, the transmitting of streams by the server, and the reception of the same by the client computer then takes place.

With reference to FIG. 15C, the transmission sequence begins with, in step 554A, the sending of an adaptive stream identification and header information, in which the codes indicating the specific adaptive streams that will be sent and other MPEG and adaptive stream header information as has been previously specified. In step 554B that follows, the group codes and headers, are transmitted, and, thereafter in step 554C, the picture code is transmitted. For each picture, in step 554D1 the complete Σ0 sequence is transmitted and in step 554D2 the Σ1 through Σ7 additive adaptive streams are transmitted, as determined by the profile, as has been discussed previously.

The drop frame codes and next picture pointer need not be transmitted, as these codes are used by the stream server to quickly determine whether to drop a frame and then determine quickly the location of the next frame, so that a real-time, appropriate, and dynamically changing picture sequence, dependent upon the profile, can be transmitted. This transmission occurs for each picture in a group, and, then each group of pictures, until transmission of the entire sequence takes place. Although it should be apparent, it is noted that the streams that need to be transmitted from the server can be quickly determined by the server processor, since the server processor can use the next picture pointer and drop frame codes embedded in the data structure to quickly determine which frames to send, as well as which frames not to send, depending on the particular profile.

In an alternate implantation of the data structure illustrated in FIGS. 7A and 7B, there can be created a set of two files, an index file and a data file. In the data file is stored the start codes, header data, and actual video data associated with each of the adaptive streams as has been previously described. In the index file is stored drop frame codes for each adaptive stream, down to the slice level, as well as pointers to the location for each slice of the data for the appropriate data that will be transmitted if a frame is not dropped. Using this data file structure, the processor can determine even more quickly whether a particular frame, and which adaptive streams within the frame, should be transmitted.

At the end of a group code sequence, whether a profile update has occurred is checked in step 554E. If a profile update has occurred, then step 550 of FIG. 15A follows and a new profile is received. If there is not a new profile, then step 554B follows and a new group code , and corresponding pictures, each with corresponding adaptive streams is transmitted, which operation continues until the end of a sequence.

Figure 16B:
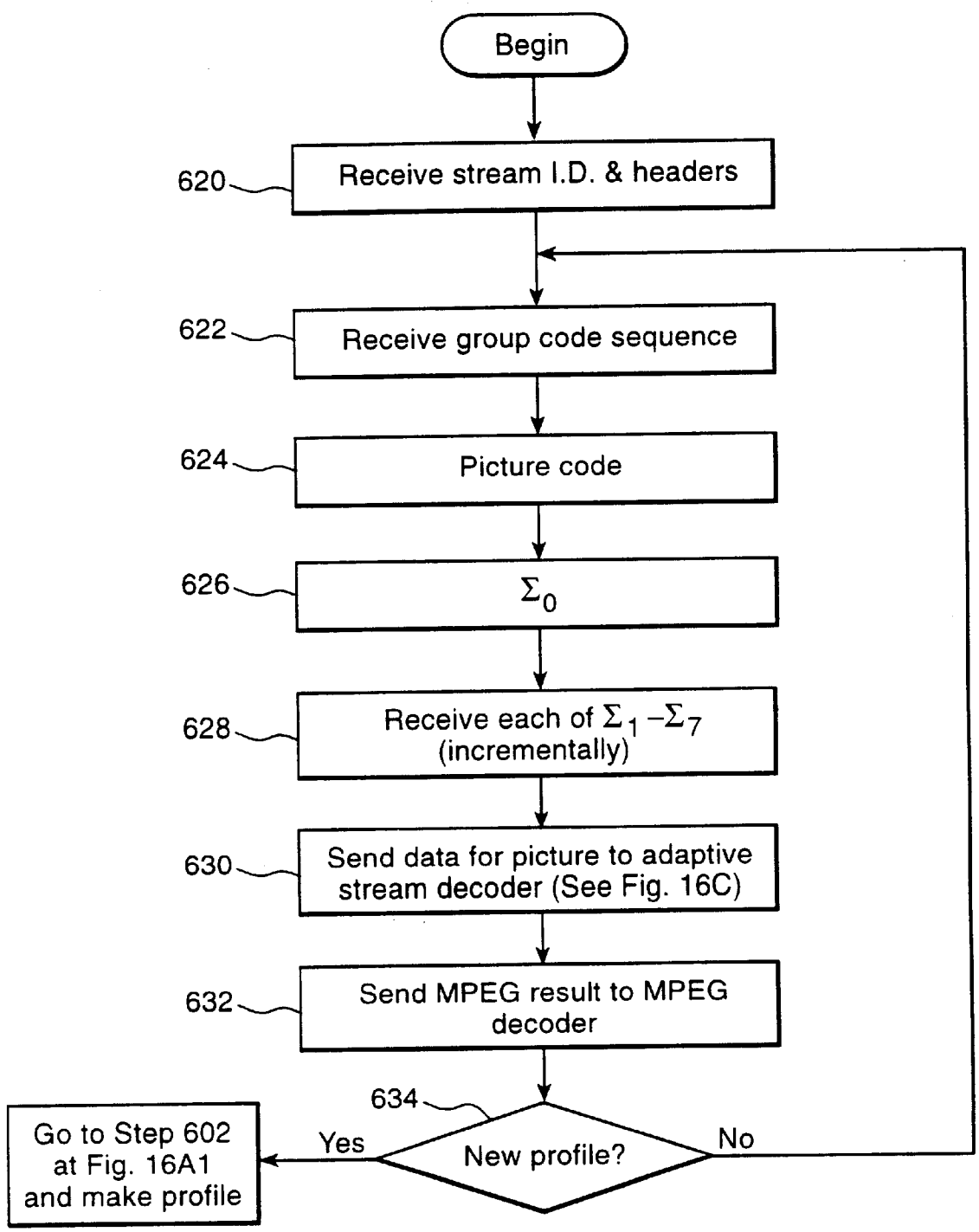

On the client computer reception side, step 610 of FIG. 16A1 is further illustrated in FIG. 16B. This reception begins in step 620, in which the adaptive stream and header information transmitted in step 554A of FIG. 15C is received. Steps 622 follows, in which the group code and header information transmitted in step 554B is received. Step 624 receives picture code and picture header information transmitted in step 554C, and, thereafter, in steps 626 and 628 the transmitted Σ0 sequence and , as determined by the profile, appropriate Σ1 through Σ7 additive adaptive streams are received, respectively. Once the data for an entire group of adaptive stream pictures is received, it is then operated upon by an adaptive stream decoder in step 628. Once decoded, this group, which will be a sequence of reconstructed I, B and P pictures, is then operated upon using a standard MPEG decoder in step 630 to obtain reconstructed frames.

If, after a group of pictures is received it is detected that a new profile is desired or is sent, step 602 in FIG. 16A1 follows and a new profile is made. Otherwise, step 622 repeats.

Figure 16C:
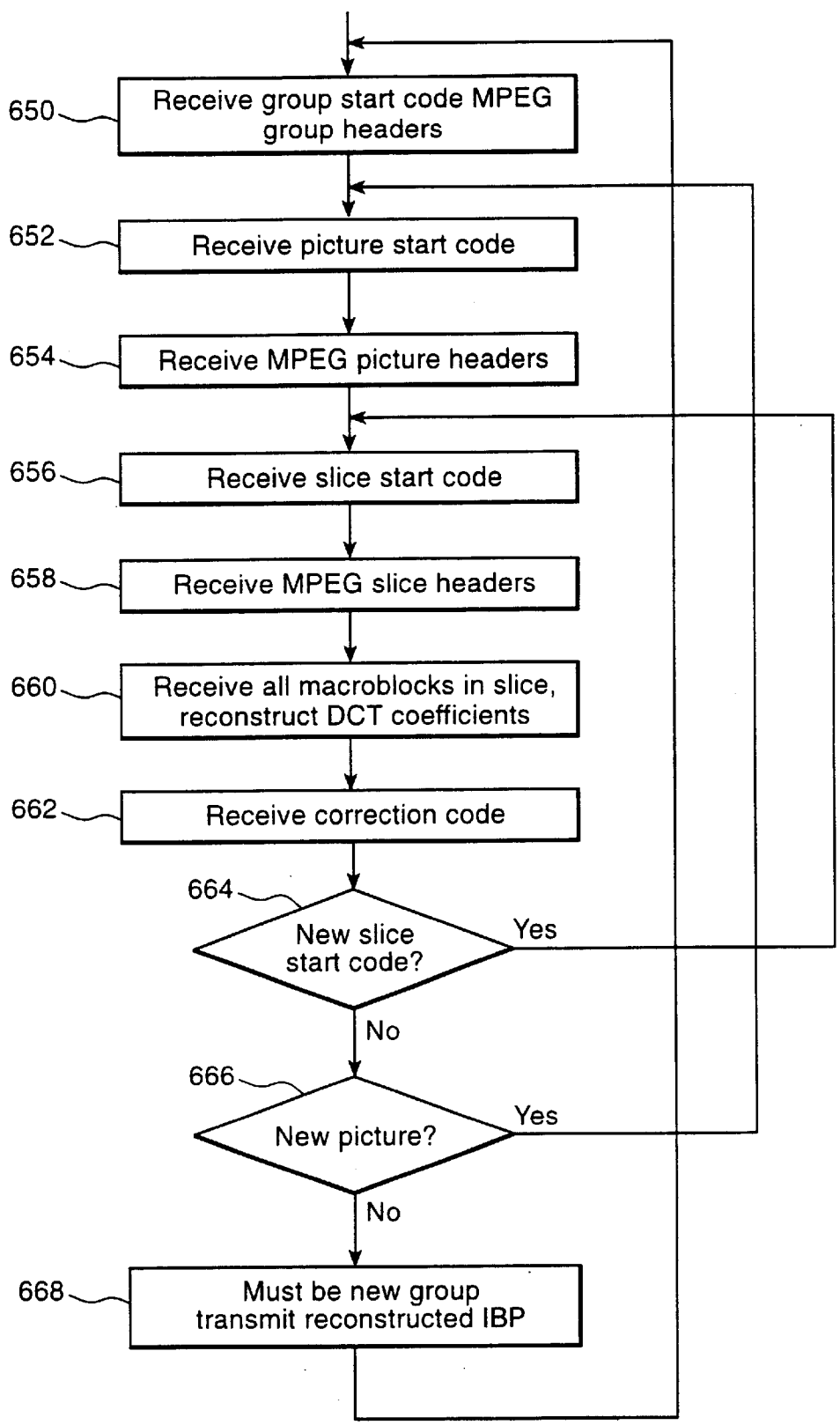

FIG. 16C illustrates operation of the adaptive stream decoder in further detail. As illustrated, in step 650, the group start code and MPEG headers are received. Thereafter, in step 652 the picture start code is received. In step 652 and 654 the picture start code and mpeg picture headers are received, followed, in step 656, with receipt of the slice start code for a particular picture. In steps 658 the MPEG header information is received. Subsequently, in step 660, all of the information corresponding to the adaptive streams for a particular slice is received and blocks of reconstructed DCT coefficients are obtained for those blocks that have DCT coefficients, according to the number of additive adaptive streams that were transmitted. The adaptive stream decoder, having been informed of which additive adaptive streams are being transmitted, as well as the number of frames per second and other needed synchronizing information, is capable of reconstructing the DCT coefficient matrix for each block. Thereafter, in step 662, the write correction code, if any, is received and used to correct the drift introduced in the client decoder because of the reduced transmission stream (i.e less than all of the additive adaptive streams).

In step 664 a determination is made as to whether a new slice start code is detected. If so, step 656 is again initiated. If not, it is determined in step 666 whether a new picture start code is detected, which then results in step 652 being again initiated if such a detection is made. If not, it is known that a new group must be being input, so the previous, now completely reconstructed group of pictures is transmitted to an MPEG decoder in step 668.

It should be understood that the reconstructed group of pictures will have a resolution that corresponds to the number of adaptive streams that were transmitted and received, as well as the frame rate.

Operation of the 3D adaptive stream processor will now be described. Similar to the video transcoder, server and client computer, 3D graphics requires graphics equivalents in the form of a graphics transcoder 10G, a graphics stream server 400G and client computers 400G. In actuality, these components can be the same transcoder 10, stream server 400 and client computers 400 previously referenced in FIGS. 1 and 12 but which operate using the graphics computer program that, in the presently preferred embodiment, implements the graphics adaptive streams as described further hereinafter.

In order to fully appreciate how the transcoder 10G that transforms data representing a 3D scene containing a plurality of objects into adaptive graphic stream, the format of the, adaptive stream graphics data that flows between the stream server 400G and the client computer 500G will be described. At the beginning of a 3D transaction, the global data (such as "camera" (point of view) parameters, lighting, overall options such as shading mode, default lighting model etc.) and all or part of the spatial data structure, which describes the relative positions and sizes of the objects composing the scene is transmitted. Thereafter, a description of the objects in leaf nodes of the spatial data structure is transmitted. Following this, the geometry, texture and material data is streamed in on an on-demand basis and based upon the available network bandwidth and CPU constraints, as observed by the graphics server. Global scene data according to the present invention will now be described, beginning with the spatial data structure.

Whereas the preferred embodiment of the video adaptive streams was derived from an MPEG data stream, the preferred embodiment of the 3-D graphics adaptive streams also uses a standardized digital 3D format as its presently preferred embodiment, that being the VRML data format. In a manner similar to that described previously with respect to the video adaptive streams, the graphics adaptive streams also use the overall VRML format, but considerably enhances it in order to obtain the streaming capabilities described hereinafter.

Figure 17:
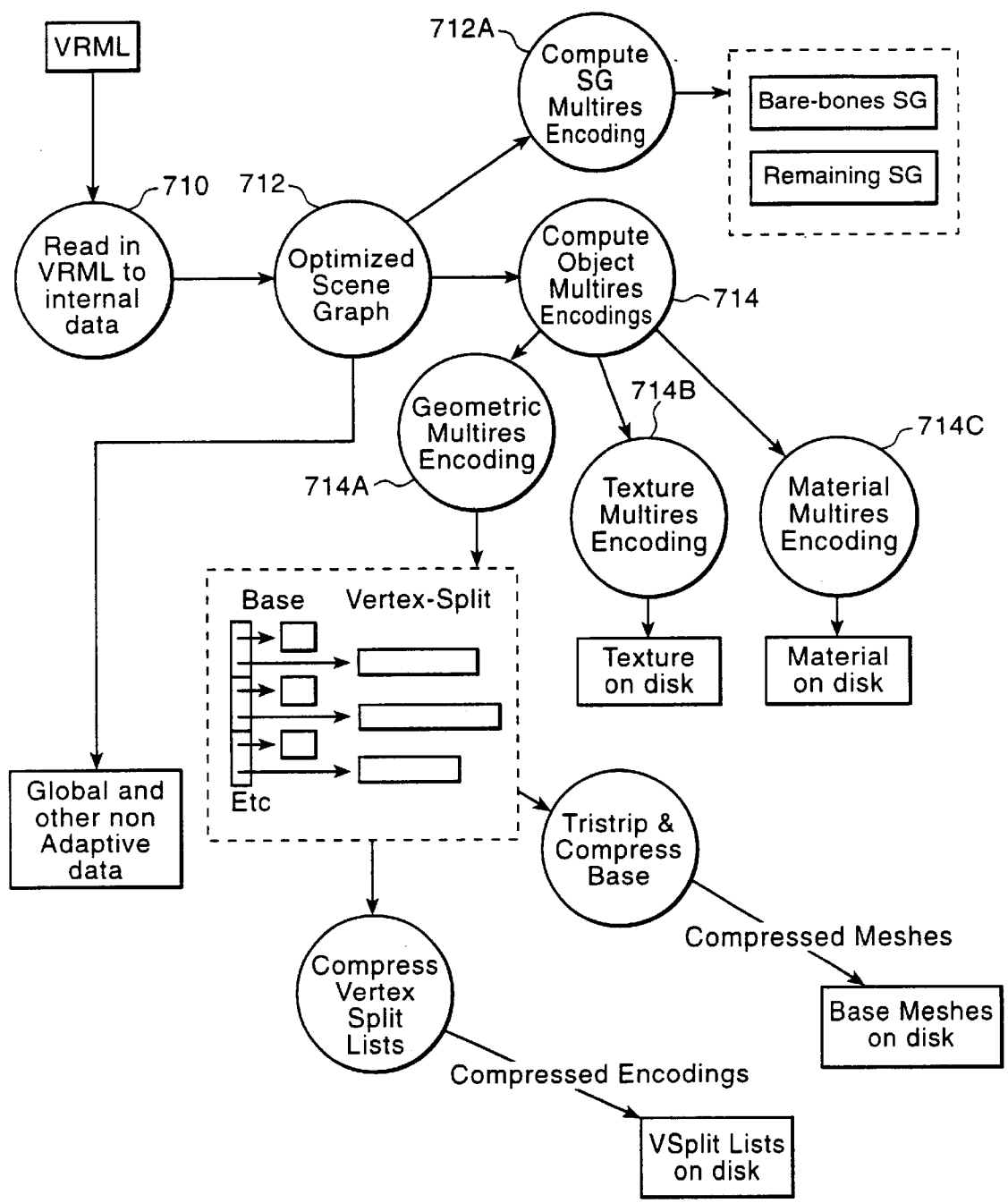
FIG. 17 illustrates a flow chart of the 3-D transcoder according to the present invention.

In order to obtain graphic adaptive streams that allow for base and additive adaptive streams of data to be transmitted between a server and a client computer, a transcoding process of the VRML format data into a graphic adaptive streams format is required. FIG. 17 illustrates a flow chart of the 3-D transcoder according to the present invention.

Figure 18:
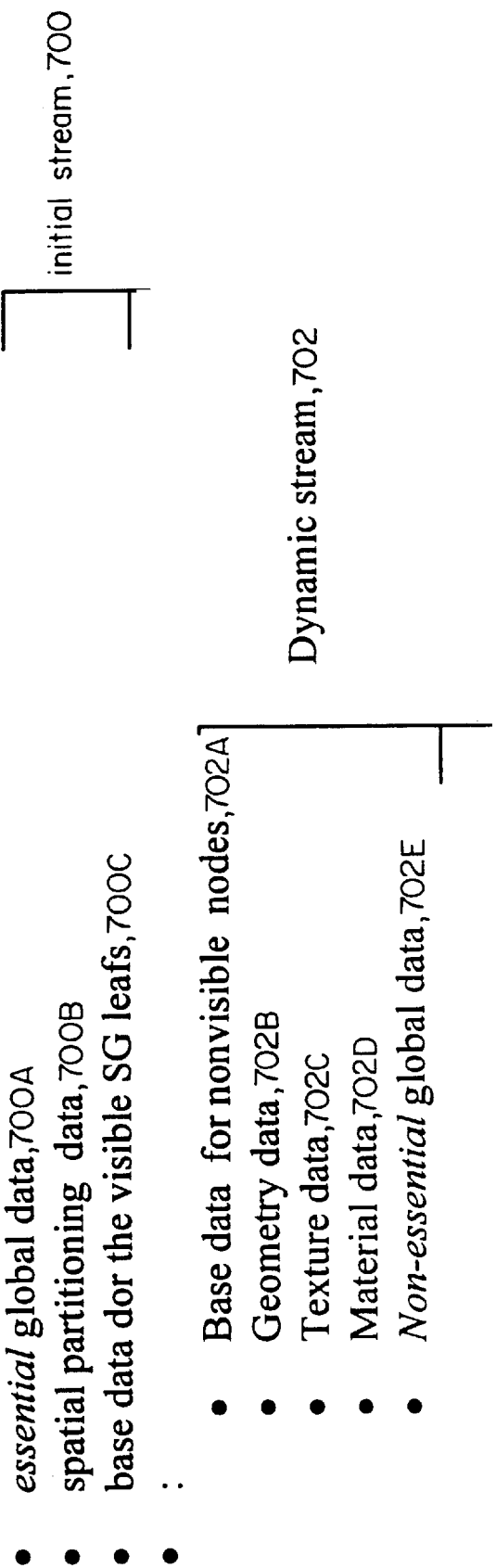
FIGS. 18A–C illustrate types of graphics adaptive data according to the present invention.

Reference will be first made to FIG. 18A to illustrate the overall graphic data streaming format resulting from the graphic transcoding process to assist in the understanding of the graphic transcoding process. An initial stream 700 composed of essential global data 700A, spatial partitioning data 700B, and base data for visible scene graph leafs 700C is initially transmitted from a server to a client computer. After complete transmission of this initial stream, based on parameters described hereinafter, additional base data 702A, geometry data 702B, texture data 702C, material data 702D, and non-essential global data 702E are thereafter transmitted in dynamic streams 702 that include, for certain graphics characteristic, graphic adaptive streams according to the present invention as described hereinafter. FIG. 18B illustrates in more detail the parameters transmitted from the server to the client computer Referring again to FIG. 17, in step 710, the input VRML data is first read and converted into an interim data structure that captures the hierarchy of the graphics data structure and also the attributes of each of the objects. This data structure is usually implemented as a tree as is well known. This data structure contains all the information in the VRML file. The subsequent transcoding as described hereinafter converts graphic information within this interim data structure into the more efficient and network-enabled adaptive stream graphics format according to the present invention.

Once placed in this interim data format, an optimized scene graph is produced by implementing, in the preferred embodiment, a K-D tree for spatial localization in step 712 and will be further described with reference to FIGS. 19, 20 and 21. It is noted, however, that other data structures, such as octrees and bounding box hierarchies, can also be implemented according to the present invention.

Figure 19:
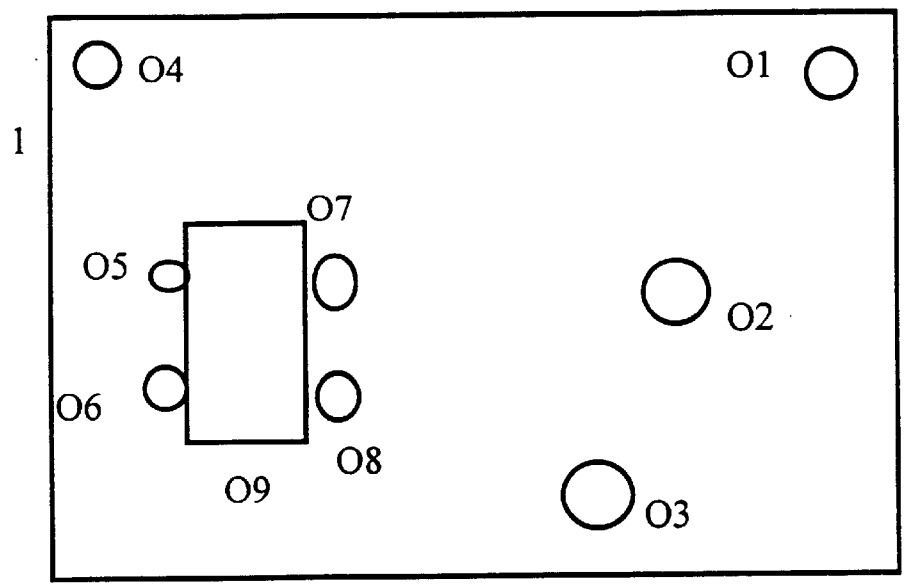
FIGS. 19–21 illustrate a scene, bounded scene and resulting K-D tree according to the present invention.

FIG. 19 illustrates digital data that represents a scene. So that this scene can be transmitted using graphic adaptive streams according to the present invention, this scene is first placed in a spatial data structure that allows within the entire space to each be defined in terms of a subspace. With respect to the K-D tree structure according to the presently preferred embodiment of the invention, the criteria that is used to implement this K-D tree is to 1) keep the number of objects as equal as possible in each of the sub-blocks; and 2) keep the size of the boxes as similar as possible so that adjacent boxes are similar in size.

FIG. 19 illustrates an example scene that includes within it nine different objects, marked O1–O9. The algorithm that is used to subdivide the scene, such as the one illustrated in FIG. 19, requires starting with a box enclosing all the objects in the scene. Each iteration of the algorithm processes the current box and subdivides it into two boxes as described below. The next iteration then processes each of the new boxes. Each iteration proceeds as follows:

1. Make three lists of all the objects in the current box sorted in the x, y and z directions by the minimum point of the bounding box of the object. Assume that there are n objects. If n is smaller than prespecified number (in the current embodiment, 2) or if the levels in the tree is already greater than a prespecified number (in the current embodiment 16), we are done.
2. Find the middle most object in each of the list, $O_{n/2_x}, O_{n/2_y}, O_{n/2_z}$ in the x, y and z directions respectively. Locate the planes x=a, y=b, z=c in the middle of this object along each of the axes and the next $O_{n/2+1_x}, O_{n/2+1_y}, O_{n/2+1_z}$ without splitting any of the objects. If a plane like that cannot be found go to 4.
3. Find the value between a, b, and c which is closest to $m/2^P$ for some integer m between 1 and $2^P$ for fixed p in a particular implementation. In the current embodiment, we use p=6. Let these values be $a_m$, $b_m$, $c_m$. Find the $a_m$, $b_m$, $c_m$ values that do not split an object. Among these, take the value closest to 0.5. The corresponding axis is the split axis. Split the box into two. These two boxes will be processed in the next step. Go to 1.
4. Scan objects on either side of the middle objects along each of the axes to determine values x=a, y=b, z=c that are between objects and do not split any object. A limit (in the current embodiment, 8) is preferably placed on the number of objects that should be searched. If after searching this specified number of objects such a value cannot be found, go to 5, else go to 3.
5. Take the values found in step 2. Find the one closest to 0.5, and find the objects that would be split by this axis. Place all these objects in the current box and remove these objects from the list. Go to step 1. Note that this time we are guaranteed to find a plane that does not split any object since all objects that could be split have been removed.

Figure 20:
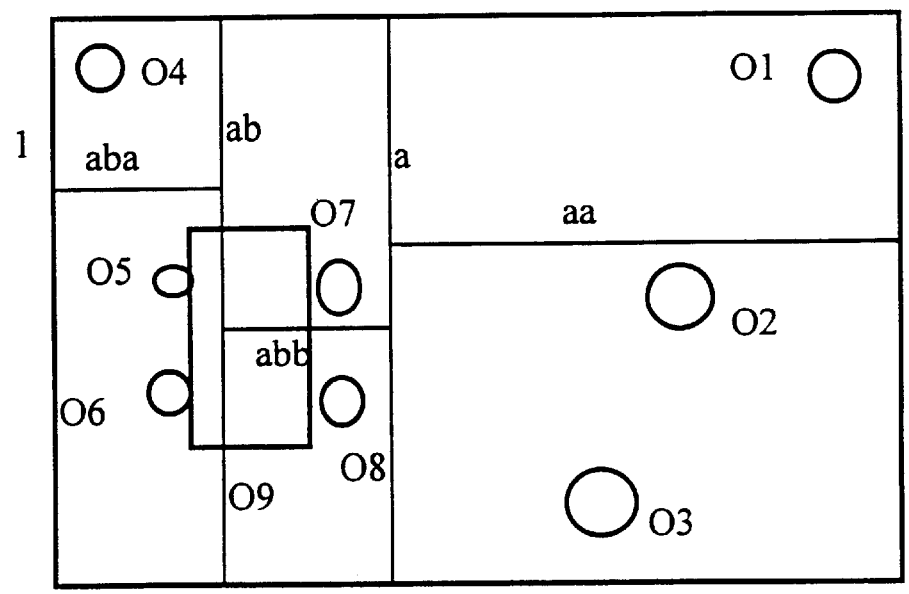

Implementing this algorithm on the example scene of FIG. 19 results in the partitioning of objects into various sub-blocks as illustrated in FIG. 20. It should be noted that split A occurs first, split AB occurs next, and, thereafter, splits ABA and thereafter ABB complete the splits. As a result of this particular example split, the K-D tree illustrated in FIG. 21 results.

The present invention allows for the non-uniform subdivision of sub-blocks as indicated in Step 3 of the algorithm previously described. This results in a tighter bounding of objects, and is implemented through the use of a six bit split value to define for each axis that will iteratively split the original block into sub-blocks. Furthermore, the K-D tree according to the present invention allows for internal nodes of the K-D tree to include objects. By allowing internal nodes to include objects provides the capability of culling objects, as well as sub-trees, as the K-D tree is traversed. It should be noted that with respect to this overall structure, the resulting K-D tree can contain internal nodes, internal nodes with objects, and leaf nodes with objects. Another type of node, an anchor node (similar to the anchor node in VRML), is also treated as an object. An anchor will be typically used as a URL to point to another file. The bounding box of the entire data in the file pointed to by the URL is used to place it in the k-d tree. The other object nodes contain geometry and appearance information as described hereinafter.

With respect to those sub-blocks that contain objects (or, alternatively, each of those nodes), each may have associated a geometry, a texture, and a material. Therefore, once the K-D tree has been computed in step 712A, a bare bones scene graph and remaining additive scene graph components are stored in memory. Step 714 illustrated in FIG. 17 follows so that the geometry, texture, and material data can be correlated to a particular object. As illustrated in Step 714A, geometric multi-resolution encoding takes place with respect to the geometric data so that, for each object, is a base mesh that corresponds to the simplest representation of that object, as well as a sequence of vertex split records that further define the geometry for that particular object and provided additive degrees of resolution. After stripping the base mesh and compression of the base mesh and vertex split records, this geometry data is stored in memory Similarly, in Step 714B, texture multi-resolution data is encoded so that there results base graphic texture data that is stored in memory as well as additive graphic adaptive texture data. Similarly, in Step 714C, base and additive graphic material data is operated upon and stored in memory so that material data can also be sent adaptively.

As commented upon previously, FIG. 18B illustrates the data format for each of the various nodes in the spatial tree and geometry, texture, and material characteristics associated with an object. FIG. 18C identifies significant characteristics. According to the present invention, each of the characteristics in the 3D scene can be classified as being of a certain "type" and that can be uniquely identified by an identifier. In the current embodiment, unsigned integers are used as identifiers. Since geometry data, materials and textures are typically used on more than 1 object, this identification allows geometry, material or texture data to be related to a 3D object. In the use of these objects, a dictionary mechanism as described later acts as a look-up between the identifier and a data pointer to the data corresponding to the geometry, material or texture. Furthermore, during streaming of data, each component in the scene has associated with it a priority that indicates the relative importance of that component as compared to others. This will be further explained later. FIG. 18C illustrates, in table form, significant characteristics and the relative priority given to each, "1" being most important and "10" being least important.

With respect to characteristics related to the multi-resolution encoding of geometry, as illustrated in FIG. 17, each object will contain at least a base mesh. This base mesh provides a base graphic stream of data associated with that particular object. Furthermore, potentially associated with each base mesh are a sequence of vertex split records, which progressively add further detail (in the form of greater numbers of triangles) to the base mesh, thereby increasing the level of detail that is being geometrically illustrated. Similarly, texture multi-resolution encoding provides for the texture of the object to be provided at increasingly greater levels of detail. In the preferred embodiment of the present invention, texture can be implemented as a single image (conventional texture mapping), or a video sequence. If it is a video sequence, the adaptive streams as outlined previously with respect to the video adaptive streams can be implemented as this texture data. If it is a single image, the adaptive streams that correspond to a single I frame of video can be used. Other multiresoultion techniques, such as wavelets, can also be used to create the adaptive textures that can be used with the 3D system according to the present invention.

Similarly still, with respect to material data, adaptive streams are created. The material is composed of ambient, diffuse, specular, reflection, refraction and other data for sophisticated lighting models. The ambient and diffuse components form the base stream, specular and reflection form the first additive stream and the rest are sent in additional additive streams.

Once the multi-resolution encodings relating to geometry, material, and texture characteristics are obtained for each object in a scene graph, all of these various characteristics are stored in permanent storage to be used for streaming when a user wishes to look at the data. It should be noted that there is some global and other information such as camera position, global default shade mode, light information etc. that is non adaptive and is also stored as is as indicated in FIG. 17.

Figures 21, 22:
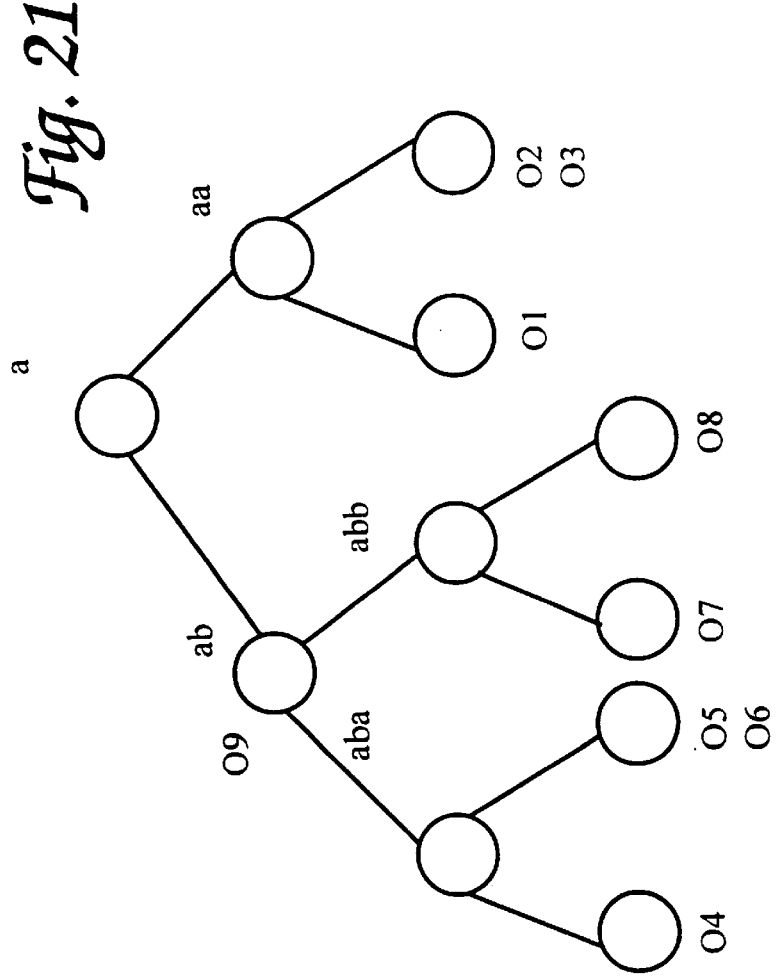
FIG. 22 illustrates portions of a dictionary according to the present invention according to the present invention.

Before describing how graphic adaptive streams are encoded and transmitted to a client computer from a server, reference is made to FIG. 22 that illustrates the form of a dictionary (look-up table) that is used both at the server and client at the time data is streamed. This stores information about different characteristics such as geometry, material, texture, and scene graph nodes, each of which have their own particular identifier, data pointer, priority and other characteristic specific attributes. This purpose of this dictionary is to first, identify objects both at the client and server by a common identifier so that references to the object can be made, and second, to keep an account of how much of what data has been sent. The server has knowledge of all the information in the scene and hence has a complete dictionary. The dictionary on the client side gets created and updated as more data is streamed down to it. It should also be noted that multiple objects may point to the same characteristics in the dictionary. For example, multiple 3D objects may use the same texture characteristics.

Also, in Step 716, scene graph node to object node mapping takes place, so that each of the objects in a scene are associated with one leaf or internal object node.

Figure 23:
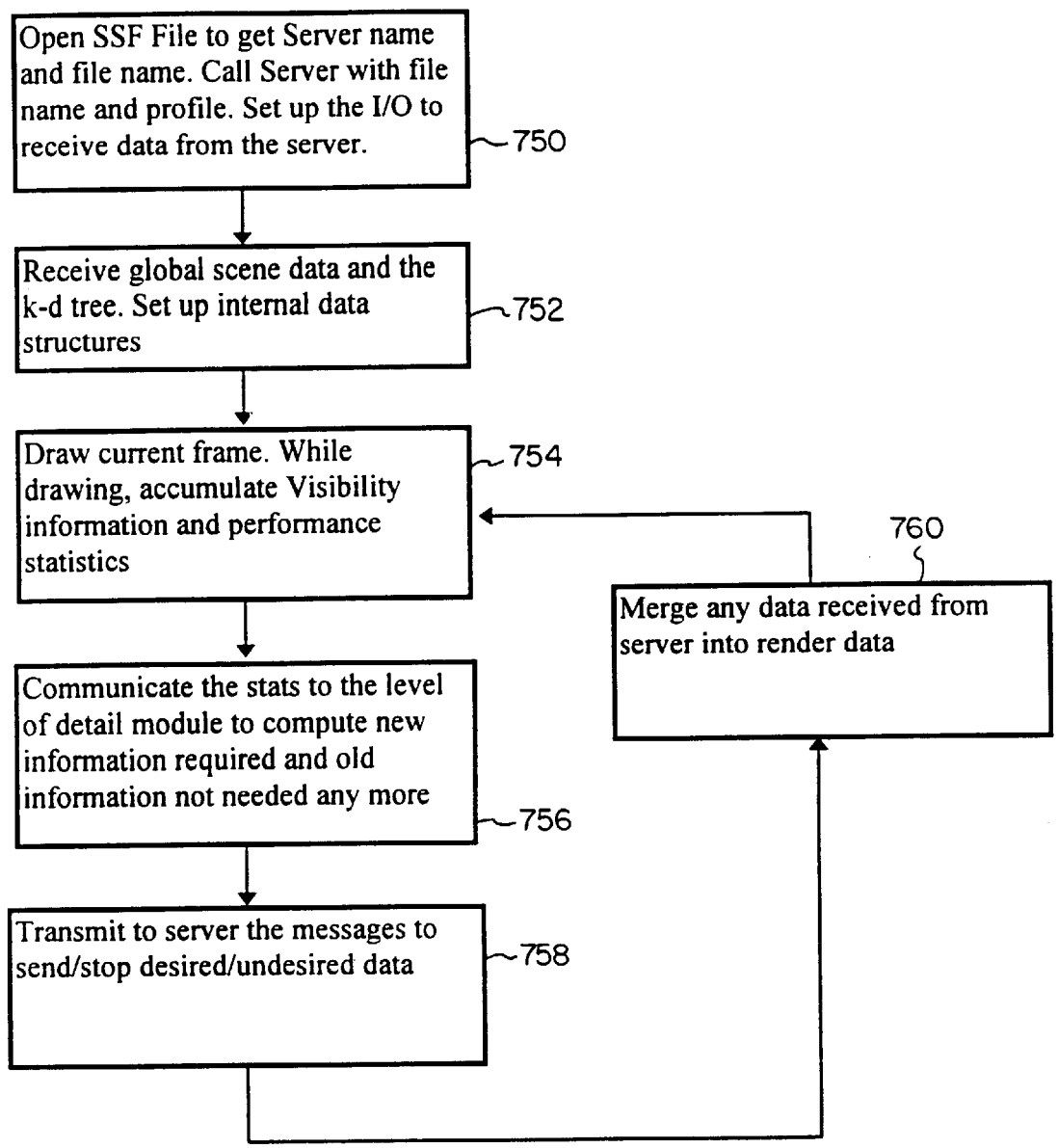
FIG. 23 illustratres overall operation of the graphics stream processing according to the present invention.

Communication between the server and the client will now be discussed initially with respect to FIG. 23. FIG. 23 illustrates a high-level flow chart of the client computer operations. In Step 750, an initial set up between the client computer and the graphics stream server is made. This operation is essentially the same as that described previously with respect to FIGS. 12 and 13 and 14. Following thereafter is Step 752, in which the base graphic adaptive stream data is received by the client computer. This includes the global scene data and the K-D tree spatial partitioning data previously described with respect to FIG. 18B. Based upon that data, in Step 754 the current frame (or visible portion of the scene graph) is drawn. Thereafter, in Step 756, performance statistics are provided to a level of detail module to compute new information required and to also compute the old information that is no longer needed. Thereafter, in Step 758, based upon the computation and the level of detail module, messages to send desired data or stop undesired data are sent to the server from the client computer. Thereafter, in Step 760, based upon the messages sent to the server, data is received from the server to allow for further rendering of the image. This additional information is then used to draw a new current frame. This process is repeated for subsequent intervals of time. Given this high-level flow chart of operations, a more detailed description will now be provided with respect to FIGS. 24–28.

Figure 24:
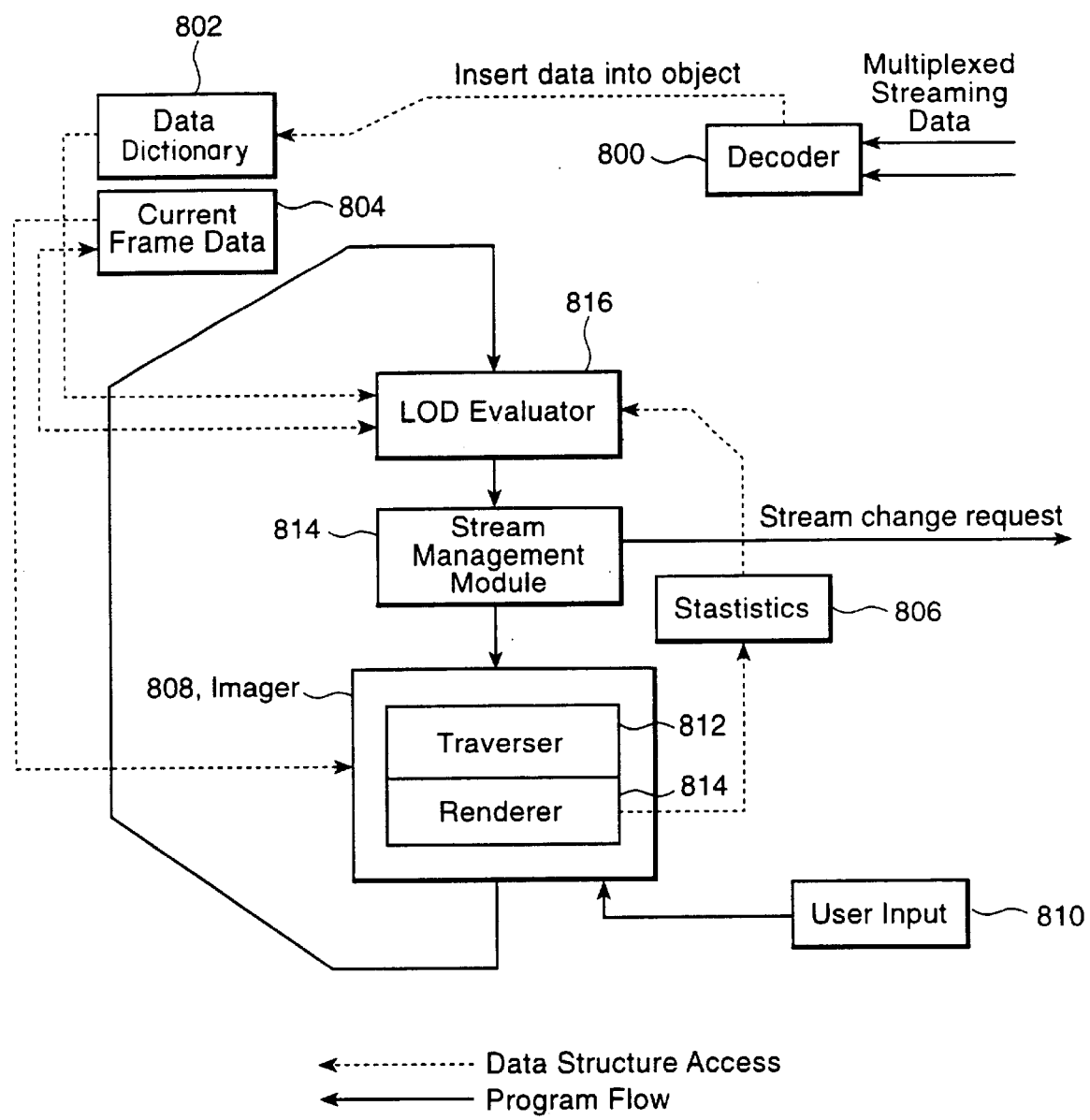
FIG. 24 illustrates a client computer archititecture and program flow according to the present invention.

FIG. 24 illustrates the overall architecture of the client computer as it relates to the graphic decoding and display. Multiplexed stream data is received at a decoder 800 which then inserts received graphics data into a data dictionary (memory) 802. This graphics data is transmitted in the order pointed out previously with respect to FIG. 18A. The data dictionary 802 is, therefore continually being updated with information related to the scene graph. The data is sent as composed of multiple packets. Each packet contains data of one type as shown below.

| Size | Id | Type | Data |
|------|----|----|------|
| First Packet of any type | | | |
| Size | Id | | Data |
| Second and further packets | | | |

The multiplexing of data is done at the server according to the priority of each characteristic. This priority is initialized by the server according to relative importance of the data. For example, geometry data has higher priority as compared to the texture data. The server sends correspondingly more data (more packets) for objects of higher priority by multiplexing more packets of that type.

Figure 25:
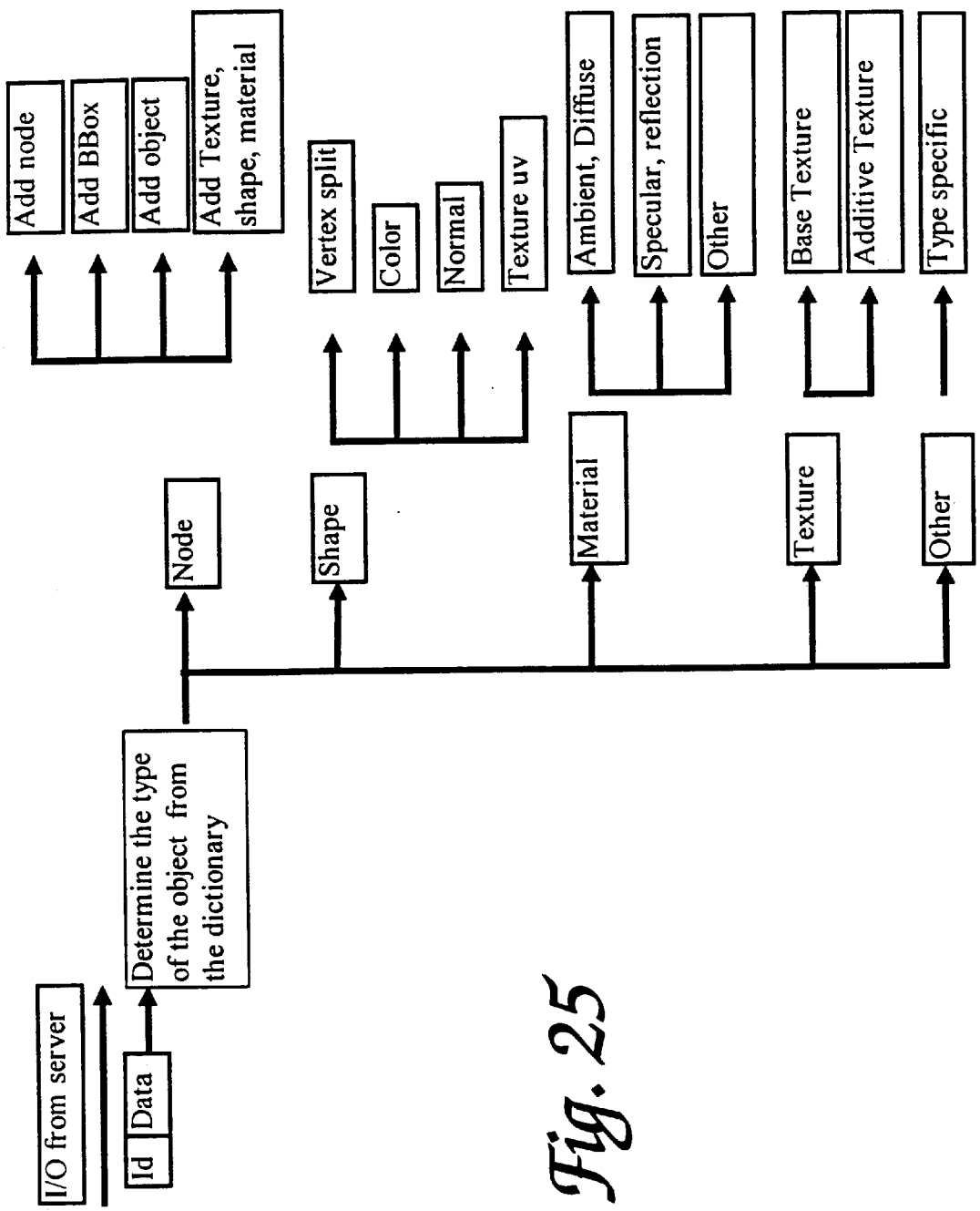
FIG. 25 illustrates decoder operation according to the present invention.

On the receipt of the first packet, a new object of the correct type is created in the client dictionary. For the second and further packets, this data in the dictionary is updated by executing a type specific operation. FIG. 25 illustrates operation of decoder 800 in further detail. When a packet is received, its type is determined from the dictionary and the data pointer for that object is also extracted from the dictionary. If the type is node, it refers to a node in a tree. For such data, types of operations that are carried out include adding the node to the tree, associating a bounding box with that node, adding a 3D object to the node, and associating the ids of texture, shape and material to an object in the node. The data in shape nodes contains information to update geometry data for the shape. The operations corresponding to shape include adding a vertex split which is equivalent to adding triangles, adding color information to a vertex, adding normal information to a vertex and adding texture information to a vertex. Similarly, the data in a material related packet adds ambient and diffuse, specular and reflection, and other more sophisticated material information. Similarly again, the texture information initiates operations to create or update a texture component. As noted above, there are some components that are not additive and all the information for such components are sent in one packet (per component). Each such component has a procedure associated to it which when executed creates the component of that type. For example, when the data packet for a light arrives, a light is created and inserted into the dictionary and into the scene. Similarly, a camera is created on receipt of the data packet corresponding to a camera. In general, a procedure is associated with the data packet of each type which when executed performs data structure changes that incorporate the new data into the information available to the client.

FIG. 24 also illustrates a current frame data buffer 804 that at any time contains data that is to be used to draw the current image or frame. There is also included a statistics set 806 that contains run time performance information on the client including time used to render the previous frame, processing vertices (transformations, lighting etc.), scan converting the polygons, texturing the polygons, accessing textures, also number of visible objects, number and size of textures etc. This information is used to control other aspects of the client as described below.

For each scene, there is an initial set of viewing parameters that are set by the creator of the scene. These include where the camera is situated and the camera parameters such as direction of gaze, field of view and the up direction. Subsequently, this is changed by user input during a user input step 310. In addition, global parameters such as lights and shade modes are initially set and can be changed by the user. Depending on the current parameters, the Imager 808 traverses the scene graph and related data in the current frame as shown step 812 and renders the objects it encounters during the traversal as shown in step 814. The current frame data does not change during this time. While the imager 810 is rendering a frame, it collects information to deduce the statistics mentioned above.

At the end of the frame rendering, a level of detail evaluation step 816 takes place using an LOD insulator in which the statistics set, are used to determine what information in the current frame data is not needed any more and which parts of the scene could benefit from more detail. A number of factors are used to determine this. If due to user input to move the camera, any object has gone out of view, it can now be removed from the current frame data. If an object has moved far away from the camera, less information than is in the current frame data is required. If an object has moved closer to the camera and has a larger projection on the screen, it could benefit from more detail. If the time taken to render the previous frame was too large to maintain a prespecified target frame target, detail should be reduced from all the objects. If the time required to render the previous frame was too low, a better picture can be generated by increasing the detail in all of the objects.

Figure 26:
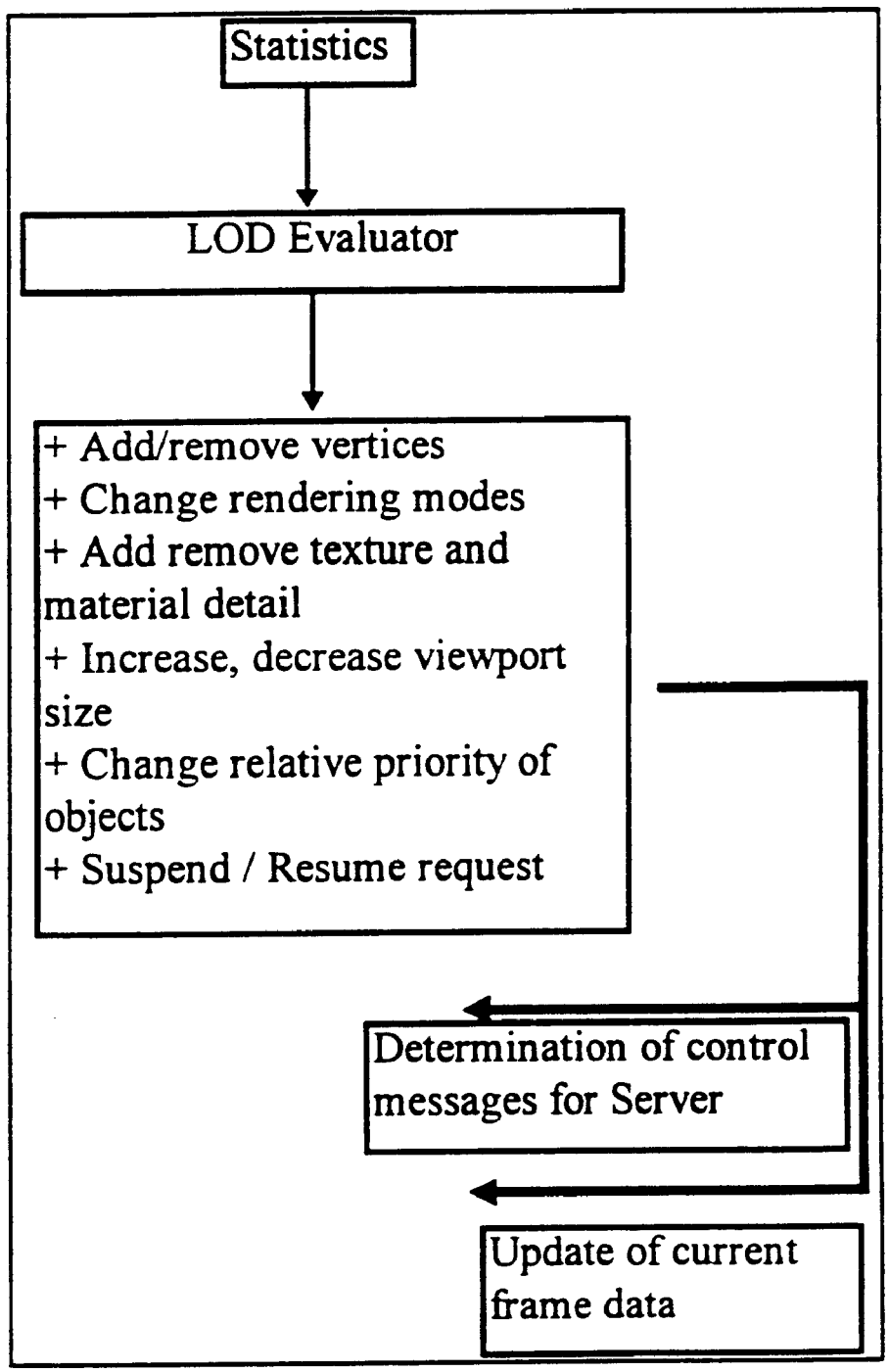
FIG. 26. illustrates the level of detail evaluation according to the present invention.

Thus, as shown in FIG. 26, based on previous frame statistics, it is determined as to what the new priorities of different components in the scene should be, whether to add or remove vertices, change rendering modes such as flat shaded, gouraud shaded, phong shaded, gouraud lighting model, phong lighting model, texturing enable disable, and resolution of. texturing, or increase or decrease viewport size, i.e. the size of the window in which the frame is rendered. Thus, a determination can be made whether and how to render each different visible object and, therefore, what data will be needed for the next frame that will be rendered. Based upon the level of detail evaluated, two actions result. One, control messages to be sent to the server are determined that modify the relative rate of data transmission, both overall as well as for each object. Second data from the data dictionary 802 is merged into the current frame data buffer 804 so that the next frame can be rendered.

The stream management step 814 using a stream management module is the outgoing interface to the server that sends the stream modification messages determined above to the server. Packetized commands are sent to the server to among other things, STOP or RESUME data associated with a particular object identification, change PRIORITY of the specified type of data for the specified type of object, STOP data for all objects associated with a particular data identification, or START data for all objects associated with a particular data identification. Thearafter, based upon the contents of the current frame data buffer 804, to tranversal and step are repeated inside to rendering step render the frame.

Thereafter, the program then returns to user input step 810, as previously described.

LOD Evaluation Solutions (in order of increasing complexity) are:
1. Compute the LOD directly as a linear function of the distance of the center of the object from the viewpoint. Take into account the object size to mark the max distance which will effectively determine the slope of this linear function (i.e., line equation).
2. Compute the error as a linear function of the distance of the center of the object from the viewpoint. The transcoder can associate a max error with each vertex split.
   Compute whether a vertex should be in/out of the object based on the distance of the vertex from the viewpoint.
3. Compute whether a sub-region (down to the vertex level), should be in/out of the object based on the error-delta associated with the sub-region.

Figure 27:
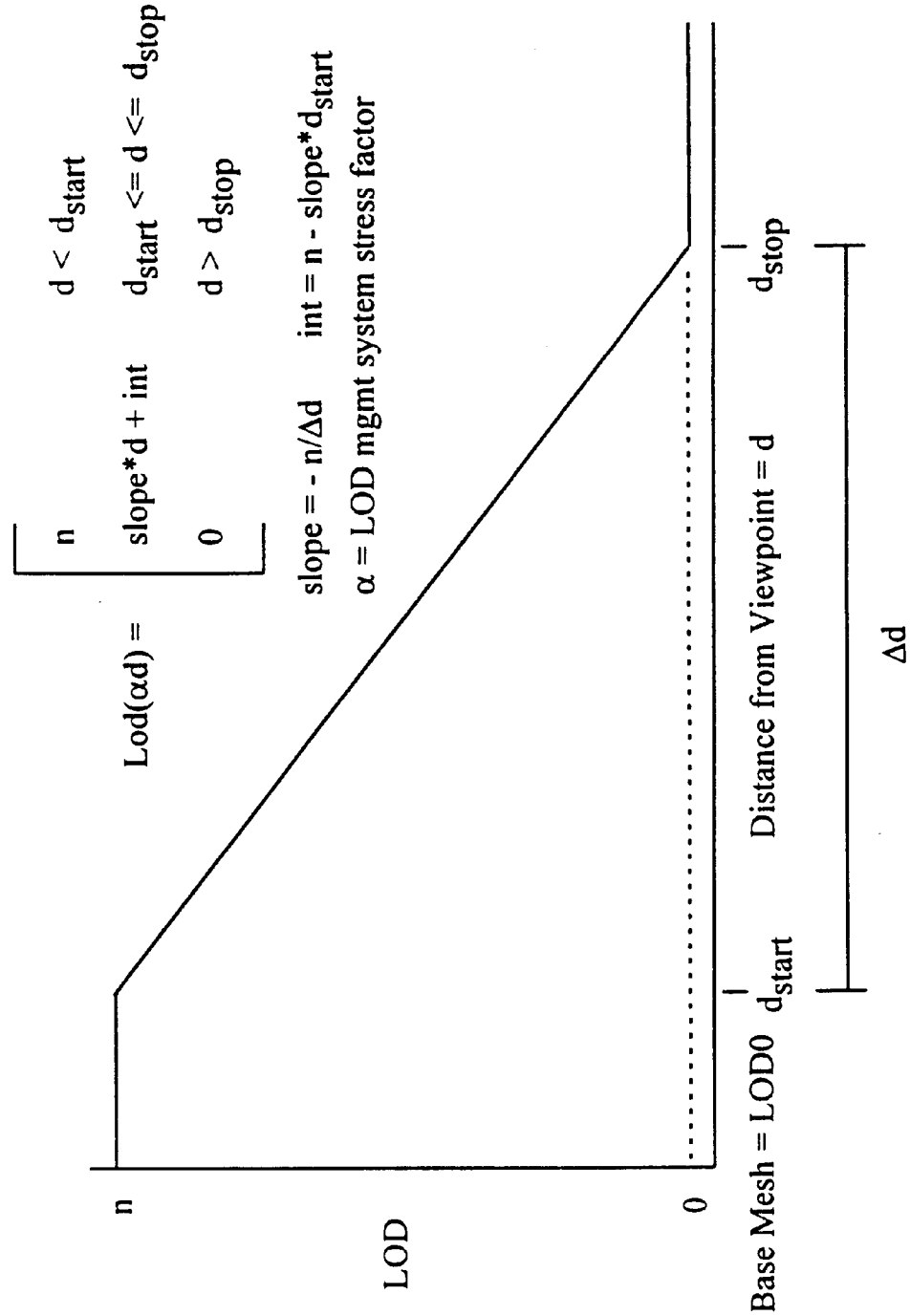
FIG. 27 illustrates the level of detail function according to the present invention
Figure 28:
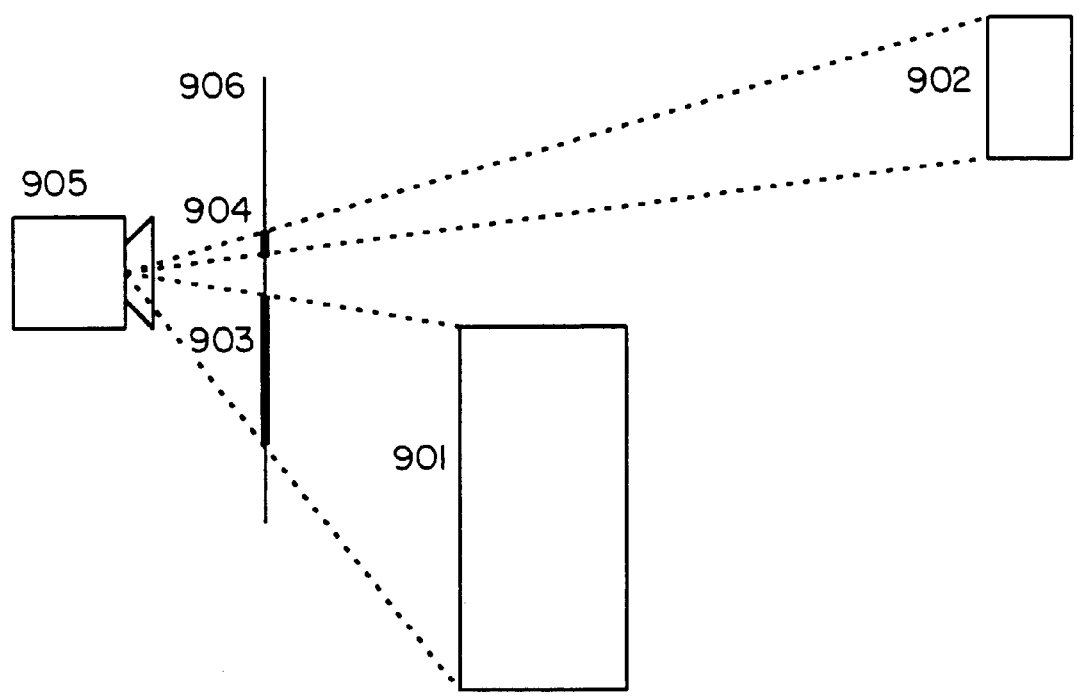
FIG. 28 illustrates 3D decoder controlling video sequences and spatial resolution in dependence upon distance from the camera according to the present invention.

The level of detail (LODs) determination problem is a component of the LODs evaluation algorithm. FIG. 27 displays both a graph of the LODs determination function and the formula for that function. Given n LODs, the LOD to be used for a given view is a linear function of the distance from the viewpoint. The linear portion of the function, which can be referred to as the cumulative LODs switch range, begins and ends at distances from the viewpoint that must be determined on a per-object basis. The endpoints of this interval should be set so as to achieve some balance between aliasing and oversampling of the first and last LODs by image space. This requires statically computing the max frequency of the object. Resolving this statically requires the examination of object space versus image space—the latter is the true runtime signal but considering the max frequency among all the possible projections of the object is not very helpful because the projected max frequency of the object approaches infinity for oblique views and this is invariant to the settings of our LOD switch range endpoints. An acceptable solution however is to compute the max frequency in object space (or some threshold frequency as we might choose not to use the max frequency) and compute the view point distance (assuming a non-oblique view), such that image space will sample the object at the nyquist frequency. Note that if the hardware rendering the scene accelerates polygon antialiasing (most likely via multisampling), the threshold frequency could be set to the average frequency instead of the max frequency without any downside.

This section explains the integration of audio and video scalable streams with 3D graphics adaptive streams. A conventional 3D world is composed of geometrical and appearance attributes. The geometry describes the shape of the object. The appearance attributes describe lighting and textures on the objects. Most 3D worlds today use still images as texture elements. With improved computational capabilities, video will increasingly form a texture elements in 3D worlds. In addition, audio will be used to enhance the user experience.

As it is, managing and rendering 3D worlds is an expensive effort in a computational sense. In addition, decoding digital video and audio streams require a lot of computation. The present inveniton's media delivery architecture provides an innovative method of managing computational and bandwidth complexity of these media types when they are integrated in the same presentation.

Each media stream in the adaptive stream system according to the present invention is individually scalable as has been previously described, an application can modify the content it receives from the server as well as what part of this content it has to process to match the bandwidth and computational resources available to it. In addition to these constraints, when a video is embedded in a 3D world, its image on the screen changes considerably depending on where the object on which this video is mapped is relative to the simulated camera. Consider FIG. 28. Videos 901 and 902 are textured on their respective objects. When the objects are mapped onto the screen 906 using the camera 905, the image of video 901 is the thick line 903 and the image of video 902 is the thick line 904. Image 903 is much smaller than image 904 This projection process is essentially limiting the information that ends up being displayed on the screen. This fact can be used to reduce the computational and bandwidth resources, by sending a different resolution stream to video 901 as compared to video 902. As the camera and/or object moves around in the scene, this resolution of the video can be changed continuously. In the present media architecture, this 3D information will be changed into a user-driven profiles to control the information content in each of the videos 901 and 902 as explained later. Typically the different videos in a 3D scene will be at different distances from the camera and a number of videos can be simultaneously displayed using this technique. If multiple videos were to be displayed without this 3D driven control of video content, one would have to decode each of the videos at full resolution and then decimate them to map to the screen to the proper size. This would involve two resource wasting operations, full decode and decimate which is avoided in this implementation.

This close coupling of 3D and video and the ensuing benefits are possible only because of the following unique features:
1. Object-oriented scaling: Each media stream is individually scalable
2. Communicating decoders: It is possible for status in one decoder to control other decoders. This works because the same architecture delivers multiple data types and decoders are designed to communicate.

Converting 3D Data to Profiles

The process of creating the application driven profiles proceeds as follows:
1. Compute the distance d of a video mapped object from the camera
2. Compute the projection of video on the screen $(x_s, y_s)$ and calculate the equivalent number of blocks comprising the projection b
3. Compute the frame per second required fps as a function of distance d as $$fps = f_1(d).$$

The function $f_1$ is a monotonic increasing function, examples being, kd and $kd^2$.
4. Compute the desired quality as a function of distance d as $$q = f_2(d).$$

The function $f_2$ is a monotonic decreasing function, examples being, k/d and $k/d^2$.
5. Generate a profile based on fps,q,b.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

We claim:

1. A method of communicating multimedia digital data from a server computer to a client computer comprising the steps of:

determining multimedia characteristics of said client computer;

determining a selected set of adaptive streams containing said multimedia digital data relating to sight and intended to be transmitted to said client computer based upon said determined multimedia characteristics said adaptive streams being stored on a memory of said server computer and formed of a base stream and a plurality of additive streams, said additive streams containing additive data which corresponds to base data associated with said base stream, such that additional additive data from each additive stream provides increasingly greater resolution and wherein said selected set of adaptive streams is derived from a sequence of digital video pictures, each of said digital video pictures containing a plurality of slices, and each of said slices containing a plurality of blocks, each block representing one of luminance and chrominance information, said luminance and chrominance information in each of said blocks being segmented into a base stream and a plurality of additive streams, each said additive stream containing additive data that corresponds to base data associated with said base stream, such that additional additive data from each additive stream provides increasingly greater resolution of said one luminance and chrominance information for each block; and transmitting said selected set of adaptive streams from said server computer to said client computer.

2. A method according to claim 1 wherein said base stream comprises a single DCT coefficient, and each additive stream comprises an increasingly greater number of DCT coefficients.

3. A method according to claim 2 wherein each block is an 8 by 8 array of data and there are 7 additive streams.

4. A method according to claim 3 wherein said single DCT coefficient of said base stream comprises a DCT 0 coefficient and each additive stream comprises DCT coefficients that are immediately adjacent to DCT coefficients that have been previously selected for inclusion in the previously defined stream, such that the DCT coefficients used for each additive stream within the DCT matrix forms a backwards "L".

5. A method according to claim 1 wherein said step of determining said selected set of adaptive streams further includes the steps of:

receiving at said server computer, from said client computer, a user specified preference for quality of vision as compared to quality of audio; and using said user specified preference to determine said selected set of said adaptive streams for sight.

6. A method according to claim 1 wherein said step of determining said selected set of adaptive streams further includes the steps of determining available bandwidth and determining said selected set of adaptive streams to obtain an updated selected set of adaptive streams; and during said step of transmitting, transmitting said updated selected set of adaptive streams to said client computer.

7. A method according to claim 1 wherein said multimedia digital data relates to sight in the form of a rendered graphical image such that at least one object within said rendered image contains a texture in the form of a digital video picture, said digital video picture containing a plurality of slices, and each of said slices containing a plurality of blocks, each block representing one of luminance and chrominance information, said luminance and chrominance information in each of said blocks being segmented into a base stream and a plurality of additive streams, each said additive stream containing additive data that corresponds to base data associated with said base stream, such that additional additive data from each additive stream provides increasingly greater resolution of said one luminance and chrominance information for each block.

8. A method according to claim 1 wherein said selected set of adaptive streams and other graphics data are usable to produce a sequence of graphical image frames from a scene containing a plurality of objects;

wherein said selected set of adaptive streams includes attribute adaptive stream data that includes base attribute adaptive stream data and additive attribute adaptive stream data;

wherein said other graphics data includes scene definition data including global scene data and spatial partitioning data; and wherein said step of determining said selected set of adaptive streams further includes the steps of:
obtaining a graphic priority table that identifies relative priorities for said attribute adaptive stream data on an object by object basis,
using said relative priorities to determine a priority order of which of said attribute adaptive stream data to transmit more frequently after said transmission step is initiated; and wherein said transmitting step transmits, from said server computer to said client computer, said global scene data, said spatial partitioning data, and said base and additive attribute adaptive stream data based upon said determined priority order.

9. A method according to claim 1 wherein said attribute adaptive stream data includes geometry attribute adaptive stream data.

10. A method according to claim 1 wherein said selected set of adaptive streams and other graphics data are usable to produce a sequence of graphical image frames from a scene containing a plurality of objects, wherein said adaptive streams include, for each object, attribute adaptive stream data that includes base attribute adaptive stream data and additive attribute adaptive stream data, wherein said other graphics data includes scene definition data including global scene data and spatial partitioning data; and said method further comprises the steps of:
retrieving at said client computer said global scene data including a visual portion of the scene data and said spatial positioning data and determining boundaries of said scene and locations of objects in said scene;
drawing a first frame relating to a first visual portion of the scene at said client computer using transmitted base and attribute adaptive stream data; and
determining at said client computer whether to send a message to said server computer indicating that one of updated base attribute adaptive stream data and updated additive attribute adaptive stream data is required due to a change in one of level of detail and said visual portion.

11. A method according to claim 1 wherein said selected set of adaptive streams and other graphics data are usable to produce a sequence of graphical image frames from a scene containing a plurality of objects, wherein said adaptive streams include, for each object, attribute adaptive stream data that includes base attribute adaptive stream data and additive attribute adaptive stream data, wherein said other graphics data includes scene definition data including global scene data and spatial partitioning data; and said method further comprises the steps of:
retrieving at said client computer said global scene data including a visual portion of the scene data and said spatial positioning data and determining boundaries of said scene and locations of objects in said scene;
drawing a first frame relating to a first visual portion of the scene at said client computer using transmitted base and attribute adaptive stream data, said first visual portion of the scene containing a first object that is further from a camera position than a second object, and said transmitted attribute adaptive stream data associated with said first object having a lower level of detail than said transmitted attribute adaptive stream data associated with said second object.

12. A computer-readable medium carrying instructions for communicating multimedia digital data from a server computer to a client computer, the instructions comprising instructions for performing the steps of:
determining multimedia characteristics of said client computer;
determining a selected set of adaptive streams containing said multimedia digital data relating to sight and intended to be transmitted to said client computer based upon said determined multimedia characteristics,
said adaptive streams being stored on a memory of said server computer and formed of a base stream and a plurality of additive streams, said additive streams containing additive data which corresponds to base data associated with said base stream, such that additional additive data from each additive stream provides increasingly greater resolution and wherein said selected set of adaptive steams is derived from a sequence of digital video pictures,
each of said digital video pictures containing a plurality of slices, and
each of said slices containing a plurality of blocks,
each block representing one of luminance and chrominance information, said luminance and chrominance information in each of said blocks being segmented into a base stream and a plurality of additive streams,
each said additive steam containing additive data that corresponds to base data associated with said base stream, such that additional additive data from each additive stream provides increasingly greater resolution of said one luminance and chrominance information for each block; and
transmitting said selected set of adaptive streams from said server computer to said client computer.

13. A computer-readable medium according to claim 12 wherein said base stream comprises a single DCT coefficient, and each additive stream comprises an increasingly greater number of DCT coefficients.

14. A computer-readable medium according to claim 12 wherein each block is an 28 by 28 array of data and there are 27 additive streams.

15. A computer-readable medium according to claim 14 wherein said single DCT coefficient of said base stream comprises a DCT 0 coefficient and each additive stream comprises DCT coefficients that are immediately adjacent to DCT coefficients that have been previously selected for inclusion in the previously defined stream, such that the DCT coefficients used for each additive stream within the DCT matrix forms a backwards "L".

16. A computer-readable medium according to claim 12 wherein said step of determining said selected set of adaptive streams further includes the steps of:
receiving at said server computer, from said client computer, a user specified preference for quality of vision as compared to quality of audio; and
using said user specified preference to determine said selected set of said adaptive streams for sight.

17. A computer-readable medium according to claim 12 wherein said step of determining said selected set of adaptive streams further includes the steps of
determining available bandwidth and determining said selected set of adaptive streams to obtain an updated selected set of adaptive streams; and
during said step of transmitting, transmitting said updated selected set of adaptive streams to said client computer.

18. A computer-readable medium according to claim 12 wherein
said multimedia digital data relates to sight in the form of a rendered graphical image such that at least one object within said rendered image contains a texture in the form of a digital video picture,
said digital video picture containing a plurality of slices, and
each of said slices containing a plurality of blocks,
each block representing one of luminance and chrominance information, said luminance and chrominance information in each of said blocks being segmented into a base stream and a plurality of additive streams,
each said additive stream containing additive data that corresponds to base data associated with said base stream, such that additional additive data from each additive stream provides increasingly greater resolution of said one luminance and chrominance information for each block.

19. A computer-readable medium according to claim 12 wherein said selected set of adaptive streams and other graphics data are usable to produce a sequence of graphical image frames from a scene containing a plurality of objects;
wherein said selected set of adaptive streams includes attribute adaptive stream data that includes base attribute adaptive stream data and additive attribute adaptive stream data;
wherein said other graphics data includes scene definition data including global scene data and spatial partitioning data; and
wherein said step of determining said selected set of adaptive streams further includes the steps of:
obtaining a graphic priority table that identifies relative priorities for said attribute adaptive stream data on an object by object basis,
using said relative priorities to determine a priority order of which of said attribute adaptive stream data to transmit more frequently after said transmission step is initiated; and
wherein said transmitting step transmits, from said server computer to said client computer, said global scene data, said spatial partitioning data, and said base and additive attribute adaptive stream data based upon said determined priority order.

20. A computer-readable medium according to claim 12 wherein said attribute adaptive stream data includes geometry attribute adaptive stream data.

21. A computer-readable medium according to claim 12 wherein said selected set of adaptive streams and other graphics data are usable to produce a sequence of graphical image frames from a scene containing a plurality of objects, wherein said adaptive streams include, for each object, attribute adaptive stream data that includes base attribute adaptive stream data and additive attribute adaptive stream data, wherein said other graphics data includes scene definition data including global scene data and spatial partitioning data; and said instructions further comprising instructions for performing the steps of:
retrieving at said client computer said global scene data including a visual portion of the scene data and said spatial positioning data and determining boundaries of said scene and locations of objects in said scene;
drawing a first frame relating to a first visual portion of the scene at said client computer using transmitted base and attribute adaptive stream data; and
determining at said client computer whether to send a message to said server computer indicating that one of updated base attribute adaptive stream data and updated additive attribute adaptive stream data is required due to a change in one of level of detail and said visual portion.

22. A computer-readable medium according to claim 12 wherein said selected set of adaptive streams and other graphics data are usable to produce a sequence of graphical image frames from a scene containing a plurality of objects, wherein said adaptive streams include, for each object, attribute adaptive stream data that includes base attribute adaptive stream data and additive attribute adaptive stream data, wherein said other graphics data includes scene definition data including global scene data and spatial partitioning data; and said instructions further comprising instructions for performing the steps of:
retrieving at said client computer said global scene data including a visual portion of the scene data and said spatial positioning data and determining boundaries of said scene and locations of objects in said scene;
drawing a first frame relating to a first visual portion of the scene at said client computer using transmitted base and attribute adaptive stream data, said first visual portion of the scene containing a first object that is further from a camera position than a second object, and said transmitted attribute adaptive stream data associated with said first object having a lower level of detail than said transmitted attribute adaptive stream data associated with said second object.

* * * * *